United States Patent
Opshaug et al.

(10) Patent No.: US 11,606,705 B2
(45) Date of Patent: Mar. 14, 2023

(54) SYSTEM AND METHODS FOR RAPID ROUND-TRIP-TIME MEASUREMENT DISTRIBUTION

(71) Applicant: QUALCOMM Incorporated, San Diego, CA (US)

(72) Inventors: Guttorm Ringstad Opshaug, Redwood City, CA (US); Sony Akkarakaran, Poway, CA (US); Naga Bhushan, San Diego, CA (US); Stephen William Edge, Escondido, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 16/526,546

(22) Filed: Jul. 30, 2019

(65) Prior Publication Data

US 2020/0112867 A1    Apr. 9, 2020

Related U.S. Application Data

(60) Provisional application No. 62/742,205, filed on Oct. 5, 2018.

(51) Int. Cl.
*H04W 24/10*    (2009.01)
*H04W 88/02*    (2009.01)
(Continued)

(52) U.S. Cl.
CPC ........... *H04W 24/10* (2013.01); *H04L 5/0051* (2013.01); *H04W 4/029* (2018.02); *H04W 88/023* (2013.01)

(58) Field of Classification Search
CPC ... H04W 24/10; H04W 88/023; H04W 4/029; H04W 64/00; G01S 13/765; G01S 13/878; G01S 5/14; H04L 5/0051; H04L 43/0864
See application file for complete search history.

(56) References Cited

U.S. PATENT DOCUMENTS

| 7,254,401 B2 | 8/2007 | Keranen et al. |
| 10,904,710 B2 | 1/2021 | Sosnin et al. |

(Continued)

FOREIGN PATENT DOCUMENTS

| EP | 1285552 A1 | 2/2003 |
| EP | 2719231 B1 | 3/2018 |

(Continued)

OTHER PUBLICATIONS

International Search Report and Written Opinion—PCT/US2019/044274—ISA/EPO—dated Nov. 6, 2019.

(Continued)

*Primary Examiner* — Hardikkumar D Patel
(74) *Attorney, Agent, or Firm* — Qualcomm Incorporated

(57) ABSTRACT

Disclosed are techniques for determining round-trip time (RTT) of a user equipment (UE). In an aspect, each gNodeB in a plurality of gNodeBs measure signaling data related to an uplink RTT reference signal received from the UE and the downlink RTT reference signal transmitted by each gNodeB. The signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal. The signaling data is sent to a single entity, other than the UE, e.g., another gNodeB or a location server, where signaling data relevant to the UE is aggregated. The aggregated signaling data may be sent to the UE to determine the RTT for the UE or used by the location server to determine the RTT for the UE.

20 Claims, 21 Drawing Sheets

(51) Int. Cl.
*H04L 5/00* (2006.01)
*H04W 4/029* (2018.01)

(56) References Cited

U.S. PATENT DOCUMENTS

| | | | |
|---|---|---|---|
| 2012/0258733 A1* | 10/2012 | Fischer | G01S 5/04 |
| | | | 455/456.1 |
| 2013/0170362 A1* | 7/2013 | Futaki | H04W 24/10 |
| | | | 370/241.1 |
| 2020/0033849 A1* | 1/2020 | Yiu | G05D 1/0022 |
| 2021/0351887 A1 | 11/2021 | Qi | |
| 2022/0026517 A1 | 1/2022 | Hasegawa et al. | |
| 2022/0070714 A1 | 3/2022 | Opshaug et al. | |

FOREIGN PATENT DOCUMENTS

| | | | | |
|---|---|---|---|---|
| WO | 2016182842 A1 | 11/2016 | | |
| WO | WO-2016198104 A1 * | 12/2016 | | H04W 28/16 |
| WO | WO-2018090697 A1 | 5/2018 | | |

OTHER PUBLICATIONS

NEXTNAV: "Introduction of Further Indoor Positioning Enhancements", 3GPP TSG-RAN WG2 #96, R2-169081, Reno, United States, Nov. 14-18, 2016, 28 Pages.

* cited by examiner

SYSTEM AND METHODS FOR RAPID ROUND-TRIP-TIME MEASUREMENT DISTRIBUTION

CLAIM OF PRIORITY UNDER 35 U.S.C. § 119

This application claims under 35 USC § 119 the benefit of and priority to U.S. Provisional Application No. 62/742,205, filed Oct. 5, 2018, and entitled "SYSTEM AND METHODS FOR RAPID ROUND-TRIP-TIME MEASUREMENT DISTRIBUTION," which is assigned to the assignee hereof and is incorporated herein by reference in its entirety.

BACKGROUND OF THE DISCLOSURE

Field of the Disclosure

Aspects of the disclosure relate to round trip time (RTT) estimation procedures.

Relevant Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., LTE or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In one aspect, a method for determining a round-trip time (RTT) for signals between a user equipment (UE) and a plurality of network nodes (gNodeBs) in a wireless network performed by the UE, includes transmitting, to at least a first gNodeB and a second gNodeB, an uplink RTT reference signal; receiving, from each of the first gNodeB and the second gNodeB, downlink RTT reference signals, wherein each of the first gNodeB and the second gNodeB measure signaling data related to the uplink RTT reference signal and the downlink RTT reference signal transmitted by the first gNodeB and the second gNodeB, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; receiving, from a single entity in the wireless network, an aggregated report of the measured signaling data for the first gNodeB and the second gNodeB; and calculating a net RTT between the UE and each of the first gNodeB and the second gNodeB based on the measured signaling data for the first gNodeB and the second gNodeB received in the aggregated report and corresponding signaling data measured by the UE, wherein the corresponding signaling data comprises one of a total RTT between the TOT of the uplink RTT reference signal and the TOA of the downlink RTT reference signal or a processing delay between the TOA of the downlink RTT reference signal and a TOT of the downlink RTT reference signal, and the net RTT is determined using the total RTT and the processing delay.

In one aspect, a user equipment (UE) configured for determining a round-trip time (RTT) for signals between the UE and a plurality of network nodes (gNodeBs) in a wireless network, includes a transceiver of the UE configured to: transmit, to at least a first gNodeB and a second gNodeB, an uplink RTT reference signal; receive, from each of the first gNodeB and the second gNodeB, downlink RTT reference signals, wherein each of the first gNodeB and the second gNodeB measure signaling data related to the uplink RTT reference signal and the downlink RTT reference signal transmitted by the first gNodeB and the second gNodeB, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; receive, from a single entity in the wireless network, an aggregated report of the measured signaling data for the first gNodeB and the second gNodeB; at least one memory; and at least one processor of the UE coupled to the transceiver and the at least one memory and configured to calculate a net RTT between the UE and each of the first gNodeB and the second gNodeB based on the measured signaling data for the first gNodeB and the second gNodeB received in the aggregated report and corresponding signaling data measured by the UE, wherein the corresponding signaling data comprises one of a total RTT between the TOT of the uplink RTT reference signal and the TOA of the downlink RTT reference signal or a processing delay between the TOA of the downlink RTT reference signal and a TOT of the downlink RTT reference signal, and the net RTT is determined using the total RTT and the processing delay.

In one aspect, a user equipment (UE) configured for determining a round-trip time (RTT) for signals between the UE and a plurality of network nodes (gNodeBs) in a wireless network, includes means for transmitting, to at least a first gNodeB and a second gNodeB, an uplink RTT reference signal; means for receiving, from each of the first gNodeB and the second gNodeB, downlink RTT reference signals, wherein each of the first gNodeB and the second gNodeB measure signaling data related to the uplink RTT reference signal and the downlink RTT reference signal transmitted by the first gNodeB and the second gNodeB, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; means for receiving, from a single entity in the wireless network, an aggregated report of the measured signaling data for the first gNodeB and the second gNodeB; and means for calculating a net RTT between the UE and each of the first gNodeB and the second gNodeB based on the measured signaling data for the first gNodeB and the second gNodeB received in the aggregated report and corresponding signaling data measured by the UE, wherein the corresponding signaling data comprises one of a total RTT between the TOT of the uplink RTT reference signal and the TOA of the downlink RTT reference signal or a processing delay between the TOA of the downlink RTT reference signal and a TOT of the downlink RTT reference signal, and the net RTT is determined using the total RTT and the processing delay.

In one aspect, a non-transitory storage medium including program code stored thereon, the program code is operable to cause at least one processor in a user equipment (UE) to determine a round-trip time (RTT) for signals between the UE and a plurality of network nodes (gNodeBs) in a wireless network, includes program code to transmit, to at least a first gNodeB and a second gNodeB, an uplink RTT reference signal; program code to receive, from each of the first gNodeB and the second gNodeB, downlink RTT reference signals, wherein each of the first gNodeB and the second gNodeB measure signaling data related to the uplink RTT reference signal and the downlink RTT reference signal transmitted by the first gNodeB and the second gNodeB, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; program code to receive, from a single entity in the wireless network, an aggregated report of the measured signaling data for the first gNodeB and the second gNodeB; and program code to calculate a net RTT between the UE and each of the first gNodeB and the second gNodeB based on the measured signaling data for the first gNodeB and the second gNodeB received in the aggregated report and corresponding signaling data measured by the UE, wherein the corresponding signaling data comprises one of a total RTT between the TOT of the uplink RTT reference signal and the TOA of the downlink RTT reference signal or a processing delay between the TOA of the downlink RTT reference signal and a TOT of the downlink RTT reference signal, and the net RTT is determined using the total RTT and the processing delay.

In one aspect, a method for determining a round-trip time (RTT) for signals between a user equipment (UE) and a plurality of network nodes (gNodeBs) in a wireless network performed by a first gNodeB in the plurality of gNodeBs, includes receiving, from the UE, an uplink RTT reference signal; transmitting, to the UE, a downlink RTT reference signal; measuring signaling data related to the uplink RTT reference signal and the downlink RTT reference signal, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; and sending, to an entity in the wireless network other than the UE, a report of the signaling data.

In one aspect, a network node (first gNodeB) in a wireless network configured for determining a round-trip time (RTT) for signals between a user equipment (UE) and a plurality of network nodes (gNodeBs), includes at least one transceiver configured to: receive, from the UE, an uplink RTT reference signal; transmit, to the UE, a downlink RTT reference signal; at least one memory; and at least one processor coupled to the at least one transceiver and the at least one memory and configured to measuring signaling data related to the uplink RTT reference signal and the downlink RTT reference signal, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; and the at least one transceiver is further configured to: sending, to an entity in the wireless network other than the UE, a report of the signaling data.

In one aspect, a network node in a wireless network configured for determining a round-trip time (RTT) for signals between a user equipment (UE) and a plurality of network nodes (gNodeBs), includes means for receiving, from the UE, an uplink RTT reference signal; means for transmitting, to the UE, a downlink RTT reference signal; means for measuring signaling data related to the uplink RTT reference signal and the downlink RTT reference signal, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; and means for sending, to an entity in the wireless network other than the UE, a report of the signaling data.

In one aspect, a non-transitory storage medium including program code stored thereon, the program code is operable to cause at least one processor in a first network node (gNodeB) in a wireless network to operate for determining a round-trip time (RTT) for signals between a user equipment (UE) and a plurality of network nodes (gNodeBs) in the wireless network, includes program code to receive, from the UE, an uplink RTT reference signal; program code to transmit, to the UE, a downlink RTT reference signal; program code to measure signaling data related to the uplink RTT reference signal and the downlink RTT reference signal, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; and program code to send, to an entity in the wireless network other than the UE, a report of the signaling data.

In one aspect, a method for determining a round-trip time (RTT) for signals between a user equipment (UE) and a plurality of network nodes (gNodeBs) in a wireless network performed by a first gNodeB in the plurality of gNodeBs, includes receiving, from the UE, an uplink RTT reference signal; transmitting, to the UE, a downlink RTT reference signal; measuring, by the first gNodeB, first signaling data related to the uplink RTT reference signal and the downlink RTT reference signal, wherein the first signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; receiving, from a second gNodeB, a report of a second signaling data measured by the second gNodeB related to the uplink RTT reference signal received by the second gNodeB and a second downlink RTT reference signal transmitted by the second gNodeB, wherein the second signaling data comprises one of a second processing delay between a TOA of the uplink RTT reference signal at the second gNodeB and a TOT of the second downlink RTT reference signal or a second total RTT between the TOT of the second downlink RTT reference signal and the TOA of the second uplink RTT reference signal; aggregating the signaling data and the second signaling data; and transmitting, to the UE, an aggregated report of the signaling data and the second signaling data.

In one aspect, a network node (first gNodeB) in a wireless network configured for determining a round-trip time (RTT) for signals between a user equipment (UE) and a plurality of network nodes (gNodeBs), includes at least one transceiver configured to: receive, from the UE, an uplink RTT reference signal; transmit, to the UE, a downlink RTT reference signal; receive, from a second gNodeB, a report of a second signaling data measured by the second gNodeB related to the uplink RTT reference signal received by the second gNodeB and a second downlink RTT reference signal transmitted by the second gNodeB, wherein the second signaling data comprises one of a second processing delay between a TOA of the uplink RTT reference signal at the second gNodeB and a TOT of the second downlink RTT reference signal or a second total RTT between the TOT of the second downlink RTT reference signal and the TOA of the second uplink RTT reference signal; at least one memory; and at least one processor coupled to the at least one transceiver and the at least one memory and configured to: measure, by the first gNodeB, first signaling data related to the uplink RTT reference signal and the downlink RTT reference signal, wherein the first signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; aggregate the signaling data and the second signaling data; and wherein the at least one transceiver is further configured to transmit, to the UE, an aggregated report of the signaling data and the second signaling data.

In one aspect, a network node (first gNodeB) in a wireless network configured for determining a round-trip time (RTT) for signals between a user equipment (UE) and a plurality of network nodes (gNodeBs), includes means for receiving, from the UE, an uplink RTT reference signal; means for transmitting, to the UE, a downlink RTT reference signal; means for measuring, by the first gNodeB, first signaling data related to the uplink RTT reference signal and the downlink RTT reference signal, wherein the first signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; means for receiving, from a second gNodeB, a report of a second signaling data measured by the second gNodeB related to the uplink RTT reference signal received by the second gNodeB and a second downlink RTT reference signal transmitted by the second gNodeB, wherein the second signaling data comprises one of a second processing delay between a TOA of the uplink RTT reference signal at the second gNodeB and a TOT of the second downlink RTT reference signal or a second total RTT between the TOT of the second downlink RTT reference signal and the TOA of the second uplink RTT reference signal; means for aggregating the signaling data and the second signaling data; and means for transmitting, to the UE, an aggregated report of the signaling data and the second signaling data.

In one aspect, a non-transitory storage medium including program code stored thereon, the program code is operable to cause at least one processor in a first network node (gNodeB) in a wireless network to operate for determining a round-trip time (RTT) for signals between a user equipment (UE) and a plurality of network nodes (gNodeBs) in the wireless network, includes program code to receive, from the UE, an uplink RTT reference signal; program code to transmit, to the UE, a downlink RTT reference signal; program code to measure, by the first gNodeB, first signaling data related to the uplink RTT reference signal and the downlink RTT reference signal, wherein the first signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; program code to receive, from a second gNodeB, a report of a second signaling data measured by the second gNodeB related to the uplink RTT reference signal received by the second gNodeB and a second downlink RTT reference signal transmitted by the second gNodeB, wherein the second signaling data comprises one of a second processing delay between a TOA of the uplink RTT reference signal at the second gNodeB and a TOT of the second downlink RTT reference signal or a second total RTT between the TOT of the second downlink RTT reference signal and the TOA of the second uplink RTT reference signal; program code to aggregate the signaling data and the second signaling data; and program code to transmit, to the UE, an aggregated report of the signaling data and the second signaling data.

In one aspect, a method for determining a location for a first user equipment (UE) using round-trip time (RTT) for signals between the first UE and a plurality of network nodes (gNodeBs) in a wireless network performed by a location server, includes receiving, from a first gNodeB, a report of first signaling data related to a time of arrival (TOA) of uplink RTT reference signals received by the first gNodeB from a plurality of UEs including the first UE and time of transmission (TOT) of downlink RTT reference signals transmitted by the first gNodeB to each of the plurality of UEs, wherein for each UE in the plurality of UEs, the first signaling data comprises one of a processing delay between the TOA of the uplink RTT reference signal and the TOT of the downlink RTT reference signal or a total RTT between the TOT of the downlink RTT reference signal and the TOA of the uplink RTT reference signal; receiving, from a second gNodeB, a report of second signaling data related to the TOA of uplink RTT reference signals received by the second gNodeB from the plurality of UEs including the first UE and TOT of downlink RTT reference signals transmitted by the second gNodeB to each of the plurality of UEs, wherein for each UE in the plurality of UEs, the second signaling data comprises one of the processing delay between the TOA of the uplink RTT reference signal and the TOT of the downlink RTT reference signal or the total RTT between the TOT of the downlink RTT reference signal and the TOA of the uplink RTT reference signal; and aggregating, for the first UE in the plurality of UEs, the first signaling data and the second signaling data; and wherein the location of the UE is determined using at least a net RTT between the first UE and each of the first gNodeB and the second gNodeB, wherein the net RTT is determined using the first signaling data and the second signaling data aggregated for the first UE.

In one aspect, a network node (location server) in a wireless network configured for determining a location for a first user equipment (UE) using round-trip time (RTT) for signals between the first UE and a plurality of network nodes (gNodeBs), includes at least one network interface configured to: receive, from a first gNodeB, a report of first signaling data related to a time of arrival (TOA) of uplink RTT reference signals received by the first gNodeB from a plurality of UEs including the first UE and time of transmission (TOT) of downlink RTT reference signals transmitted by the first gNodeB to each of the plurality of UEs, wherein for each UE in the plurality of UEs, the first signaling data comprises one of a processing delay between the TOA of the uplink RTT reference signal and the TOT of the downlink RTT reference signal or a total RTT between the TOT of the downlink RTT reference signal and the TOA of the uplink RTT reference signal; receive, from a second gNodeB, a report of second signaling data related to the TOA of uplink RTT reference signals received by the second gNodeB from the plurality of UEs including the first UE and TOT of downlink RTT reference signals transmitted by the second gNodeB to each of the plurality of UEs, wherein for each UE in the plurality of UEs, the second signaling data comprises one of the processing delay between the TOA of the uplink RTT reference signal and the TOT of the downlink RTT reference signal or the total RTT between the TOT of the downlink RTT reference signal and the TOA of the uplink RTT reference signal; and at least one memory; and at least one processor coupled to the at least one network interface and the at least one memory and configured to aggregate, for the first UE in the plurality of UEs, the first signaling data and the second signaling data; and wherein the location of the UE is determined using at least a net RTT between the first UE and each of the first gNodeB and the second gNodeB, wherein the net RTT is determined using the first signaling data and the second signaling data aggregated for the first UE.

In one aspect, a network node (location server) in a wireless network configured for determining a location for a first user equipment (UE) using round-trip time (RTT) for signals between the first UE and a plurality of network nodes (gNodeBs), includes means for receiving, from a first gNodeB, a report of first signaling data related to a time of arrival (TOA) of uplink RTT reference signals received by the first gNodeB from a plurality of UEs including the first UE and time of transmission (TOT) of downlink RTT reference signals transmitted by the first gNodeB to each of the plurality of UEs, wherein for each UE in the plurality of UEs, the first signaling data comprises one of a processing delay between the TOA of the uplink RTT reference signal and the TOT of the downlink RTT reference signal or a total RTT between the TOT of the downlink RTT reference signal and the TOA of the uplink RTT reference signal; means for receiving, from a second gNodeB, a report of second signaling data related to the TOA of uplink RTT reference signals received by the second gNodeB from the plurality of UEs including the first UE and TOT of downlink RTT reference signals transmitted by the second gNodeB to each of the plurality of UEs, wherein for each UE in the plurality of UEs, the second signaling data comprises one of the processing delay between the TOA of the uplink RTT reference signal and the TOT of the downlink RTT reference signal or the total RTT between the TOT of the downlink RTT reference signal and the TOA of the uplink RTT reference signal; and means for aggregating, for the first UE in the plurality of UEs, the first signaling data and the second signaling data; and wherein the location of the UE is determined using at least a net RTT between the first UE and each of the first gNodeB and the second gNodeB, wherein the net RTT is determined using the first signaling data and the second signaling data aggregated for the first UE.

In one aspect, a non-transitory storage medium including program code stored thereon, the program code is operable to cause at least one processor in a location server to operate for determining location for a first user equipment (UE) using round-trip time (RTT) for signals between the first UE and a plurality of network nodes (gNodeBs) in a wireless network comprising: program code to receive, from a first gNodeB, a report of first signaling data related to a time of arrival (TOA) of uplink RTT reference signals received by the first gNodeB from a plurality of UEs including the first UE and time of transmission (TOT) of downlink RTT reference signals transmitted by the first gNodeB to each of the plurality of UEs, wherein for each UE in the plurality of UEs, the first signaling data comprises one of a processing delay between the TOA of the uplink RTT reference signal and the TOT of the downlink RTT reference signal or a total RTT between the TOT of the downlink RTT reference signal and the TOA of the uplink RTT reference signal; program code to receive, from a second gNodeB, a report of second signaling data related to the TOA of uplink RTT reference signals received by the second gNodeB from the plurality of UEs including the first UE and TOT of downlink RTT reference signals transmitted by the second gNodeB to each of the plurality of UEs, wherein for each UE in the plurality of UEs, the second signaling data comprises one of the processing delay between the TOA of the uplink RTT reference signal and the TOT of the downlink RTT reference signal or the total RTT between the TOT of the downlink RTT reference signal and the TOA of the uplink RTT reference signal; and program code to aggregate, for the first UE in the plurality of UEs, the first signaling data and the second signaling data; and wherein the location of the UE is determined using at least a net RTT between the first UE and each of the first gNodeB and the second gNodeB, wherein the net RTT is determined using the first signaling data and the second signaling data aggregated for the first UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
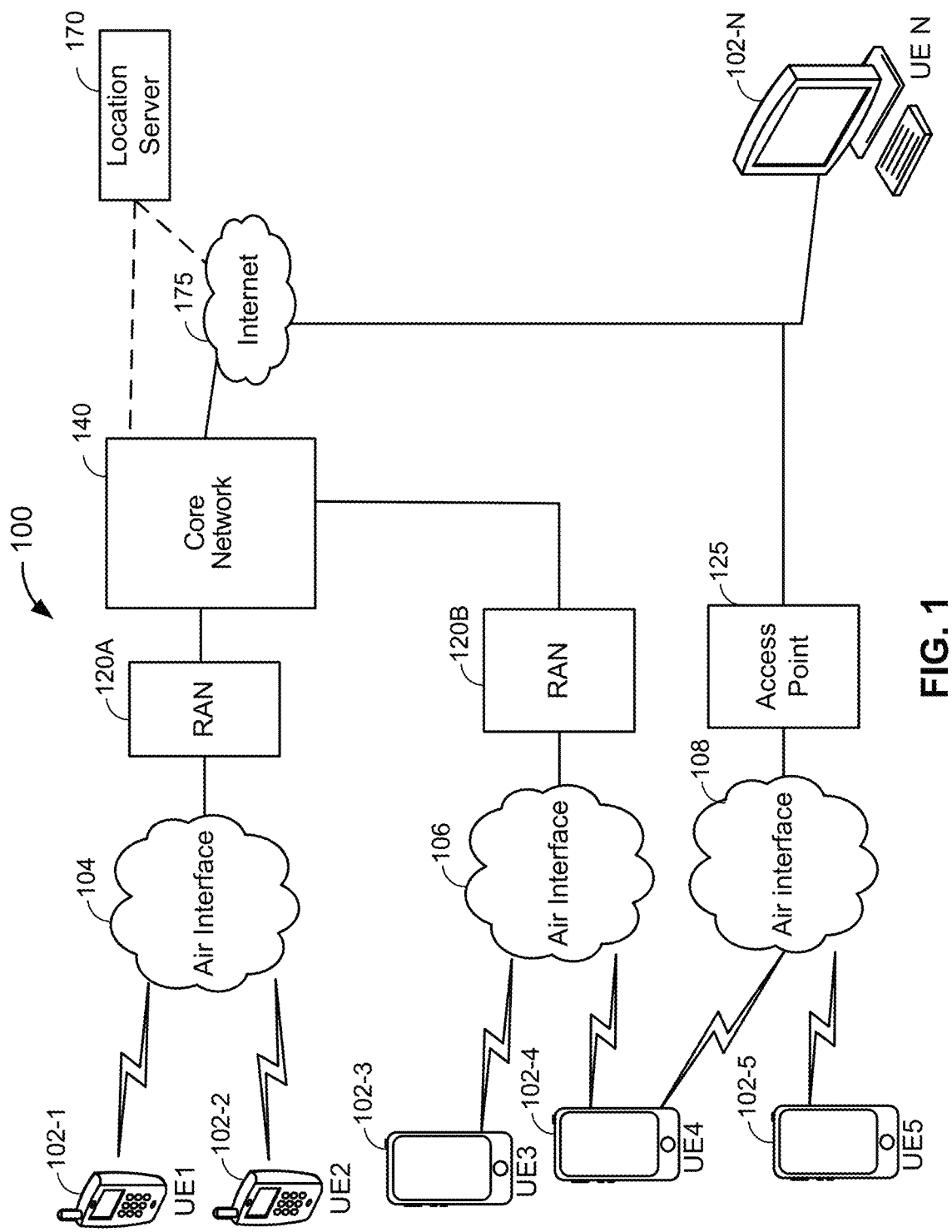
FIG. 1 illustrates a high-level system architecture of a wireless communications system in accordance with an aspect of the disclosure.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 102-1, 102-2, 102-3, 102-4, 102-5, and 102-N of a UE are shown in FIG. 1. A reference to a UE 102 then refers to any of UEs 102-1, 102-2, 102-3, 102-4, 102-5, and 102-N.

DETAILED DESCRIPTION

Disclosed are techniques for calculating a RTT of a UE. In an aspect, a gNodeB sends to the UE, one or more downlink RTT measurement signals during one or more predefined symbol of a downlink subframe, sends, to the UE, a command to report an arrival time of each of the one or more downlink RTT measurement signals, receives, from the UE, a RTT report comprising a combination of the arrival time of each of the one or more downlink RTT measurement signals relative to a downlink subframe timing of the UE and an uplink timing adjust parameter of the UE, and calculates a RTT between the UE and the gNodeB based on a combination of the arrival time of the one or more downlink RTT measurement signals, the timing adjust parameter, and an arrival time of the RTT report at the gNodeB relative to a system time of the gNodeB.

Also disclosed are techniques for calculating RTT at a UE. In an aspect, the UE receives, from a first gNodeB, a control signal instructing the UE to send an uplink RTT measurement signal during a predefined resource block of a subframe, transmits, to one or more gNodeBs, the uplink RTT measurement signal during the predefined resource block of the subframe, wherein at least one gNodeB of the one or more gNodeBs measures an arrival time of the uplink RTT measurement signal relative to a downlink subframe timing of the at least one gNodeB, receives, from the first gNodeB, an instruction to look for an RTT response from the at least one gNodeB, receives, from the at least one gNodeB, the RTT response, the RTT response including the arrival time of the uplink RTT measurement signal, and calculates an RTT between the UE and the at least one gNodeB based on an arrival time of the RTT response, a timing adjust parameter, and the arrival time of the uplink RTT measurement signal relative to a downlink system time of the UE.

These techniques and other aspects are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A mobile device, also referred to herein as a UE, may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an aspect of the disclosure. The wireless communications system 100 contains UEs 1 to N (referenced as 102-1 to 102-N). The UEs 102-1 to 102-N can include cellular telephones, personal digital assistant (PDAs), pagers, a laptop computer, a tablet computer, a desktop computer, and so on. For example, in FIG. 1, UE 102-1 and UE 102-2 are illustrated as cellular feature phones, UEs 102-3, 102-4, and 102-5 are illustrated as cellular touchscreen phones, or "smartphones," and UE 102-N is illustrated as a desktop computer, or personal computer (often referred to as a "PC"). Although only six UEs 102 are shown in FIG. 1, the number of UEs 102 in wireless communications system 100 may be in the hundreds, thousands, or millions (e.g., N may be any number up to or greater than one million).

Referring to FIG. 1, UEs 102-1 to 102-N are configured to communicate with one or more access networks (e.g., the RANs 120A and 120B, the access point 125, etc.) over a physical communications interface or layer, shown in FIG. 1 as air interfaces 104, 106, and 108 and/or a direct wired connection. The air interfaces 104 and 106 can comply with a given cellular communications protocol (e.g., Code Division Multiple Access (CDMA), Evolution-Data Optimized (E-VDO), Enhanced High Rate Packet Data (eHRPD), Global System for Mobile communications (GSM), Wideband CDMA (W-CDMA), LTE, LTE-U, 5G NR, etc.), while the air interface 108 can comply with a Wireless Local Area Network (WLAN) protocol (e.g., IEEE 802.11). Both RAN 120A and 120B may include a plurality of access points that serve UEs over air interfaces, such as the air interfaces 104 and 106. The access points in the RAN 120A and 120B can be referred to as access nodes (ANs), access points (APs), base stations (BSs), Node Bs, eNodeBs, gNodeBs, and so on. For example, an eNodeB (also referred to as an evolved NodeB) is typically a base station that supports wireless access by UEs 102 according to the LTE wireless interface defined by 3GPP. As another example, a gNodeB, or gNB, is typically a base station that supports wireless access by UEs 102 according to the 5G NR wireless interface. These access points can be terrestrial access points (or ground stations), or satellite access points.

Both RANs 120A and 120B are configured to connect to a core network 140 that can perform a variety of functions, including routing and connecting circuit switched (CS) calls between UEs 102 served by the RAN 120A/120B and other UEs 102 served by the RAN 120A/120B or UEs served by a different RAN altogether, and can also mediate an exchange of packet-switched (PS) data with external networks such as Internet 175 and external clients and servers.

The Internet 175 includes a number of routing agents and processing agents (not shown in FIG. 1 for the sake of convenience). In FIG. 1, UE 102-N is shown as connecting to the Internet 175 directly (i.e., separate from the core network 140, such as over an Ethernet connection of WiFi or 802.11-based network). The Internet 175 can thereby function to route and connect packet-switched data communications between UE 102-N and UEs 102-1 to 102-5 via the core network 140.

Also shown in FIG. 1 is the access point 125 that is separate from the RANs 120A and 120B. The access point 125 may be connected to the Internet 175 independently of the core networks 140 (e.g., via an optical communication system such as FiOS, a cable modem, etc.). The air interface 108 may serve UE 102-4 or UE 102-5 over a local wireless connection, such as IEEE 802.11 in an example. UE 102-N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a location server 170 is shown as connected to the Internet 175 and the core network 140. The location server 170 can be implemented as a plurality of structurally separate servers, or alternately may each correspond to a single server. As will be described below in more detail, the location server 170 is configured to support one or more location services for UEs 102 that can connect to the location server 170 via the core network 140 and/or via the Internet 175.

An example of a protocol-specific implementation for the RANs 120A and 120B and the core network 140 is provided below with respect to FIG. 2 to help explain the wireless communications system 100 in more detail. In particular, the components of the RANs 120A and 120B and the core network 140 correspond to components associated with supporting packet-switched (PS) communications, whereby legacy circuit-switched (CS) components may also be present in these networks, but any legacy CS-specific components are not shown explicitly in FIG. 2.

Figure 2:
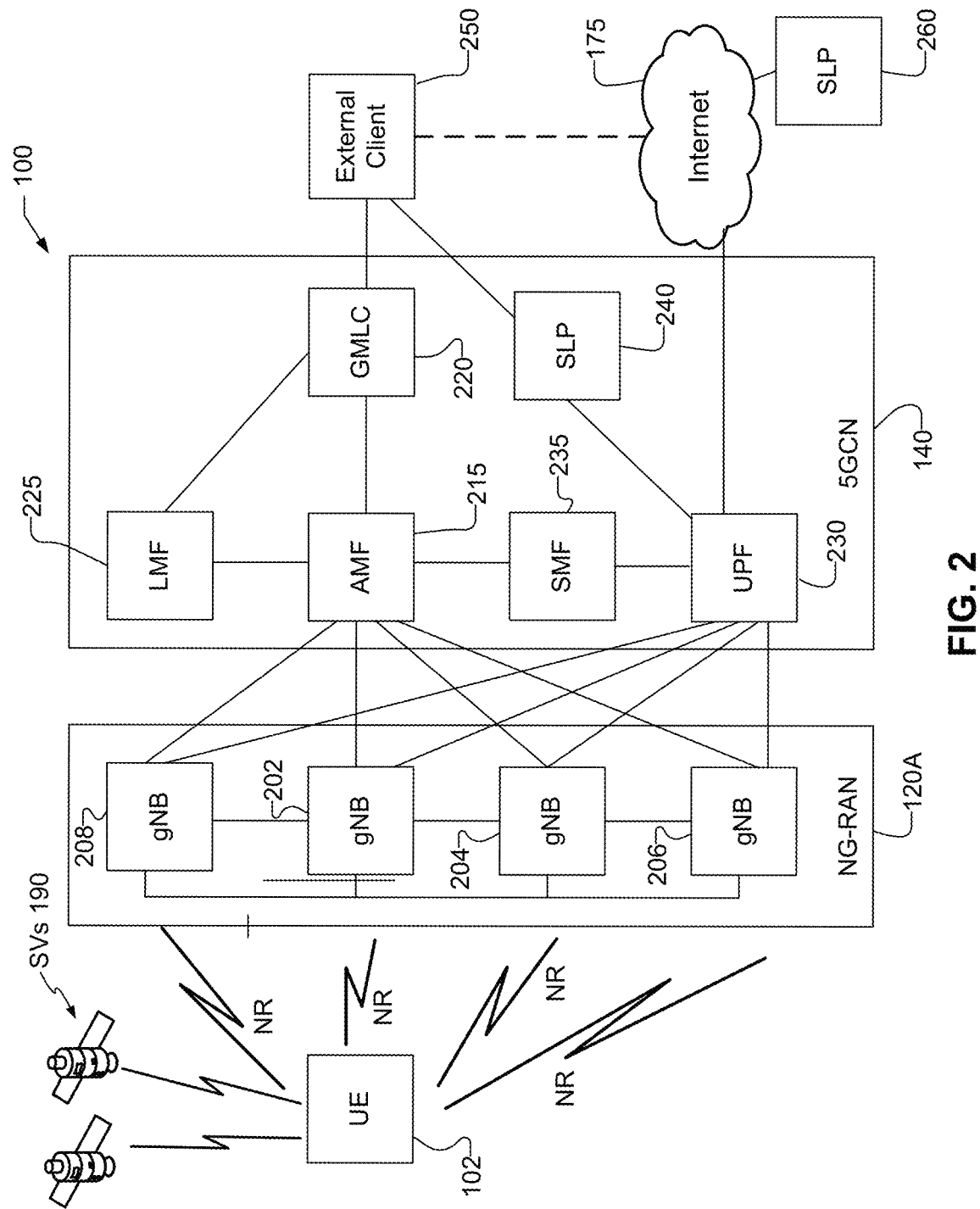
FIG. 2 illustrates an example configuration of radio access networks (RANs) and a packet-switched portion of a core network that is based on an LTE network in accordance with an aspect of the disclosure.

FIG. 2 shows an architecture based on a non-roaming 5G NR network to support UE positioning using RTT measurements. FIG. 2 illustrates a communication system 100 that comprises a UE 102, which is sometimes referred to herein as a "target UE", since UE 102 may be the target of a location request. FIG. 2 also shows components of a Fifth Generation (5G) network comprising a Next Generation Radio Access Network (NG-RAN) 120A, which includes base stations (BSs) sometimes referred to as New Radio (NR) NodeBs or gNBs 202, 204, 206, and 208, and a 5G Core Network (5GCN) 140 that is in communication with an external client 250. A 5G network may also be referred to as a New Radio (NR) network; NG-RAN 120A may be referred to as an NR RAN or a 5G RAN; and 5GCN 140 may be referred to as an Next Generation (NG) Core network (NGC). The communication system 100 may further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

FIG. 2 shows a serving gNB 202 for the target UE 102 and neighbor gNBs 204, 206, and 208. A neighbor gNB may be any gNB which is able to receive and measure uplink (UL) signals transmitted by the target UE 102 and/or is able to transmit a downlink (DL) reference signal (RS) that can be received and measured by the target UE 102.

Entities in the NG-RAN 120A which transmit DL reference signals (RSs) to be measured by a target UE 102 for a particular location session are referred to generically as "Transmission Points" (TPs) and can include one or more of the serving gNB 202, and neighbor gNBs 204, 206, and 208.

Entities in the NG-RAN 120A which receive and measure UL signals (e.g. an RS) transmitted by a target UE 102 for a particular location session are referred to generically as "Reception Points" (RPs) and can include one or more of the serving gNB 202, and neighbor gNBs 204, 206, and 208.

It should be noted that FIG. 2 provides only a generalized illustration of various components, any or all of which may be utilized as appropriate, and each of which may be duplicated or omitted as necessary. Specifically, although only one UE 102 is illustrated, it will be understood that many UEs (e.g., hundreds, thousands, millions, etc.) may utilize the communication system 100. Similarly, the communication system 100 may include a larger or smaller number of SVs 190, gNBs 202-208, external clients 250, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 2 illustrates a 5G-based network, similar network implementations and configurations may be used for other communication technologies, such as 3G, Long Term Evolution (LTE), and IEEE 802.11 WiFi etc. For example, where a Wireless Local Area Network (WLAN), e.g., IEEE 802.11 radio interface, is used, the UE 102 may communicate with an Access Network (AN), as opposed to an NG-RAN, and accordingly, component 120A is sometimes referred to herein as an AN or as a RAN, denoted by the term "RAN", "(R)AN" or "(R)AN 120A". In the case of an AN (e.g. IEEE 802.11 AN), the AN may be connected to a Non-3GPP Interworking Function (N3IWF) (e.g. in 5GCN 140) (not shown in FIG. 2), with the N3IWF connected to AMF 215.

The target UE 102, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. The target UE 102 may be a stand-alone device or may be embedded in another device, e.g., a factory tool, that is to be monitored or tracked. Moreover, UE 102 may correspond to a smart watch, digital glasses, fitness monitor, smart car, smart appliance, cellphone, smartphone, laptop, tablet, PDA, tracking device, control device or some other portable or moveable device. The UE 102 may include a single entity or may include multiple entities such as in a personal area network where a user may employ audio, video and/or data I/O devices and/or body sensors and a separate wireline or wireless modem. Typically, though not necessarily, the UE 102 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 120A and 5GCN 140), etc. The UE 102 may also support wireless communication using a Wireless Local Area Network (WLAN) which may connect to other networks (e.g. the Internet) using a Digital Subscriber Line (DSL) or packet cable for example. The use of one or more of these RATs may allow the UE 102 to communicate with an external client 250 (e.g. via elements of 5GCN 140 not shown in FIG. 2, or possibly via a Gateway Mobile Location Center (GMLC) 220, and/or allow the external client 250 to receive location information regarding the UE 102 (e.g., via the GMLC 220).

The UE 102 may enter a connected state with a wireless communication network that may include the NG-RAN 120A. In one example, the UE 102 may communicate with a cellular communication network by transmitting wireless signals to, or receiving wireless signals from a cellular transceiver, in the NG-RAN 120A, such as a gNB 202. A transceiver provides user and control planes protocol terminations toward the UE 102 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 102 may have circuitry and processing resources capable of obtaining location related measurements. Location related measurements obtained by UE 102 may include measurements of signals received from satellite vehicles (SVs) 190 belonging to a Satellite Positioning System (SPS) or Global Navigation Satellite System (GNSS) such as GPS, GLONASS, Galileo or Beidou and/or may include measurements of signals received from terrestrial transmitters fixed at known locations (e.g., such as gNBs). UE 102 or gNB 202 to which UE 102 may send the measurements, may then obtain a location estimate for the UE 102 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, or Enhanced Cell ID (ECID) or combinations thereof. In some of these techniques (e.g. A-GNSS, AFLT and OTDOA), pseudoranges or timing differences may be measured at UE 102 relative to three or more terrestrial transmitters (e.g. gNBs) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 102.

The location server 170 in FIG. 1 may correspond to, e.g., Location Management Function (LMF) 225 or Secure User Plane Location (SUPL) Location Platform (SLP) 240, may be capable of providing positioning assistance data to UE 102 including, for example, information regarding signals to be measured (e.g., expected signal timing, signal coding, signal frequencies, signal Doppler), locations and identities of terrestrial transmitters (e.g. gNBs) and/or signal, timing and orbital information for GNSS SVs to facilitate positioning techniques such as A-GNSS, AFLT, OTDOA and ECID. The facilitation may include improving signal acquisition and measurement accuracy by UE 102 and, in some cases, enabling UE 102 to compute its estimated location based on the location measurements. For example, a location server (e.g. LMF 225 or SLP 240) may comprise an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g. a gNB) such as transmission power and signal timing. A UE 102 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a receive time-transmission time difference (Rx–Tx), or a round trip signal propagation time (RTT) between UE 102 and a cellular transceiver (e.g. a gNB) or a local transceiver (e.g. a WiFi access point (AP)). A UE 102 may use these measurements together with assistance data (e.g. terrestrial almanac data or GNSS satellite data such as GNSS Almanac and/or GNSS Ephemeris information) received from a location server (e.g. LMF 225 or SLP 240) or broadcast by a base station (e.g. a gNB 202-208) in NG-RAN 120A to determine a location for UE 102.

In some implementations, network entities are used to assist in location of a target UE 102. For example, entities in a network such as gNBs 202-208 may measure UL signals transmitted by UE 102. The UL signals may include or comprise UL reference signals such as UL positioning reference signals (PRSs) or UL Sounding Reference Signals (SRSs). The entities obtaining the location measurements (e.g. gNBs 202-208) may then transfer the location measurements to the UE 102, which may use the measurements to determine RTDs for multiple transceiver pairs. Examples of UL location measurements can include an RSSI, RSRP, RSRQ, TOA, Rx-Tx, AOA and RTT.

An estimate of a location of the UE 102 may be referred to as a location, location estimate, location fix, fix, position, position estimate or position fix, and may be geographic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of the UE 102 may also be expressed as an area or volume (defined either geographically or in civic form) within which the UE 102 is expected to be located with some probability or confidence level (e.g., 67%, 95%, etc.). A location of the UE 102 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. The location may be expressed as an absolute location estimate for the UE, such as location coordinates or address, or as a relative location estimate for the UE, such as a distance and direction from a previous location estimate or from a known absolute location. The location of the UE may include a linear velocity, an angular velocity, a linear acceleration, an angular acceleration, an angular orientation for the UE, e.g., the orientation of the UE relative to a fixed global or local coordinate system, an identification of a trigger event for locating the UE, or some combination of these. For example, trigger events may include an area event, a motion event or a velocity event. An area event, for example, may be the UE moving into a defined area, moving out of the area and/or remaining in the area. A motion event, for example, may include movement of the UE by a threshold straight line distance or threshold distance along a UE trajectory. A velocity event, for example, may include the UE attaining a minimum or maximum velocity, a threshold increase and/or decrease of velocity, and/or a threshold change in direction. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 2, pairs of gNBs in NG-RAN 120A may be connected to one another, e.g., directly as shown in FIG. 2 or indirectly via other gNBs 202-208. Access to the 5G network is provided to UE 102 via wireless communication between the UE 102 and one or more of the gNBs 202-208, which may provide wireless communication access to the 5GCN 140 on behalf of the UE 102 using 5G (e.g. NR). In FIG. 2, the serving gNB for UE 102 is assumed to be gNB 202, although other gNBs (e.g. gNB 204, 206, or 208) may act as a serving gNB if UE 102 moves to another location or may act as a secondary gNB to provide additional throughout and bandwidth to UE 102. Some gNBs in FIG. 2 (e.g. gNB 204, 206, or 208) may be configured to function as positioning-only beacons which may transmit signals (e.g. directional PRS) to assist positioning of UE 102 but may not receive signals from UE 102 or from other UEs.

As noted, while FIG. 2 depicts nodes configured to communicate according to 5G communication protocols, nodes configured to communicate according to other communication protocols, such as, for example, LTE protocols, may be used. Such nodes, configured to communicate using different protocols, may be controlled, at least in part, by the 5GCN 140. Thus, the NG-RAN 120A may include any combination of gNBs, evolved Node Bs (eNBs) supporting LTE, or other types of base stations or access points. As an example, NG-RAN 120A may include one or more next generation eNBs (ng-eNBs), not shown, which provide LTE wireless access to UE 102 and may connect to entities in 5GCN 140 such as AMF 215.

The gNBs 202, 204, 206, and 208 can communicate with the Access and Mobility Management Function (AMF) 215, which, for positioning functionality, may communicate with a Location Management Function (LMF) 225. The AMF 215 may support mobility of the UE 102, including cell change and handover and may participate in supporting a signaling connection to the UE 102 and possibly helping establish and release Protocol Data Unit (PDU) sessions for UE 102 supported by the UPF 230. Other functions of AMF 215 may include: termination of a control plane (CP) interface from NG-RAN 120A; termination of Non-Access Stratum (NAS) signaling connections from UEs such as UE 102, NAS ciphering and integrity protection; registration management; connection management; reachability management; mobility management; access authentication and authorization.

The gNB 202 may support positioning of the UE 102 when UE 102 accesses the NG-RAN 120A. The gNB 202 may also process location service requests for the UE 102, e.g., received directly or indirectly from the GMLC 220. In some embodiments, a node/system that implements the gNB 202 may additionally or alternatively implement other types of location-support modules, such as an Enhanced Serving Mobile Location Center (E-SMLC) or a Secure User Plane Location (SUPL) Location Platform (SLP) 240. It will be noted that in some embodiments, at least part of the positioning functionality (including derivation of UE 102's location) may be performed at the UE 102 (e.g., using signal measurements for signals transmitted by wireless nodes, and assistance data provided to the UE 102).

The GMLC 220 may support a location request for the UE 102 received from an external client 250 and may forward such a location request to a serving AMF 215 for UE 102. The AMF 215 may then forward the location request to either gNB 202 or LMF 225 which may obtain one or more location estimates for UE 102 (e.g. according to the request from external client 250) and may return the location estimate(s) to AMF 215, which may return the location estimate(s) to external client 250 via GMLC 220. GMLC 220 may contain subscription information for an external client 250 and may authenticate and authorize a location request for UE 102 from external client 250. GMLC 220 may further initiate a location session for UE 102 by sending a location request for UE 102 to AMF 215 and may include in the location request an identity for UE 102 and the type of location being requested (e.g. such as a current location or a sequence of periodic or triggered locations).

As further illustrated in FIG. 2, an external client 250 may be connected to the core network 140 via the GMLC 220 and/or the SLP 240. The external client 250 may optionally be connected to the core network 140 and/or to an SLP 260, that is external to 5GCN 140, via the Internet 175. The external client 250 may be a server, a web server, or a user device, such as a personal computer, a UE, etc.

The LMF 225 and the gNB 202 may communicate using a New Radio Position Protocol A (which may be referred to as NPPa or NRPPa). NRPPa may be defined in 3GPP TS 38.455, with NRPPa messages being transferred between the gNB 202 and the LMF 225. Further, the LMF 225 and UE 102 may communicate using the LTE Positioning Protocol (LPP) defined in 3GPP TS 36.355, where LPP messages are transferred between the UE 102 and the LMF 225 via the serving AMF 215 and the serving gNB 202 for UE 102. For example, LPP messages may be transferred between the AMF 215 and the UE 102 using a 5G Non-Access Stratum (NAS) protocol. The LPP protocol may be used to support positioning of UE 102 using UE assisted and/or UE based position methods such as Assisted GNSS (A-GNSS), Real Time Kinematics (RTK), Wireless Local Area Network (WLAN), Observed Time Difference of Arrival (OTDOA), Round-Trip Time (RTT), and/or Enhanced Cell Identity (ECID). The NRPPa protocol may be used to support positioning of UE 102 using network based position methods such as ECID (when used with measurements obtained by or received from a gNB 202, 204, 206, or 208) and/or may be used by LMF 225 to obtain location related information from gNBs such as parameters defining positioning reference signal (PRS) transmission from gNBs for support of OTDOA.

GNBs 202, 204, 206, or 208 may communicate with AMF 215 using a Next Generation Application Protocol (NGAP), e.g. as defined in 3GPP Technical Specification (TS) 38.413, or using a location specific protocol (referred to here as LSP1) transported by NGAP. NGAP or the LSP1 may enable AMF 215 to request a location of a target UE 102 from a gNB 202 for target UE 102 and may enable gNB 202 to return a location for UE 102 to the AMF 215.

GNBs 202, 204, 206, or 208 may communicate with one another using an Xn Application Protocol (XnAP), e.g. as defined in 3GPP TS 38.423, or using a location specific protocol (referred to here as LSP2) transported by XnAP, which may be different to LSP1. XnAP or LSP2 may allow one gNB to request another gNB to obtain UL location measurements for a target UE and to return the UL location measurements. XnAP or LSP2 may also enable a gNB to request another gNB to transmit a downlink (DL) RS or PRS to enable a target UE 102 to obtain DL location measurements of the transmitted DL RS or PRS. In some embodiments, LSP2 (when used) may be same as or an extension to NRPPa.

A gNB (e.g. gNB 202) may communicate with a target UE 102 using a Radio Resource Control (RRC) protocol, e.g. as defined in 3GPP TS 38.331, or using a location specific protocol (referred to here as LSP3) transported by RRC, which may be different to LSP1 and LSP2. RRC or LSP3 may allow a gNB (e.g. gNB 202) to request location measurements from the target UE 102 of DL RSs or DL PRSs transmitted by the gNB 202 and/or by other gNBs 204, 206, or 208 and to return some or all of the location measurements. RRC or LSP3 may also enable a gNB (e.g. gNB 202) to request the target UE 102 to transmit an UL RS or PRS to enable the gNB 202 or other gNBs 204, 206, or 208 to obtain UL location measurements of the transmitted UL RS or PRS. In some embodiments, LSP3 (when used) may be same as or an extension to LPP.

With a UE assisted position method, UE 102 may obtain location measurements (e.g. measurements of RSSI, Rx-Tx, RTT, RSTD, RSRP and/or RSRQ for gNBs 202, 204, 206, or 208 or WLAN APs, or measurements of GNSS pseudorange, code phase and/or carrier phase for SVs 190) and send the measurements to an entity performing a location server function, e.g., LMF 225, or SLP 240, for computation of a location estimate for UE 102. With a UE based position method, UE 102 may obtain location measurements (e.g. which may be the same as or similar to location measurements for a UE assisted position method) and may compute a location of UE 102 (e.g. with the help of assistance data received from a location server such as LMF 225 or SLP 240). With a network based position method, one or more base stations (e.g. gNBs 202-208) or APs may obtain location measurements (e.g. measurements of RSSI, RTT, RSRP, RSRQ, Rx-Tx or TOA for signals transmitted by UE 102) and/or may receive measurements obtained by UE 102, and may send the measurements to a location server, e.g., LMF 225, for computation of a location estimate for UE 102.

Information provided by the gNBs 204, 206, or 208 to the gNB 202 using XnAP or LSP2 may include timing and configuration information for PRS transmission and location coordinates of the gNBs 204, 206, or 208. The gNB 202 can then provide some or all of this information to the UE 102 as assistance data in an RRC or LSP3 message. An RRC message sent from gNB 202 to UE 102 may include an embedded LSP3 message (e.g. an LPP message) in some implementations.

An RRC or LSP3 message sent from the gNB 202 to the UE 102 may instruct the UE 102 to do any of a variety of things, depending on desired functionality. For example, the RRC or LSP3 message could contain an instruction for the UE 102 to obtain measurements for GNSS (or A-GNSS), WLAN, and/or OTDOA (or some other position method) or to transmit uplink (UL) signals, such as Positioning Reference Signals, Sounding Reference Signals, or both. In the case of OTDOA, the RRC or LSP3 message may instruct the UE 102 to obtain one or more measurements (e.g. RSTD measurements) of PRS signals transmitted within particular cells supported by particular gNBs. The UE 102 may use the measurements to determine the position of UE 102, e.g., using OTDOA.

In some embodiments, LPP may be augmented by or replaced by an NR or NG positioning protocol (NPP or NRPP) which supports position methods such as OTDOA and ECID for NR radio access. For example, an LPP message may contain an embedded NPP message or may be replaced by an NPP message.

A gNB in NG-RAN 120A may also broadcast positioning assistance data to UEs such as UE 102.

As illustrated, a Session Management Function (SMF) 235 connects the AMF 215 and the UPF 230. The SMF 235 may have the capability to control both a local and a central UPF within a PDU session. SMF 235 may manage the establishment, modification and release of PDU sessions for UE 102, perform IP address allocation and management for UE 102, act as a Dynamic Host Configuration Protocol (DHCP) server for UE 102, and select and control a UPF 230 on behalf of UE 102.

The User Plane Function (UPF) 230 may support voice and data bearers for UE 102 and may enable UE 102 voice and data access to other networks such as the Internet 175. UPF 230 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 230 may be connected to SLP 240 to enable support of location of UE 102 using SUPL. SLP 240 may be further connected to or accessible from external client 250.

It should be understood that while FIG. 2 shows a network architecture for a non-roaming UE, with suitable, well-known, changes, a corresponding network architecture may be provided for a roaming UE.

Time intervals of a communications resource in LTE or 5G NR may be organized according to radio frames each having a duration of 10 milliseconds (ms). The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

Figure 3:
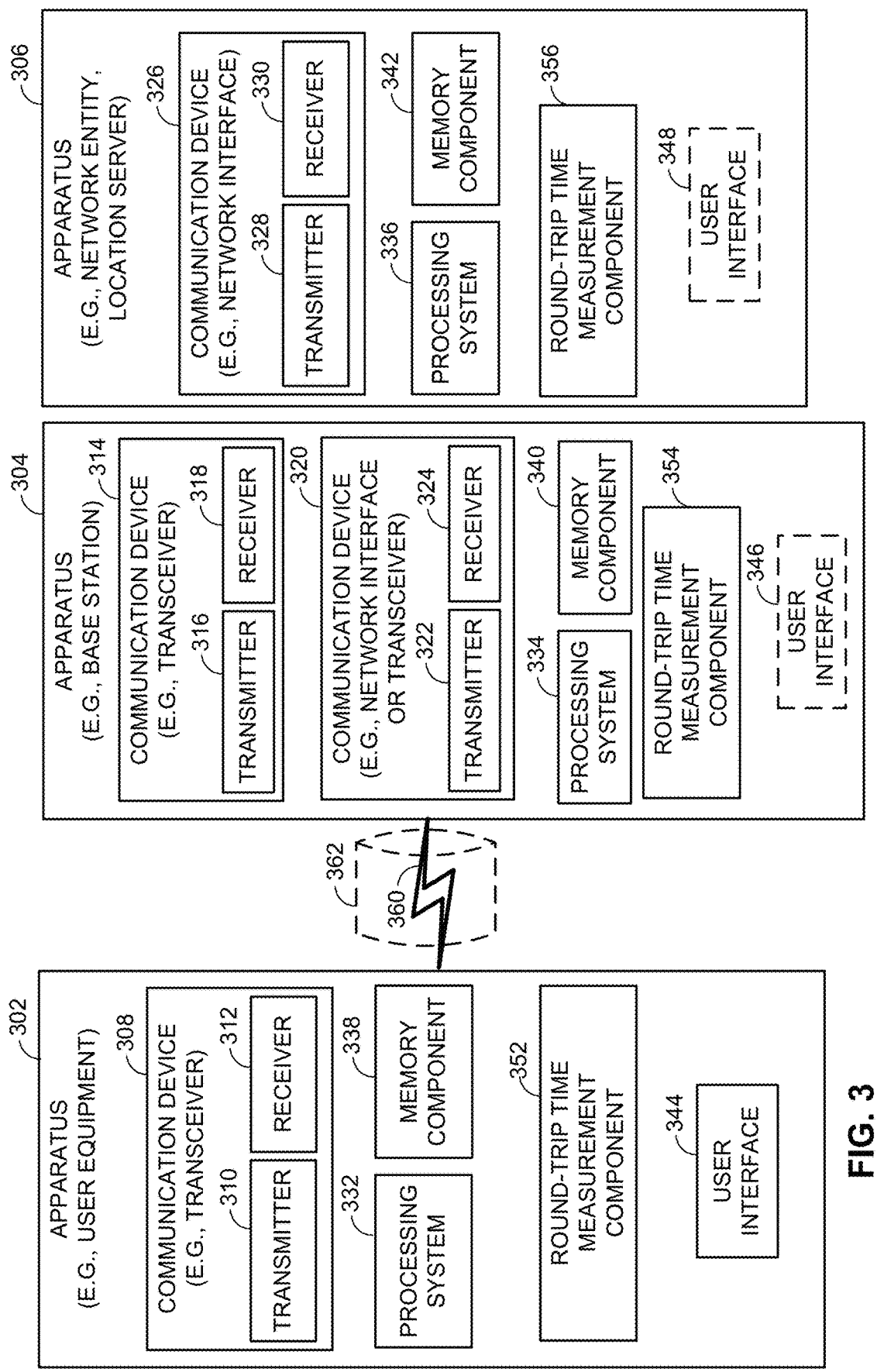
FIG. 3 is a simplified block diagram of several sample aspects of components that may be employed in wireless communication nodes and configured to support communication as taught herein.

FIG. 3 illustrates several sample components (represented by corresponding blocks) that may be incorporated into an apparatus 302, an apparatus 304, and an apparatus 306 (corresponding to, for example, a UE, a base station (e.g., an gNodeB), and a network entity or location server, respectively) to support the operations as disclosed herein. As an example, the apparatus 302 may correspond to a UE 102, the apparatus 304 may correspond to any of gNodeBs 202-206, and the apparatus 306 may correspond to the LMF 225, SLP 240, SLP 260, or GMLC 220. It will be appreciated that the components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 302 and the apparatus 304 each include at least one wireless communication device (represented by the communication devices 308 and 314) for communicating with other nodes via at least one designated radio access technology (RAT) (e.g., LTE, 5G NR). Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 304 may also comprise a Network Listen Module (NLM) or the like for performing various measurements.

The apparatus 304 and the apparatus 306 include at least one communication device (represented by the communication device 320 and the communication device 326) for communicating with other nodes. For example, the communication device 326 may comprise a network interface (e.g., one or more network access ports) that is configured to communicate with one or more network entities via a wire-based or wireless backhaul connection. In some aspects, the communication device 326 may be implemented as a transceiver configured to support wire-based or wireless signal communication. This communication may involve, for example, sending and receiving: messages, parameters, or other types of information. Accordingly, in the example of FIG. 3, the communication device 326 is shown as comprising a transmitter 328 and a receiver 330 (e.g., network access ports for transmitting and receiving). Similarly, the communication device 320 may comprise a network interface that is configured to communicate with one or more network entities via a wire-based or wireless backhaul. As with the communication device 326, the communication device 320 is shown as comprising a transmitter 322 and a receiver 324.

The apparatuses 302, 304, and 306 also include other components that may be used in conjunction with the operations as disclosed herein. The apparatus 302 includes a processing system 332 for providing functionality relating to, for example, RTT measurements in a licensed or unlicensed frequency band as disclosed herein and for providing other processing functionality. The apparatus 304 includes a processing system 334 for providing functionality relating to, for example, RTT measurements in a licensed or unlicensed frequency band as disclosed herein and for providing other processing functionality. The apparatus 306 includes a processing system 336 for providing functionality relating to, for example, RTT measurements in a licensed or unlicensed frequency band as disclosed herein and for providing other processing functionality. In an aspect, the processing systems 332, 334, and 336 may include, for example, one or more general purpose processors, multi-core processors, application-specific integrated circuits (ASICs), digital signal processors (DSPs), field programmable gate arrays (FPGA), or other programmable logic devices or processing circuitry.

The apparatuses 302, 304, and 306 include memory components 338, 340, and 342 (e.g., each including a memory device), respectively, for maintaining information (e.g., information indicative of reserved resources, thresholds, parameters, and so on). In addition, the apparatuses 302, 304, and 306 include user interface devices 344, 346, and 348, respectively, for providing indications (e.g., audible and/or visual indications) to a user and/or for receiving user input (e.g., upon user actuation of a sensing device such a keypad, a touch screen, a microphone, and so on).

For convenience, the apparatuses 302, 304, and/or 306 are shown in FIG. 3 as including various components that may be configured according to the various examples described herein. It will be appreciated, however, that the illustrated blocks may have different functionality in different designs.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, and 344 may be implemented by processor and memory component(s) of the apparatus 302 (e.g., by execution of appropriate code and/or by appropriate configuration of processor components). Similarly, some or all of the functionality represented by blocks 314, 320, 334, 340, and 346 may be implemented by processor and memory component(s) of the apparatus 304 (e.g., by execution of appropriate code and/or by appropriate configuration of processor components). Also, some or all of the functionality represented by blocks 326, 336, 342, and 348 may be implemented by processor and memory component(s) of the apparatus 306 (e.g., by execution of appropriate code and/or by appropriate configuration of processor components).

In an aspect, the apparatus 304 may correspond to a "small cell" or a Home gNodeB, such as Home gNodeB 202 in FIG. 2. The apparatus 302 may transmit and receive messages via a wireless link 360 with the apparatus 304, the messages including information related to various types of communication (e.g., voice, data, multimedia services, associated control signaling, etc.). The wireless link 360 may operate over a communication medium of interest, shown by way of example in FIG. 3 as the medium 362, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 304 and the apparatus 302 for the medium 362.

As a particular example, the medium 362 may correspond to at least a portion of an unlicensed frequency band shared with (an)other RAN and/or other APs and UEs. In general, the apparatus 302 and the apparatus 304 may operate via the wireless link 360 according to one or more radio access types, such as LTE, LTE-U, or 5G NR, depending on the network in which they are deployed. These networks may include, for example, different variants of CDMA networks (e.g., LTE networks, 5G NR networks, etc.), Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for wireless communications (e.g., by a government entity such as the Federal Communications Commission (FCC) in the United States), certain communication networks, in particular those employing small cell base stations, have extended operation into unlicensed frequency bands, such as the Unlicensed National Information Infrastructure (U-NII) band used by Wireless Local Area Network (WLAN) technologies, most notably IEEE 802.11x WLAN technologies generally referred to as "Wi-Fi," and LTE in unlicensed spectrum technologies generally referred to as "LTE-U" or "MuLTEFire."

Apparatus 302 may also include an RTT measurement component 352 that may be used to obtain location related measurements of signals (e.g., RTT or other signals) transmitted by a base station or AP (e.g., any of gNodeBs 202-206) according to techniques described herein. Location related measurements may include measurements of signal propagation time or RTT between a UE 102 and a base station or AP, such as any of gNodeBs 202-206.

Apparatus 304 and 306 may each include an RTT measurement component 354 and 356, respectively, which may be used to determine a location estimate for a UE 102 (e.g., apparatus 302), according to techniques described herein, based on location related measurements provided by the UE 102 and/or by a base station or AP, such as any of gNodeBs 202-206. Location related measurements obtained by the UE 102 may include measurements of signal propagation time or RTT between a UE 102 and a base station or AP, such as any of gNodeBs 202-206. Location related measurements obtained by any of gNodeBs 202-206 (e.g., apparatus 304) may include measurements of signal propagation time or RTT between the UE 102 and a base station or AP, such as any of gNodeBs 202-206.

Figure 4:
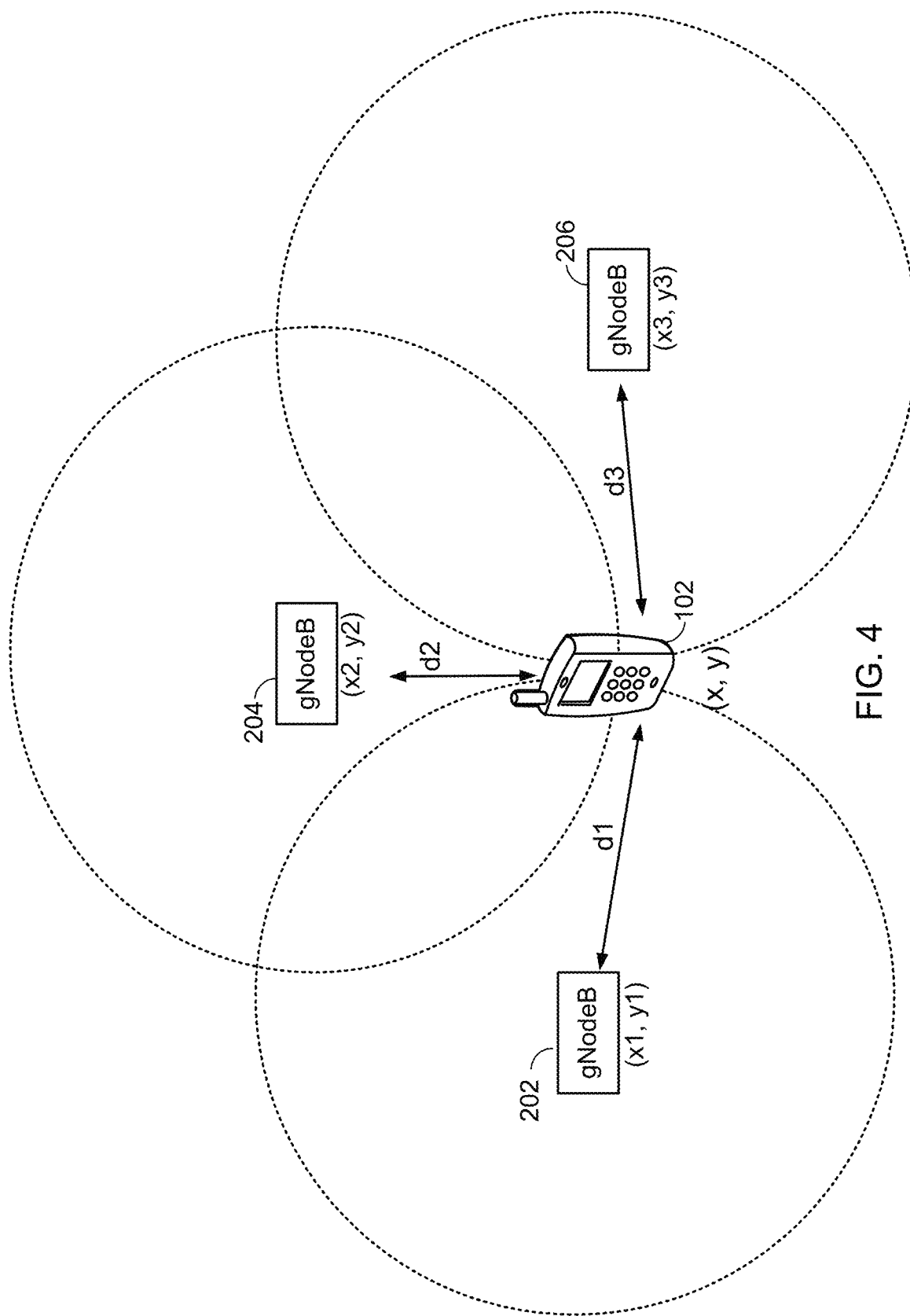
FIG. 4 is diagram illustrating an exemplary technique for determining a position of a mobile station using information obtained from a plurality of base stations.

A simplified environment is shown in FIG. 4 for illustrating an exemplary technique for determining a position of UE 102. The UE 102 may communicate wirelessly with a plurality of gNodeBs 202-206 using radio frequency (RF) signals and standardized protocols for the modulation of the RF signals and the exchanging of information packets. By extracting different types of information from the exchanged signals, and utilizing the layout of the network (i.e., the network geometry) the UE 102 may determine its position in a predefined reference coordinate system. As shown in FIG.

4, the UE 102 may specify its position (x, y) using a two-dimensional coordinate system; however, the aspects disclosed herein are not so limited, and may also be applicable to determining positions using a three-dimensional coordinate system, if the extra dimension is desired. Additionally, while three gNodeBs 202-206 are shown in FIG. 4, aspects may utilize additional gNodeBs.

In order to determine its position (x, y), the UE 102 may first need to determine the network geometry. The network geometry can include the positions of each of the gNodeBs 202-206 in a reference coordinate system ($(x_k, y_k)$, where k=1, 2, 3). The network geometry may be provided to the UE 102 in any manner, such as, for example, providing this information in beacon signals, providing the information using a dedicated server external on an external network, providing the information using uniform resource identifiers, etc.

The UE 102 may then determine a distance ($d_k$, where k=1, 2, 3) to each of the gNodeBs 202-206. As will be described in more detail below, there are a number of different approaches for estimating these distances ($d_k$) by exploiting different characteristics of the RF signals exchanged between the UE 102 and gNodeBs 202-206. Such characteristics may include, as will be discussed below, the round trip propagation time of the signals, and/or the strength of the signals (RSSI).

In other aspects, the distances ($d_k$) may in part be determined or refined using other sources of information that are not associated with the gNodeBs 202-206. For example, other positioning systems, such as GPS, may be used to provide a rough estimate of $d_k$. (Note that it is likely that GPS may have insufficient signal in the anticipated operating environments (indoors, metropolitan, etc.) to provide a consistently accurate estimate of $d_k$. However GPS signals may be combined with other information to assist in the position determination process.) Other relative positioning devices may reside in the UE 102 which can be used as a basis to provide rough estimates of relative position and/or direction (e.g., on-board accelerometers).

Once each distance is determined, the UE 102 can then solve for its position (x, y) by using a variety of known geometric techniques, such as, for example, trilateration. From FIG. 4, it can be seen that the position of the UE 102 ideally lies at the intersection of the circles drawn using dotted lines. Each circle being defined by radius $d_k$ and center ($x_k, y_k$), where k=1, 2, 3. In practice, the intersection of these circles may not lie at a single point due to the noise and other errors in the networking system.

Determining the distance between the UE 102 and each gNodeB 202-206 may involve exploiting time information of the RF signals. In an aspect, determining the RTT of signals exchanged between the UE 102 and a gNodeB 202-206 can be performed and converted to a distance ($d_k$). RTT techniques can measure the time between sending a data packet and receiving a response. These methods utilize calibration to remove any processing delays. In some environments, it may be assumed that the processing delays for the UE 102 and the gNodeBs 202-206 are the same. However, such an assumption may not be true in practice.

A position estimate (e.g., for a UE 102) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5A:
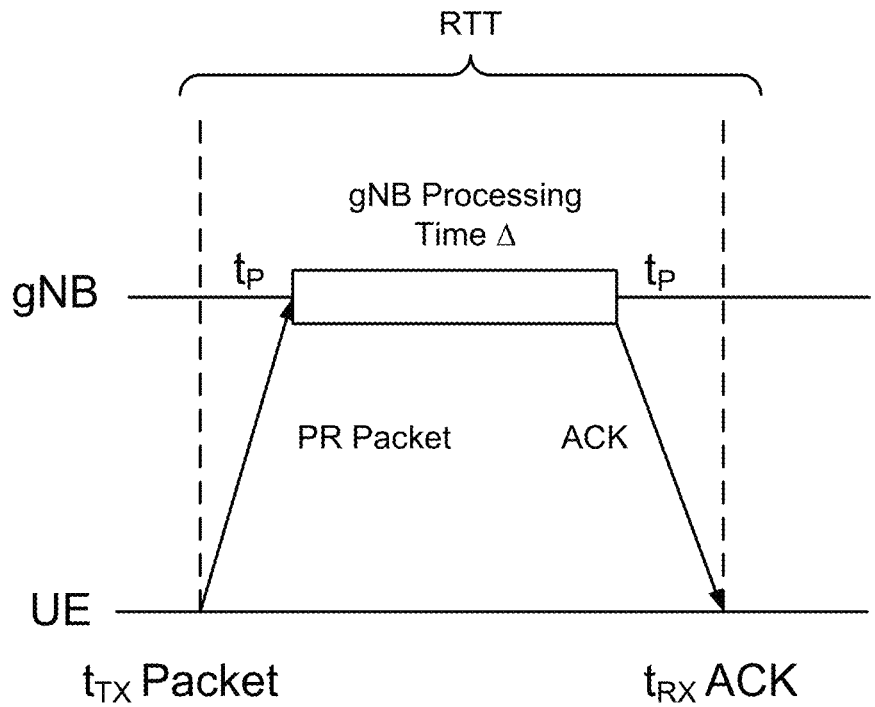
FIGS. 5A and 5B are diagrams showing exemplary timings within a RTT occurring during a wireless probe request and a response.
Figure 5B:
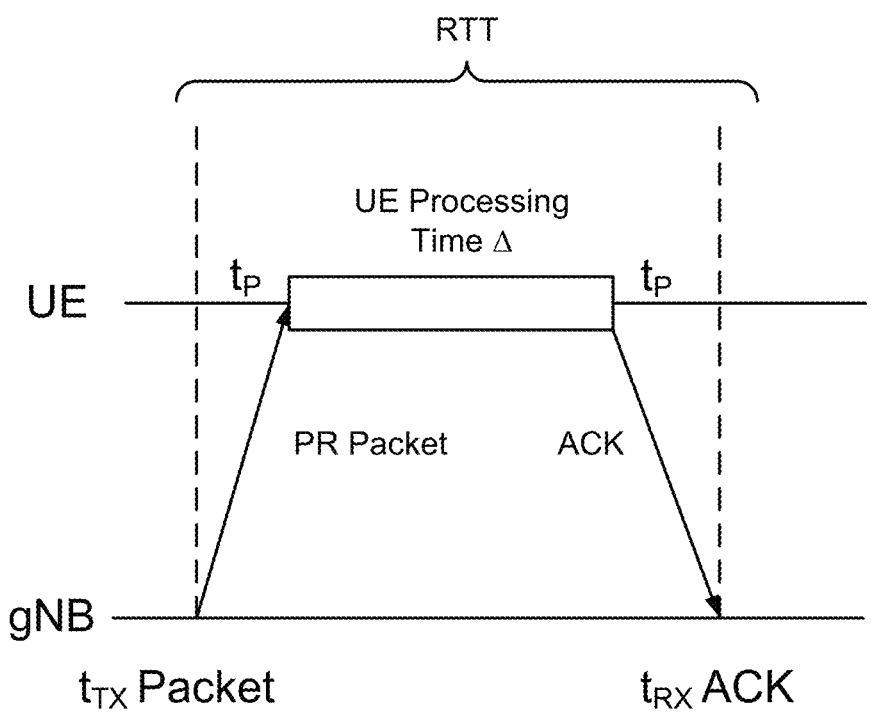

FIGS. 5A and 5B are diagrams showing exemplary timings within an RTT occurring during a wireless probe request and a response initiated by a UE and a gNodeB, respectively. In an aspect, the response may take the form of an acknowledgement packet (ACK); however, any type of response packet would be consistent with various aspects of the disclosure. For example, an RTS (request to send) transmit packet and/or CTS (clear to send) response packet may be suitable.

As illustrated in FIG. 5A, to measure the RTT with respect to a given gNodeB (e.g., any of gNodeBs 202-206), the UE 102 may send a directed probe request, e.g., an uplink RTT reference signal, to gNodeB, and record the time (timestamp) the probe request packet was sent ($t_{TX}$ Packet) as shown on the UE timeline. After a propagation time $t_P$ from the UE 102 to the gNodeB, the gNodeB will receive the packet. The gNodeB may then process the directed probe request and may send an ACK back, e.g., a downlink RTT reference signal, to the UE 102 after some processing time A, sometimes referred to herein as a processing delay, as shown on the gNodeB timeline in FIG. 5A. After a second propagation time $t_P$, the UE 102 may record the time (timestamp) the ACK packet was received ($t_{RX}$ ACK) as shown on the UE time line. The UE 102, or other entity, such as the location server, may then determine the total RTT as the time difference $t_{RX}$ ACK−$t_{TX}$ Packet. The net RTT, i.e., the two-way propagation time, may be determined based on the difference between the total RTT and the processing delay Δ.

FIG. 5B, is similar to FIG. 5A, but illustrates that to measure the RTT with respect to a UE, a gNodeB (e.g., any of gNodeBs 202-206) may send a directed probe request, e.g., a downlink RTT reference signal, to the UE, and record the time (timestamp) the probe request packet was sent ($t_{TX}$ Packet) as shown on the gNB timeline. After a propagation time $t_P$ from the gNodeB to the UE 102, the UE 102 will receive the packet. The UE 102 may then process the directed probe request and may send an ACK, e.g., an uplink RTT reference signal, back to the gNodeB after some processing time A, e.g., the processing delay, as shown on the UE timeline in FIG. 5B. After a second propagation time $t_P$, the gNodeB may record the time (timestamp) the ACK packet was received ($t_{RX}$ ACK) as shown on the gNB time line. The gNodeB, or other entity such as the UE 102 or location server, may then determine the net RTT as the time difference $t_{RX}$ ACK−$t_{TX}$ Packet. The net RTT, i.e., the two-way propagation time, may be determined based on the difference between the total RTT and the processing delay Δ.

Position location methods, such as observed time difference of arrival (OTDOA), currently used in cellular networks require fine (e.g., sub-microsecond) synchronization of timing across base-stations in the network. On the other hand, RTT-based methods only need coarse timing synchronization (within a cyclic prefix (CP) duration of the orthogonal frequency-division multiplexing (OFDM) symbols). The present disclosure describes procedures that can be implemented in a 5G NR network, exploiting its self-contained subframe structure.

In 5G NR, there is no requirement for precise timing synchronization across the network. Instead, it is sufficient to have (coarse) CP-level time-synchronization across gNodeBs. Coarse time-synchronization enables low-reuse of RTT Measurement signals, which mitigates intercell interference. Intercell interference mitigation ensures deep penetration of RTT signals, which enables multiple independent timing measurements across distinct gNBs, and hence more accurate positioning.

In a network-centric RTT estimation, the serving gNodeB (one of gNodeBs 202-206) instructs the UE (e.g., UE 102) to look for RTT signals from one or more gNodeBs (one of more of gNodeBs 202-206). The one of more gNodeBs transmit RTT Measurement signals on low reuse resources, allocated by the network (e.g., location server 170). The UE records the arrival times $\Delta t(i)$ of each RTT Measurement signal, relative to its current DL timing, and transmits a common or individual RTT Response message(s) to the one or more gNodeBs (when instructed by its serving gNodeB). The RTT Response message directed at a particular gNodeB includes, in its payload, the timestamp(s) ($\Delta t(i)$+TA), where $\Delta t(i)$ denotes the arrival time of the RTT Measurement signal received from that gNB and TA denotes the uplink timing-adjust parameter of the UE. In the case of a common RTT Response message, the set of time-stamps ($\Delta t(i)$+TA) may be re-organized in other ways, well-known to a person of ordinary skill in the art. The network may allocate low reuse resources for the UE to transmit the RTT Response message (s). In any case, each gNodeB that receives an RTT Response message records its arrival time $\Delta T(i)$, relative to the DL time-reference of the gNodeB. The gNodeB can compute RTT between the UE and itself by adding the timestamp value ($\Delta t(i)$+TA) to the arrival time $\Delta T(i)$. This computation may be performed either at the gNodeBs receiving of the RTT Response signal from the UE, or at a central location in the network.

Figure 6:
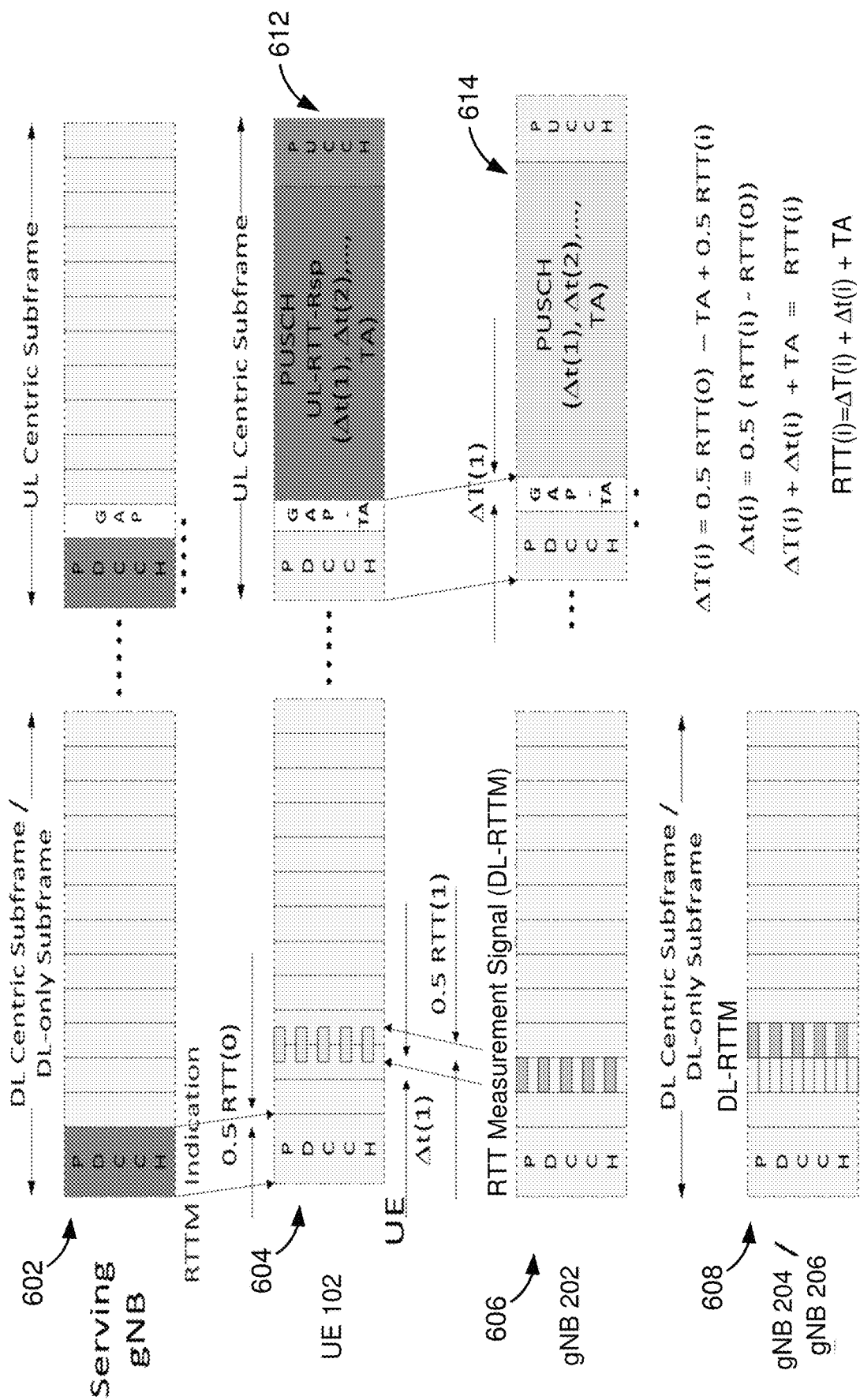
FIG. 6 illustrates an example of the network-centric RTT estimation according to an aspect of the disclosure.

FIG. 6 illustrates an example of the network-centric RTT estimation according to an aspect of the disclosure. As shown in FIG. 6, on a downlink-centric/downlink-only subframe (at low duty-cycle) of the downlink (DL) sequence of subframes 602, the serving gNodeB sends a control signal (e.g., on the physical downlink control channel (PDCCH)) to the UE 102, indicating to the UE 102 that one or more gNodeBs (gNodeBs 202-206 in the example of FIG. 6) will be transmitting downlink RTT Measurement (RTTM) signal (s). During the downlink sequences of subframes 606 and 608, gNodeBs 202-206 transmit downlink RTT Measurement signals at specified symbols of the subframe, in a time division multiplexing (TDM) or frequency division multiplexing (FDM) fashion. The RTT Measurements transmitted by the gNodeBs 202-206 should be wideband signals to enable the UE 102 to make precise timing measurements. No other signals should be transmitted in or around the symbols associated with the RTT Measurements by any other gNodeB in the neighborhood (resulting in low-reuse, interference avoidance, and deep penetration of RTT Measurements).

During downlink the sequence of subframes 604, the UE 102 measures the arrival time $\Delta t(i)$ of each downlink RTT Measurement transmitted during the sequences of subframes 606 and 608 relative to its own downlink subframe timing (derived from the downlink signal received from the serving gNodeB on the PDCCH). The UE 102 is instructed to report its RTT Measurements on the physical uplink shared channel (PUSCH) during a subsequent subframe, which it does during the uplink sequence of subframes 612. The report from the UE 102 includes the arrival times $\Delta t(i)$ of each downlink RTT Measurement, as well as the UE 102's own uplink timing-adjust (TA) provided by the serving gNodeB. Like the downlink RTT Measurements transmitted by the gNodeBs 202-206, the uplink RTT Measurements transmitted by the UE 102 should be wideband signals to enable the gNodeBs to make precise timing measurements.

Each gNodeB in the UE 102's neighborhood (i.e., within communication range of the UE 102; gNodeBs 202-206 in the example of FIG. 6) receives the report from the UE 102 during the uplink sequence of subframes 614 and decodes it, and also records the arrival time $\Delta T(i)$ of the uplink (UL) signals from the UE 102, relative to its own system-time. The RTT may then be computed from the arrival time of the report from the UE 102, combined with timing information in the payload (i.e., the RTT Measurement report).

Note that the TA, which should also be a wideband signal, is a parameter that accounts for the UE 102's distance from the serving gNodeB. The TA enables all uplink signals from the UE 102 to arrive at the serving gNodeB at the same time. The uplink TA enables the RTT Measurements to arrive exactly at the end of the gap.

A UE-centric RTT estimation is similar to the network-based method, except that the UE (e.g., UE 102) transmits RTT Measurement signal(s) (when instructed), which are received by multiple gNodeBs in the neighborhood of UE. Each gNodeB responds with a RTT Response message, including the arrival time $\Delta t(i)$ of the RTT Measurement signal from the UE in the message payload. The UE determines the arrival time $\Delta T(i)$ of the RTT Measurement message, decodes the RTT Response message and estimates, extracts the time-stamp $\Delta t(i)$ embedded in the message, and computes the RTT for the responding gNodeB, by adding the measured arrival-time $\Delta T(i)$, the extracted time-stamp $\Delta t(i)$, and its own uplink-downlink timing-adjust value TA.

Figure 7:
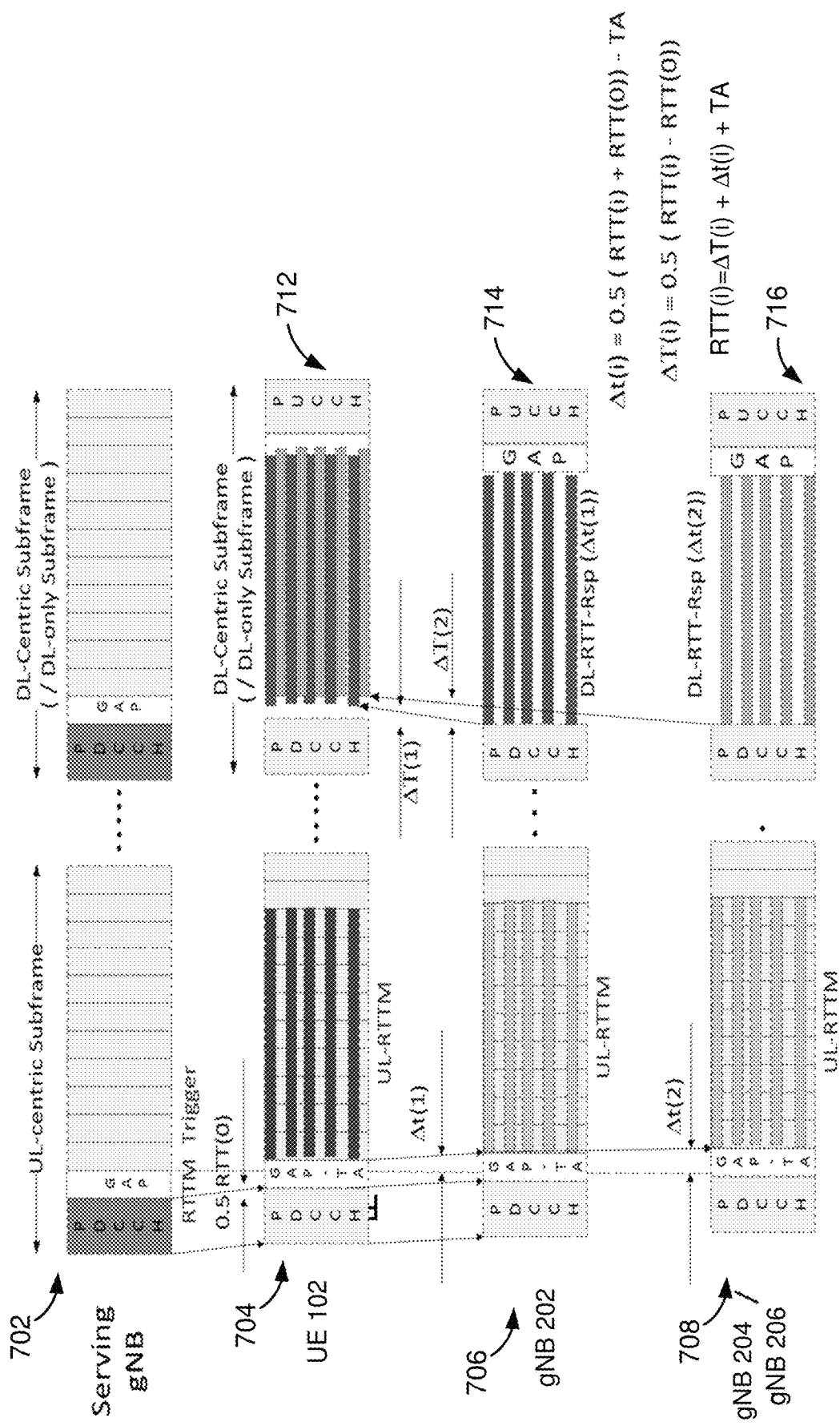
FIG. 7 illustrates an example of the UE-centric RTT estimation according to an aspect of the disclosure.

FIG. 7 illustrates an example of the UE-centric RTT estimation according to an aspect of the disclosure. On an uplink-centric (at low duty-cycle) subframe during the uplink sequence of subframes 702, the serving gNodeB sends a control signal (e.g., on the PDCCH) to the UE 102, instructing the UE 102 (and any number of other UEs) to transmit an uplink RTT Measurement signal (UL-RTTM).

During the uplink sequence of subframes 704, the UE 102 transmits an RTT Measurement signal at specified resource blocks of the uplink data portion of the subframe, in a TDM or FUM fashion. The RTT Measurement signals should be wideband signals to enable more precise timing measurements. No other signals should be transmitted on the symbols associated with the uplink RTT Measurement signals by any UE in the neighborhood (resulting in low reuse, interference avoidance, and deep penetration of RTTM).

During the uplink sequences of subframes 706 and 708, each gNodeB in the neighborhood (i.e., within communication range of the UE 102; gNodeBs 202-206 in the example of FIG. 7) measures the arrival time $\Delta t(i)$ of each uplink RTT Measurement signal relative to its own downlink sub-frame timing (assuming a synchronous deployment of the gNodeBs). The serving gNodeB instructs the UE 102 to look for RTT Responses from the gNodeBs 202-206 on a subsequent subframe, which occurs during the downlink sequences of subframes 714 and 716. The RTT Response signal from each gNodeB 202-206 includes the arrival times $\Delta t(i)$ of the uplink RTT Measurement signal from the UE 102. The RTT Response signals should be wideband signals to enable the UE 102 to make precise timing measurements.

The UE 102, and each UE in the neighborhood (e.g., all UEs within communication range of the serving gNodeB and gNodeBs 202-206), decodes the RTT Responses from the gNodeBs 202-206 during the downlink sequence of subframes 712, and also measures the arrival time $\Delta T(i)$ of the uplink signals from the gNodeBs 202-206, relative to its own (downlink) system-time.

The RTT may be computed from the arrival time of the downlink RTT Response at the UE 102, combined with timing information in the gNodeB payload (downlink RTT Response), along with its own TA (provided by the serving gNodeB). Any mismatch between inter-gNodeB timing may be absorbed into 0.5 RTT(0); there is no requirement for precise timing synchronization across the gNodeBs 202-206.

The RTT estimation procedures disclosed herein can be extended to massive Multiple Input-Multiple Output (MIMO) and to extremely-high frequency (EHF) region of the spectrum, also known as millimeter wave (mmW) (generally, spectrum bands above 24 GHz) systems. In mmW band systems, as well as massive MIMO systems in any band, gNodeBs use transmission/reception beamforming to extend signal coverage to the cell edge.

"Beamforming" is a technique for focusing an RF signal in a specific direction. Traditionally, when a base station broadcasts an RF signal, it broadcasts the signal in all directions. With beamforming, the base station determines where a given target device (e.g., UE 102) is located (relative to the base station) and projects a stronger downlink RF signal in that specific direction, thereby providing a faster (in terms of data rate) and stronger RF signal for the receiving device(s). To change the directionality of the RF signal when transmitting, a base station can control the phase and relative amplitude of the RF signal at each transmitter. For example, a base station may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

The term "cell" refers to a logical communication entity used for communication with a base station (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area (e.g., a sector) over which the logical entity operates.

Figure 8:
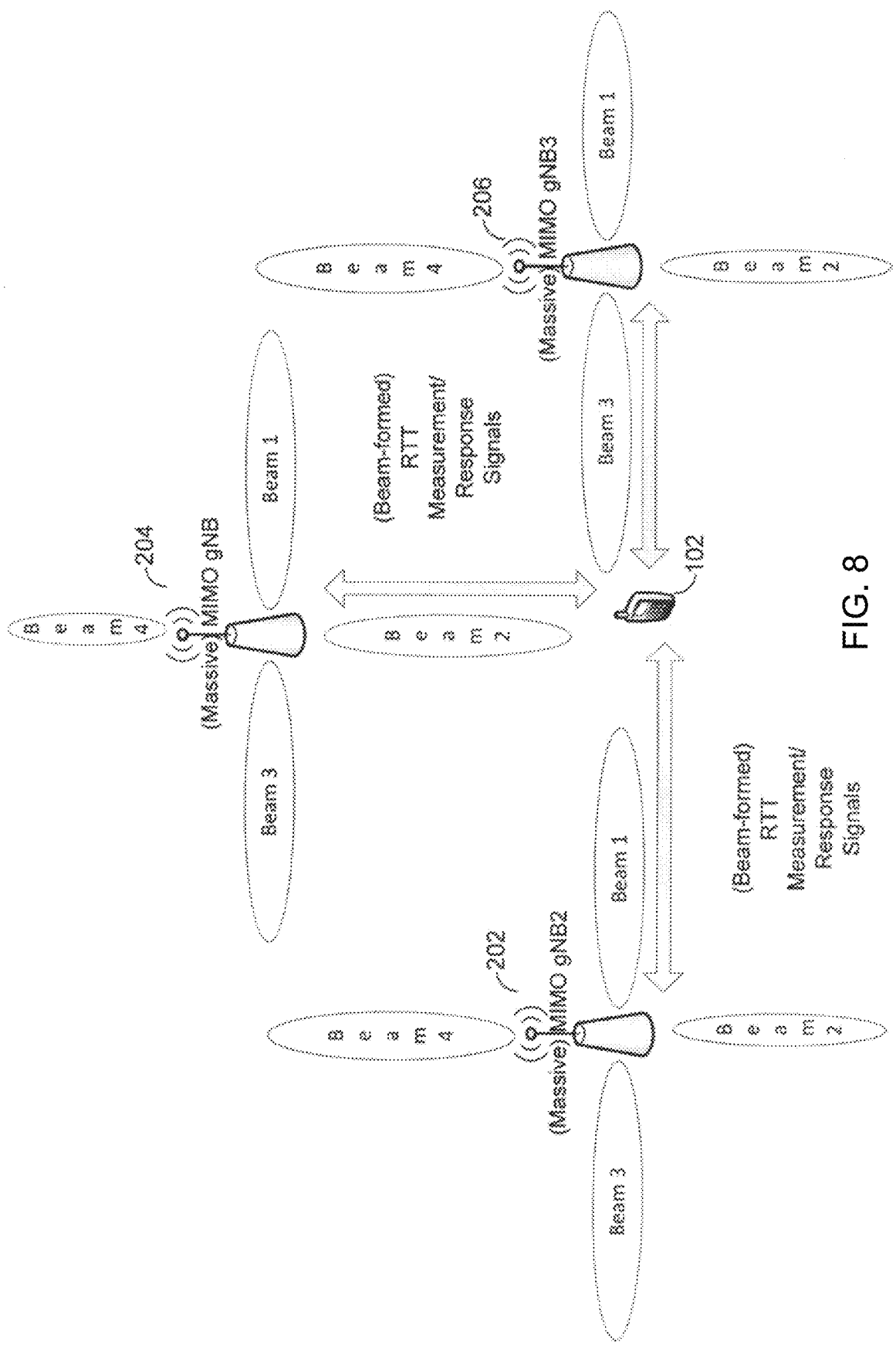
FIG. 8 illustrates an exemplary system in which the RTT estimation procedures disclosed herein are extended to massive Multiple Input-Multiple Output (MIMO) and millimeter wave (mmW) systems according to an aspect of the disclosure.

FIG. 8 illustrates an exemplary system in which the RTT estimation procedures disclosed herein are extended to massive MIMO and mmW systems according to an aspect of the disclosure. In the example of FIG. 8, gNodeBs 202-206 are massive MIMO gNodeBs. To perform the RTT estimation procedure described herein in massively beam-formed systems (e.g., MIMO, mmW), each physical gNodeB (e.g., gNodeBs 202-206) acts like a set of multiple "logical gNodeBs," transmitting its RTT Measurement or RTT Response signals on multiple beams (e.g., beams 1-4) on different time-frequency resources, in a TDM or FDM fashion. The RTT Measurement/Response signals may (implicitly or explicitly) carry information about the identity of the gNodeB transmitting the signal, as well as the beam-index (e.g., 1-4) used to transmit them. The UE (e.g., UE 102) processes the RTT (Measurement/Response) signals received on the downlink, as if they were transmitted by different gNodeBs. In particular, it records or reports the beam index (or indices) on which the RTT signals were received, in addition to the timestamps (e.g., arrival times) described earlier.

During reception, the gNodeBs 202-206 record/report the beam index on which the RTT signals were received from the UE 102, and include that information in the RTT Response payload, along with the timestamps (e.g., arrival time) described earlier. In case the gNodeBs 202-206 have fewer RF chains than the number of receiver-beams it uses, the UE 102 may be commanded to repeat the RTT Measurement/Response messages multiple times, so that the gNodeB may sequentially cycle through the set of all receiver-beams that may be used to receive the RTT signals from the UE 102, based on its limited base-band processing capabilities. An RF chain may be a receiver chain or a transmitter chain, and is the hardware utilized to receive or transmit RF signals of a given frequency or set of frequencies. A device (e.g., a base station 202-206 or UE 102) may have multiple receiver/transmitter chains, and may thereby be able to transmit and/or receive RF signals on multiple frequencies at the same time.

In an aspect, in (massive) MIMO systems, either or both of the gNodeBs 202-206 and the UE 102 may repeat their RTT Measurement/Report signals multiple times. The different repetitions may use either the same or different transmission-beams. When a signal is repeated with the same transmission-beam, it is intended to support reception-beam-sweeping (in addition to coherent-combining if needed) at the receiving end-point (the UE 102 or a gNodeB 202-206).

In an aspect, the angle-of-arrival/departure (at the gNodeB 202-206) associated with the beam-index information may be used in conjunction with RTT estimates to compute the geographic position of the UE (RTT plus AoA/AoD based positioning).

Figure 9:
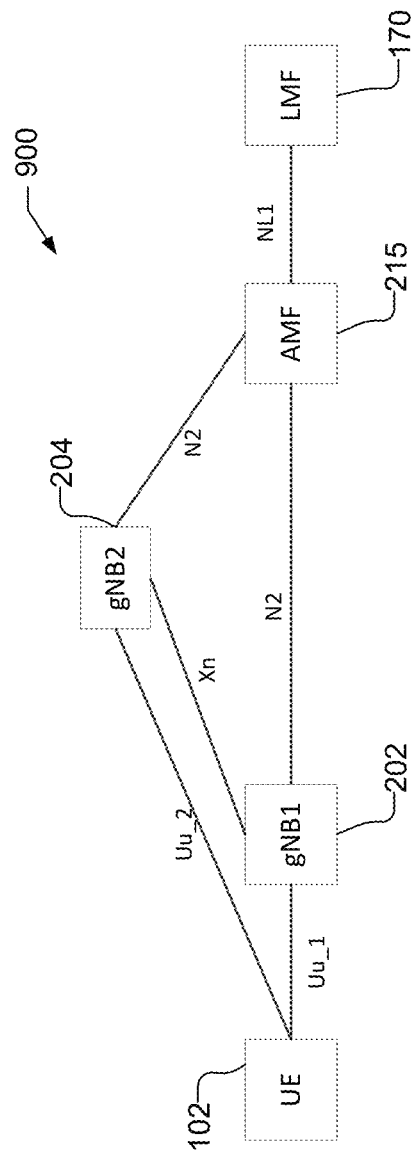
FIG. 9 illustrates a reference point representation of a communication system based on a 5G NR network, in which RTT estimates may be produced.

FIG. 9 illustrates a reference point representation of a communication system 900 based on a 5G NR network, in which RTT estimates may be produced. Communication system 900 may be part of communication system 100 for FIG. 2 (e.g. LMF 170 in FIG. 9 may correspond to LMF 225 in FIG. 2). The communication system 900, for example, illustrates the UE 102 connected to a plurality of gNodeBs 202 and 204, which are coupled together. By way of example, in FIG. 9, gNodeB 202 may be the serving gNodeB for UE 102. The gNodeBs 202 and 204 are coupled to a location server 170, which in a 5G core network (5GCN) is sometimes referred to as a Location Management Function (LMF) (e.g. LMF 225), and a core network access node, which in a 5GCN is sometimes referred to as an Access and Mobility Management Function (AMF) 215. The gNodeBs 202 and 204 may be coupled together and to the AMF 215 and LMF 170, e.g., through a core network, or through integrated access and backhaul (IAB). It should be understood that there may be more UEs and/or more gNodeBs in the communication system 900.

As illustrated in FIG. 5A, in order to calculate an RTT, the UE 102 may transmit an uplink RTT reference signal to the gNodeBs 202 and 204 and, after a processing delay $\Delta$, each gNodeB 202 and 204 may transmit a downlink RTT reference signal to UE 102. The processing delay $\Delta$, may be caused by various factors, such as internal processing time, as well as delays caused by each gNodeB's own downlink sub-frame timing, e.g., the downlink reference signal is aligned to the gNodeB's symbol boundaries. The UE 102 may determine for each gNodeB a total RTT between the time of transmission (TOT) of the uplink RTT reference signal and the time of arrival (TOA) of the downlink reference signal from each gNodeB. The total RTT includes the processing delay Δ of the gNodeBs, which may vary. Accordingly, to determine the net RTT, e.g., the time-of-flight round trip time for the signals, the processing delay Δ for each of the gNodeBs 202 and 204 is subtracted from the total RTT. The gNodeBs 202 and 204 may provide their processing delays Δ to the UE 102 and the UE 102 may determine the net RTT using the total RTT measured by the UE 102 for each gNodeB. Alternatively, the gNodeBs 202 and 204 may provide their processing delays Δ to the LMF 170, and the UE may provide the total RTT (or equivalently, the TOT of the uplink RTT reference signal and the TOA of the downlink reference signals) to the LMF 170, and the LMF 170 may determine the net RTT. Advantageously, the amount of processing delays Δ may be provided, as opposed to providing the TOA and TOT, themselves, which reduces data length requirements.

Similarly, as illustrated in FIG. 5B, in order to calculate an RTT, the gNodeBs 202 and 204 may transmit downlink RTT reference signals to UE 102, after a processing delay Δ in the UE 102, the UE 102 may transmit uplink RTT reference signals to the gNodeBs 202 and 204. In this arrangement, the total RTT from each gNodeB is the time between the TOT of the downlink uplink RTT reference signal and the TOA of the uplink reference signal. To determine the net RTT, e.g., the actual round trip time for the signals, the processing delays Δ for the UE 102 to respond to each of the gNodeBs 202 and 204, is subtracted from the total RTT. The gNodeBs 202 and 204 may provide their total RTTs (or equivalently, the TOT of the downlink RTT reference signal and the TOA of the uplink reference signals) to the UE 102 and the UE 102 may determine the net RTT using the measured processing delay Δ to return each uplink RTT reference signal. Alternatively, the gNodeBs 202 and 204 may provide their total RTTs (or equivalently, the TOT of the downlink RTT reference signal and the TOA of the uplink reference signals) to the LMF 170, and the UE may provide the measured processing delay Δ to return each uplink RTT reference signal to the LMF 170, and the LMF 170 may determine the net RTT.

Thus, whether the gNodeBs 202 and 204 are each providing their respective processing delays Δ, or their respective total RTTs, sometimes collectively referred to herein as measured signaling data, one source of problems is that for the UE 102 to receive the signaling data directly from each gNodeB 202 and 204, the UE 102 is required to receive and decode these measurement signals transmitted by each of the gNodeBs, which would severely limit the measurement sensitivity. For example, while the serving gNodeB 202 may be within a connection range with the UE 102 in which the UE 102 may easily decode measurement signals, other gNodeBs, such as gNodeB 204, may be in a connection range in which the UE 102 cannot easily decode measurement signals, and thus, there is a high bit rate error. In comparison, the downlink RTT reference signals from each of the gNodeBs 202 and 204 are long in time and/or wide in frequency. Signals with such large correlation gains could overcome additional attenuation and accordingly have high sensitivity.

To overcome the measurement sensitivity, the gNodeBs may send their measured signaling data to a single entity, e.g., either a serving gNodeB or the LMF 170. The gNodeBs may send their measured signaling data to the single entity using the core network or integrated access and backhaul (IAB) to avoid sensitivity problems. The single entity may aggregate the signaling data for the UE 102, and send the aggregated signaling data to the UE 102 across. Thus, each gNodeB provides its signaling data to an entity across a data path with low bit error rate. Moreover, the UE 102 may receive the aggregated signaling data from a single entity, e.g., the serving gNodeB or the LMF, across a data path with low bit error rate.

Figure 10:
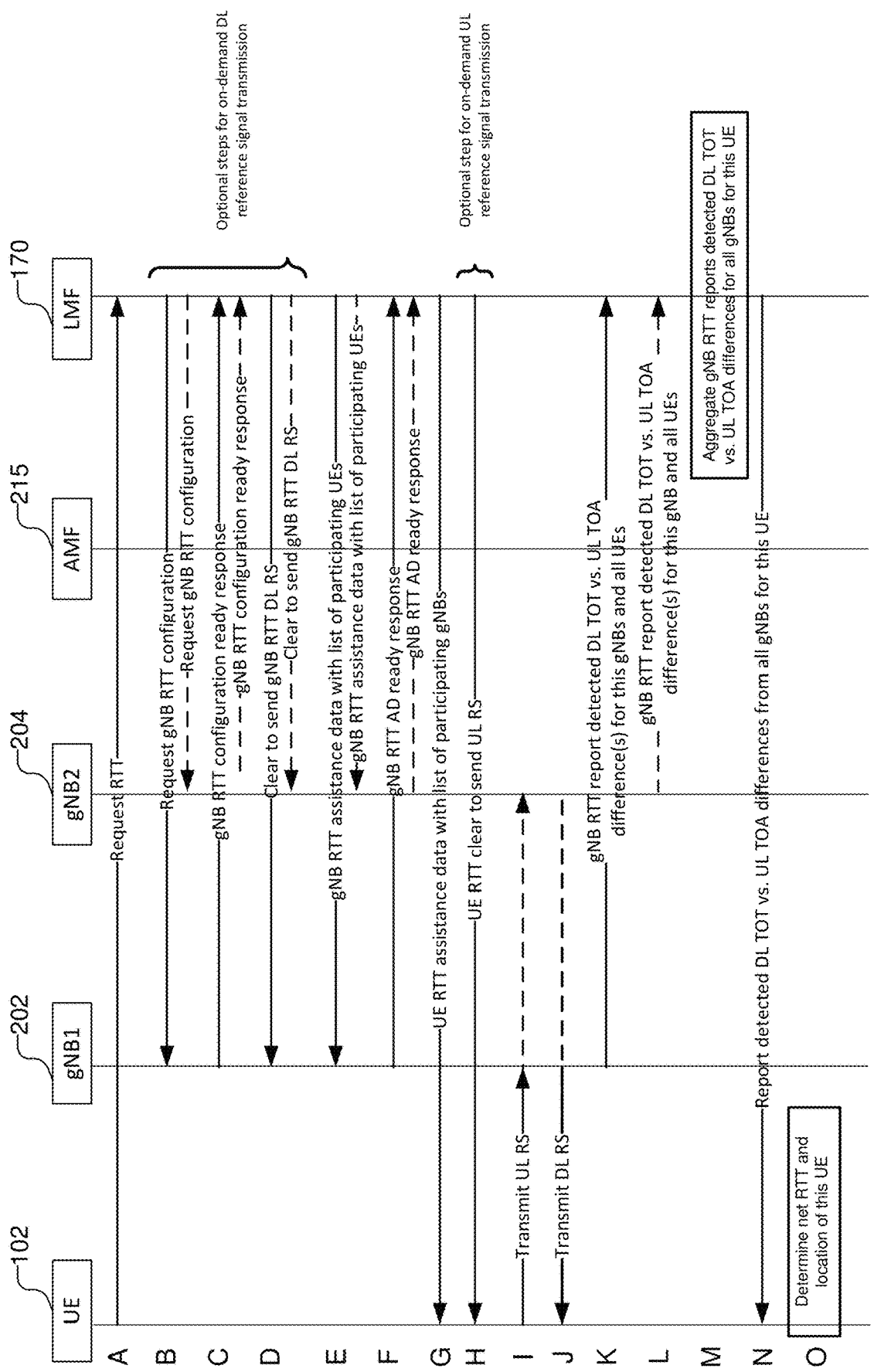
FIG. 10 illustrates a call flow of a Mobile Originated Location Request (MO-LR) for RTT measurements for a UE, where the location server is used to aggregate the measured signal data from the gNodeBs.

FIG. 10 illustrates a call flow of a Mobile Originated Location Request (MO-LR) for RTT measurements for a UE 102, where the location server 170 is used to aggregate the measured signal data from the gNodeBs 202 and 204 and send an aggregated report of the measured signal data to the UE 102. FIG. 10 illustrates, by way of example, the UE 102 initiating the RTT reference signal transmissions, where the UE 102 measures the total RTT and the gNodeBs 202 and 204 measure and send their respective processing delays Δ to the location server 170. It should be understood, however, that if desired, the gNodeBs may initiate the RTT reference signal transmissions, where the gNodeBs 202 and 204 measure and send the total RTTs to the location server 170 and the UE 102 measures its processing delay Δ.

As illustrated, at stage A, the UE 102 transmits a Request RTT message to the location server 170.

Stages B, C, and D are optional steps for on-demand downlink reference signal transmissions. For example, as illustrated at optional stage B, the location server 170 may send to gNodeBs 202 and 204 a Request for gNB RTT configuration message.

At optional stage C, the gNodeBs 202 and 204 may send a gNB RTT configuration ready response message to the location server 170.

At optional stage D, the location server 170 may send to gNodeBs 202 and 204 a Clear to send gNB RTT DL (downlink) RS (reference signal) message.

At stage E, the location server 170 may send to gNodeBs 202 and 204 a gNB RTT assistance data (AD) with participating UEs message. For example, there may be more than one UE for which RTT measurements are to be determined. The assistance data identifies the UEs with which the gNodeBs 202 and 204 are to engage.

At stage F, the gNodeBs 202 and 204 send gNB RTT AD ready response message to the location server 170.

At stage G, the location server 170 sends to the UE 102 a UE RTT assistance data with list of participating gNBs message. For example, the assistance data identifies gNodeBs 202 and 204, as well as any other gNodeBs with which the UE 102 should engage for an RTT measurement. It should be understood, if there are multiple UEs, the location server 170 may send appropriate assistance data to each UE participating in the RTT determination, if there are multiple UEs.

At optional stage H, the location server 170 sends a UE RTT clear to send UL (uplink) RS message to the UE 102. Optional stage H, for example, may be performed when on-demand UL reference signal transmission.

At stage I, the UE 102 transmits an uplink RTT reference signal that is received by the gNodeBs 202 and 204.

At stage J, the gNodeBs 202 and 204 each transmit a downlink RTT reference signal, in response to the uplink RTT reference signal received in stage I, and after a processing delay Δ, e.g., between the TOA of the uplink RTT reference signal and the TOT of the downlink RTT reference signal, which is measured by the gNodeBs 202 and 204.

At stage K, gNodeB 202 sends to the location server 170 a gNB RTT report of the detected DL TOT vs. UL TOA differences, i.e., the processing delay Δ, measured by gNodeB 202 for all UEs for which RTT is being measured, including UE 102.

At stage L, gNodeB 204 sends to the location server 170 a gNB RTT report of the detected DL TOT vs. UL TOA differences, i.e., the processing delay Δ, measured by gNodeB 204 for all UEs for which RTT is being measured, including UE 102.

At stage M, the location server 170 aggregates the gNB RTT reports for the processing delays Δ measured by each gNodeB 202 and 204 for all UEs, including UE 102.

At stage N, the location server 170 sends to the UE 102 the aggregated report of the processing delays Δ measured by each gNodeB 202 and 204 for the UE 102.

At stage O, the UE 102 may determine the net RTT for each gNodeB 202 and 204, e.g., using the total RTT measured by UE 102 for each gNodeB 202 and 204, and the processing delays Δ measured by each gNodeB 202 and 204 received in the aggregated report received at stage N. The UE 102 may determine the location of the UE 102 using the net RTT for at least the gNodeBs 202 and 204 and known positions of the gNodeBs 202 and 204, e.g., received in the assistance data from stage G. It is understood that while FIG. 10 illustrates only two gNodeBs for sake of simplicity, for location determination using trilateration RTT measurements from three or more gNodeBs may be used.

As discussed above, if desired, the gNodeBs may initiate the RTT reference signal transmissions (e.g., stage J may occur before stage I), where the gNodeBs 202 and 204 measure and send the total RTTs to the location server 170 at stages K and L, and the UE 102 measures its processing delay Δ, which is used to determine the net RTT in stage O.

Figure 11:
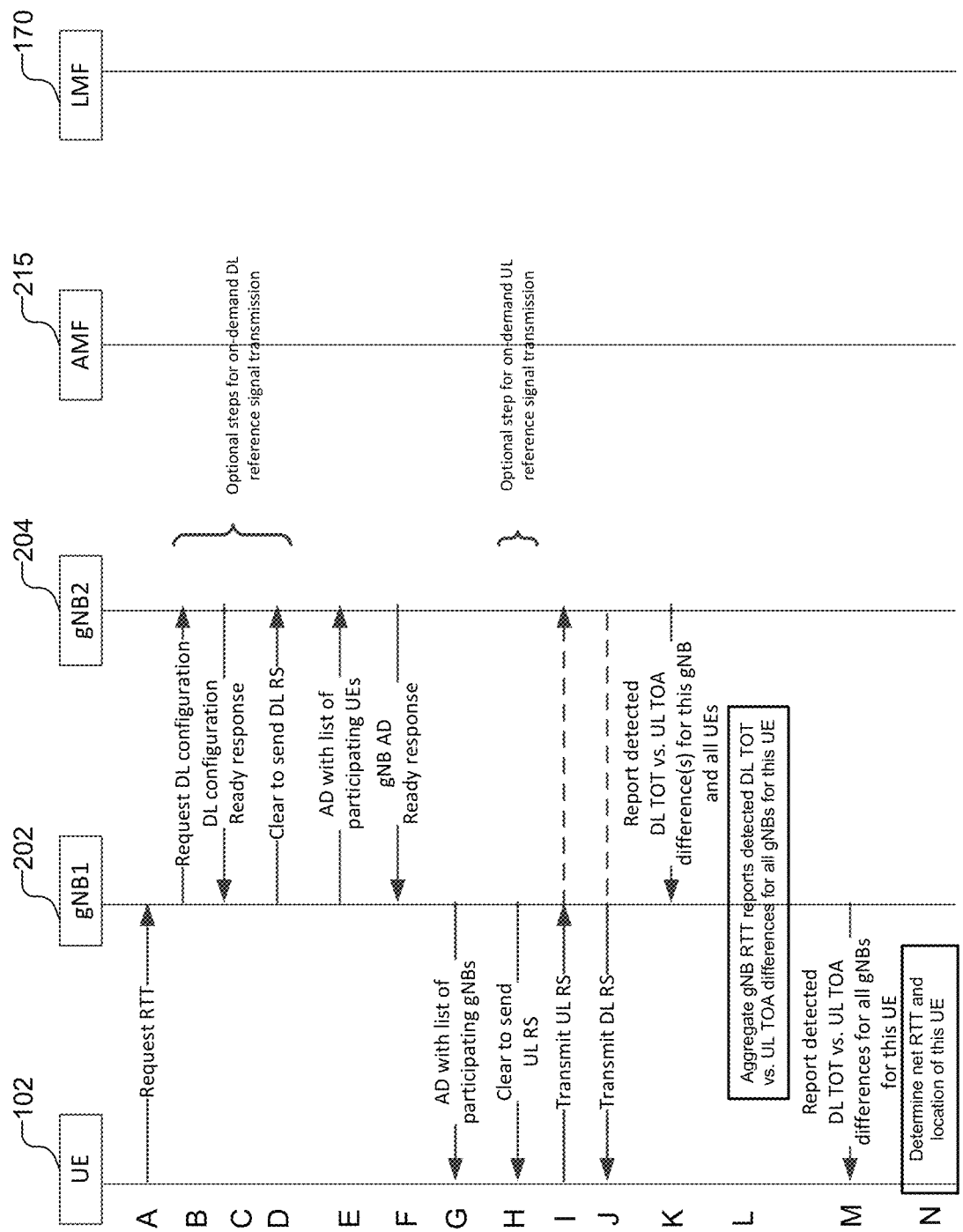
FIG. 11 illustrates a call flow of a Mobile Originated Location Request (MO-LR) for RTT measurements for a UE, where a gNodeB is used to aggregate the measured signal data from the gNodeBs.

FIG. 11 illustrates a call flow of a Mobile Originated Location Request (MO-LR) for RTT measurements for a UE 102, where the serving gNodeB 202 is used to aggregate the measured signal data from the gNodeBs 202 and 204 and send an aggregated report of the measured signal data to the UE 102. FIG. 11 illustrates, by way of example, the UE 102 initiating the RTT reference signal transmissions, where the UE 102 measures the total RTT and the gNodeBs 202 and 204 measure their respective processing delays Δ and gNodeB 204 sends its processing delay Δ to serving gNodeB 202. It should be understood, however, that if desired, the gNodeBs may initiate the RTT reference signal transmissions, where the gNodeBs 202 and 204 measure their respective total RTTs and gNodeB 204 sends its total RTT to serving gNodeB 202, and the UE 102 measures its processing delay Δ.

As illustrated, at stage A, the UE 102 transmits a Request RTT message to the gNodeB 202.

Stages B, C, and D are optional steps for on-demand downlink reference signal transmissions. For example, as illustrated at optional stage B, the gNodeB 202 may send to gNodeB 204 a Request for DL configuration message.

At optional stage C, the gNodeB 204 may send a DL configuration ready response message to the gNodeB 202.

At optional stage D, the gNodeB 202 may send to gNodeB 204 a Clear to send DL RS message.

At stage E, the gNodeB 202 may send to gNodeB 204 an assistance data (AD) with participating UEs message. For example, there may be more than one UE for which RTT measurements are to be determined. The assistance data identifies the UEs with which the gNodeBs 202 and 204 are to engage.

At stage F, the gNodeB 202 sends a gNB AD ready response message to the gNodeB 202.

At stage G, the gNodeB 202 sends to the UE 102 an assistance data with list of participating gNBs message. For example, the assistance data identifies gNodeBs 202 and 204, as well as any other gNodeBs with which the UE 102 should engage for an RTT measurement. It should be understood, if there are multiple UEs, the gNodeB 202 may send appropriate assistance data to each UE participating in the RTT determination, if there are multiple UEs.

At optional stage H, the gNodeB 202 sends a Clear to send UL RS message to the UE 102. Optional stage H, for example, may be performed when on-demand UL reference signal transmission.

At stage I, the UE 102 transmits an uplink RTT reference signal that is received by the gNodeBs 202 and 204.

At stage J, the gNodeBs 202 and 204 each transmit a downlink RTT reference signal, in response to the uplink RTT reference signal received in stage I, and after a processing delay Δ, e.g., between the TOA of the uplink RTT reference signal and the TOT of the downlink RTT reference signal, which is measured by the gNodeBs 202 and 204.

At stage K, gNodeB 204 sends to the gNodeB 202 a gNB RTT report of the detected DL TOT vs. UL TOA differences, i.e., the processing delay Δ, measured by gNodeB 204 for all UEs for which RTT is being measured, including UE 102.

At stage L, the gNodeB 202 aggregates the gNB RTT reports for the processing delays Δ measured by each gNodeB 202 and 204 for all UEs, including UE 102.

At stage M, the gNodeB 202 sends to the UE 102 the aggregated report of the processing delays Δ measured by each gNodeB 202 and 204 for the UE 102.

At stage N, the UE 102 may determine the net RTT for each gNodeB 202 and 204, e.g., using the total RTT measured by UE 102 for each gNodeB 202 and 204, and the processing delays Δ measured by each gNodeB 202 and 204 received in the aggregated report received at stage N. The UE 102 may determine the location of the UE 102 using the net RTT for at least the gNodeBs 202 and 204 and known positions of the gNodeBs 202 and 204, e.g., received in the assistance data from stage G. It is understood that while FIG. 11 illustrates only two gNodeBs for sake of simplicity, for location determination using trilateration RTT measurements from three or more gNodeBs may be used.

As discussed above, if desired, the gNodeBs may initiate the RTT reference signal transmissions (e.g., stage J may occur before stage I), where the gNodeBs 202 and 204 measure and send the total RTTs to the location server 170 at stages K and L, and the UE 102 measures its processing delay Δ, which is used to determine the net RTT in stage N.

Figure 12:
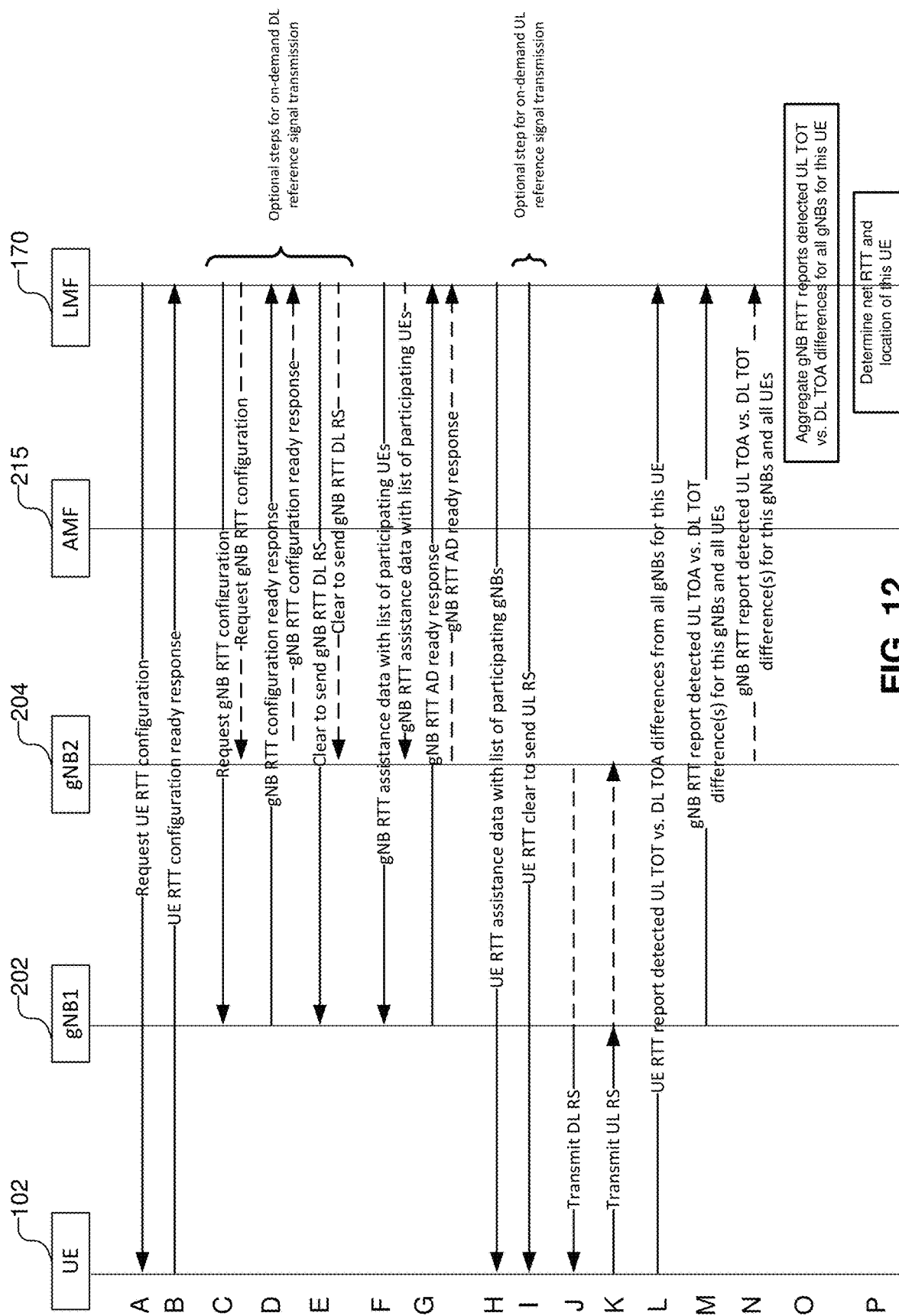
FIG. 12 illustrates a call flow of a Network Initiated Location Request (NI-LR) for RTT measurements for a UE, where the location server is used to request the RTT determination and to aggregate the measured signal data from the gNodeBs.

FIG. 12 illustrates a call flow of a Network Initiated Location Request (NI-LR) for RTT measurements for a UE 102, where the location server 170 is used to request the RTT determination and to aggregate the measured signal data from the gNodeBs 202 and 204. FIG. 12 illustrates, by way of example, the gNodeBs initiating the RTT reference signal transmissions, where the gNodeBs 202 and 204 measure and send the total RTTs to the location server 170 and the UE 102 measures and sends its processing delay Δ to the location server 170. It should be understood, however, that if desired, the UE 102 may initiate the RTT reference signal transmissions, where the UE 102 measures and sends the total RTT to the location server 170 and the gNodeBs 202 and 204 measure and send their respective processing delays Δ to the location server 170.

As illustrated, at stage A, the location server 170 sends a Request UE RTT configuration message to the UE 102.

At stage B, the UE 102 sends a UE RTT configuration ready response message to the location server 170.

Stages C, D, and E are optional steps for on-demand downlink reference signal transmissions. For example, as illustrated at optional stage C, the location server 170 may send to gNodeBs 202 and 204 a Request for gNB RTT configuration message.

At optional stage D, the gNodeBs 202 and 204 may send a gNB RTT configuration ready response message to the location server 170.

At optional stage E, the location server 170 may send to gNodeBs 202 and 204 a Clear to send gNB RTT DL RS message.

At stage F, the location server 170 may send to gNodeBs 202 and 204 a gNB RTT assistance data (AD) with participating UEs message. For example, there may be more than one UE for which RTT measurements are to be determined. The assistance data identifies the UEs with which the gNodeBs 202 and 204 are to engage.

At stage G, the gNodeBs 202 and 204 send gNB RTT AD ready response message to the location server 170.

At stage H, the location server 170 sends to the UE 102 a UE RTT assistance data with list of participating gNBs message. For example, the assistance data identifies gNodeBs 202 and 204, as well as any other gNodeBs with which the UE 102 should engage for an RTT measurement. It should be understood, if there are multiple UEs, the location server 170 may send appropriate assistance data to each UE participating in the RTT determination, if there are multiple UEs.

At optional stage I, the location server 170 sends a UE RTT clear to send UL (uplink) RS message to the UE 102. Optional stage I, for example, may be performed when on-demand UL reference signal transmission.

At stage J, the gNodeBs 202 and 204 each transmit a downlink RTT reference signal to the UE 102.

At stage K, the UE 102 transmit uplink RTT reference signals to the gNodeBs 202 and 204, in response to the downlink RTT reference signals received in stage J, and after a processing delay $\Delta$, e.g., between the TOA of the downlink RTT reference signal and the TOT of the uplink RTT reference signal, which is measured by the UE 102.

At stage L, the UE 102 sends a RTT report of the detected UL TOT vs. DL TOA differences, i.e., the processing delays $\Delta$, for each gNodeB 202 and 204 for the UE.

At stage M, gNodeB 202 sends to the location server 170 a gNB RTT report of the detected UL TOT vs DL TOA differences, i.e., the total RTT, measured by gNodeB 202 for all UEs for which RTT is being measured, including UE 102.

At stage N, gNodeB 204 sends to the location server 170 a gNB RTT report of the detected UL TOT vs DL TOA differences, i.e., the total RTT, measured by gNodeB 204 for all UEs for which RTT is being measured, including UE 102.

At stage O, the location server 170 aggregates the gNB RTT reports for the total RTTs measured by each gNodeB 202 and 204 and the processing delays $\Delta$ for all UEs, including UE 102.

At stage P, the location server 170 may determine the net RTT for each gNodeB 202 and 204, e.g., using the processing delays $\Delta$ measured by UE 102 for each gNodeB 202 and 204, and the total RTT measured by each gNodeB 202 and 204 from the aggregated report of stage O. The location server 170 may determine the location of the UE 102 using the net RTT for at least the gNodeBs 202 and 204 and known positions of the gNodeBs 202 and 204. It is understood that while FIG. 12 illustrates only two gNodeBs for sake of simplicity, for location determination using trilateration RTT measurements from three or more gNodeBs may be used.

As discussed above, if desired, the UE 102 may initiate the RTT reference signal transmissions (e.g., stage K may occur before stage J), where the gNodeBs 202 and 204 measure and send their processing delays $\Delta$ to the location server 170 at stages M and N, and the UE 102 measures the total RTTs, which is used to determine the net RTTs in stage P.

Figure 13:
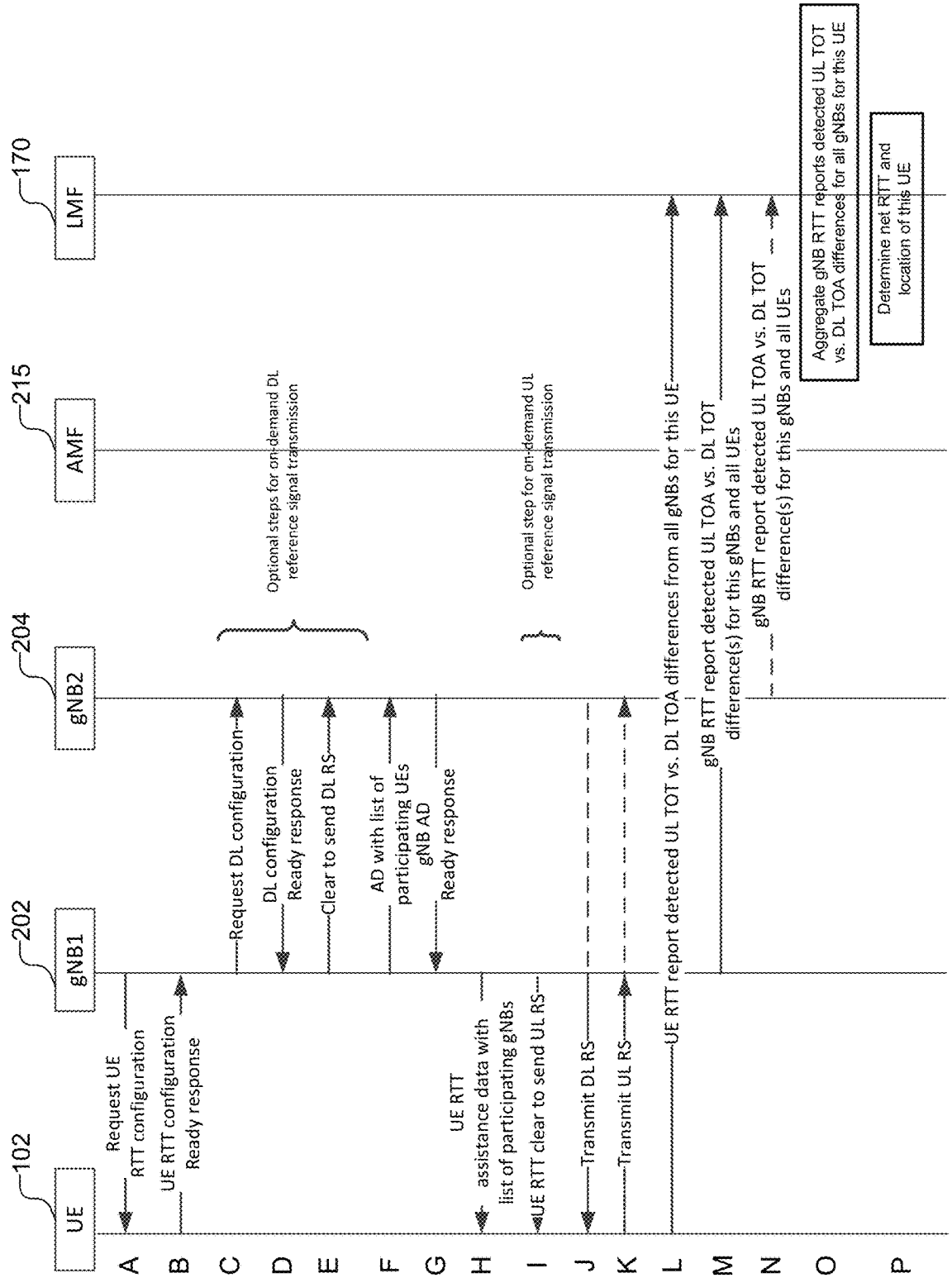
FIG. 13 illustrates a call flow of a Network Initiated Location Request (NI-LR) for RTT measurements for a UE, where the serving gNodeB is used to request the RTT determination and the location server is used to aggregate the measured signal data from the gNodeBs.

FIG. 13 illustrates a call flow of a Network Initiated Location Request (NI-LR) for RTT measurements for a UE 102, where the serving gNodeB 202 is used to request the RTT determination and the location server 170 is used to aggregate the measured signal data from the gNodeBs 202 and 204. Advantageously, by using the serving gNodeB 202, as illustrated in FIG. 13, the end-to-end response time may be less than the implementation illustrated in FIG. 12 because there are fewer hops among the network entities. FIG. 13 illustrates, by way of example, the gNodeBs initiating the RTT reference signal transmissions, where the gNodeBs 202 and 204 measure and send the total RTTs to the location server 170 and the UE 102 measures and sends its processing delay $\Delta$ to the location server 170. It should be understood, however, that if desired, the UE 102 may initiate the RTT reference signal transmissions, where the UE 102 measures and sends the total RTT to the location server 170 and the gNodeBs 202 and 204 measure and send their respective processing delays $\Delta$ to the location server 170.

As illustrated, at stage A, the gNodeB 202 sends a Request UE RTT configuration message to the UE 102.

At stage B, the UE 102 sends a UE RTT configuration ready response message to the gNodeB 202.

Stages C, D, and E are optional steps for on-demand downlink reference signal transmissions. For example, as illustrated at optional stage C, the gNodeB 202 may send to gNodeB 204 a Request DL configuration message.

At optional stage D, the gNodeB 204 may send a DL configuration ready response message to the gNodeB 202.

At optional stage E, the gNodeB 202 may send to gNodeB 204 a Clear to send DL RS message.

At stage F, the gNodeB 202 may send to gNodeB 204 a assistance data (AD) with participating UEs message. For example, there may be more than one UE for which RTT measurements are to be determined. The assistance data identifies the UEs with which the gNodeBs 202 and 204 are to engage.

At stage G, the gNodeB 204 send gNB RTT AD ready response message to the gNodeB 202.

At stage H, the gNodeB 202 sends to the UE 102 a UE RTT assistance data with list of participating gNBs message. For example, the assistance data identifies gNodeBs 202 and 204, as well as any other gNodeBs with which the UE 102 should engage for an RTT measurement. It should be understood, if there are multiple UEs, the gNodeB 202 may send appropriate assistance data to each UE participating in the RTT determination, if there are multiple UEs.

At optional stage I, the gNodeB 202 sends a UE RTT clear to send UL (uplink) RS message to the UE 102. Optional stage I, for example, may be performed when on-demand UL reference signal transmission.

At stage J, the gNodeBs 202 and 204 each transmit a downlink RTT reference signal to the UE 102.

At stage K, the UE 102 transmit uplink RTT reference signals to the gNodeBs 202 and 204, in response to the downlink RTT reference signals received in stage J, and after a processing delay $\Delta$, e.g., between the TOA of the downlink RTT reference signal and the TOT of the uplink RTT reference signal, which is measured by the UE 102.

At stage L, the UE 102 sends a RTT report of the detected UL TOT vs. DL TOA differences, i.e., the processing delays Δ, for each gNodeB 202 and 204 for the UE.

At stage M, gNodeB 202 sends to the location server 170 a gNB RTT report of the detected UL TOT vs DL TOA differences, i.e., the total RTT, measured by gNodeB 202 for all UEs for which RTT is being measured, including UE 102.

At stage N, gNodeB 204 sends to the location server 170 a gNB RTT report of the detected UL TOT vs DL TOA differences, i.e., the total RTT, measured by gNodeB 204 for all UEs for which RTT is being measured, including UE 102.

At stage O, the location server 170 aggregates the gNB RTT reports for the total RTTs measured by each gNodeB 202 and 204 and the processing delays Δ for all UEs, including UE 102.

At stage P, the location server 170 may determine the net RTT for each gNodeB 202 and 204, e.g., using the processing delays Δ measured by UE 102 for each gNodeB 202 and 204, and the total RTT measured by each gNodeB 202 and 204 from the aggregated report of stage O. The location server 170 may determine the location of the UE 102 using the net RTT for at least the gNodeBs 202 and 204 and known positions of the gNodeBs 202 and 204. It is understood that while FIG. 12 illustrates only two gNodeBs for sake of simplicity, for location determination using trilateration RTT measurements from three or more gNodeBs may be used.

As discussed above, if desired, the UE 102 may initiate the RTT reference signal transmissions (e.g., stage K may occur before stage J), where the gNodeBs 202 and 204 measure and send their processing delays Δ to the location server 170 at stages M and N, and the UE 102 measures the total RTTs, which is used to determine the net RTTs in stage P.

Figure 14:
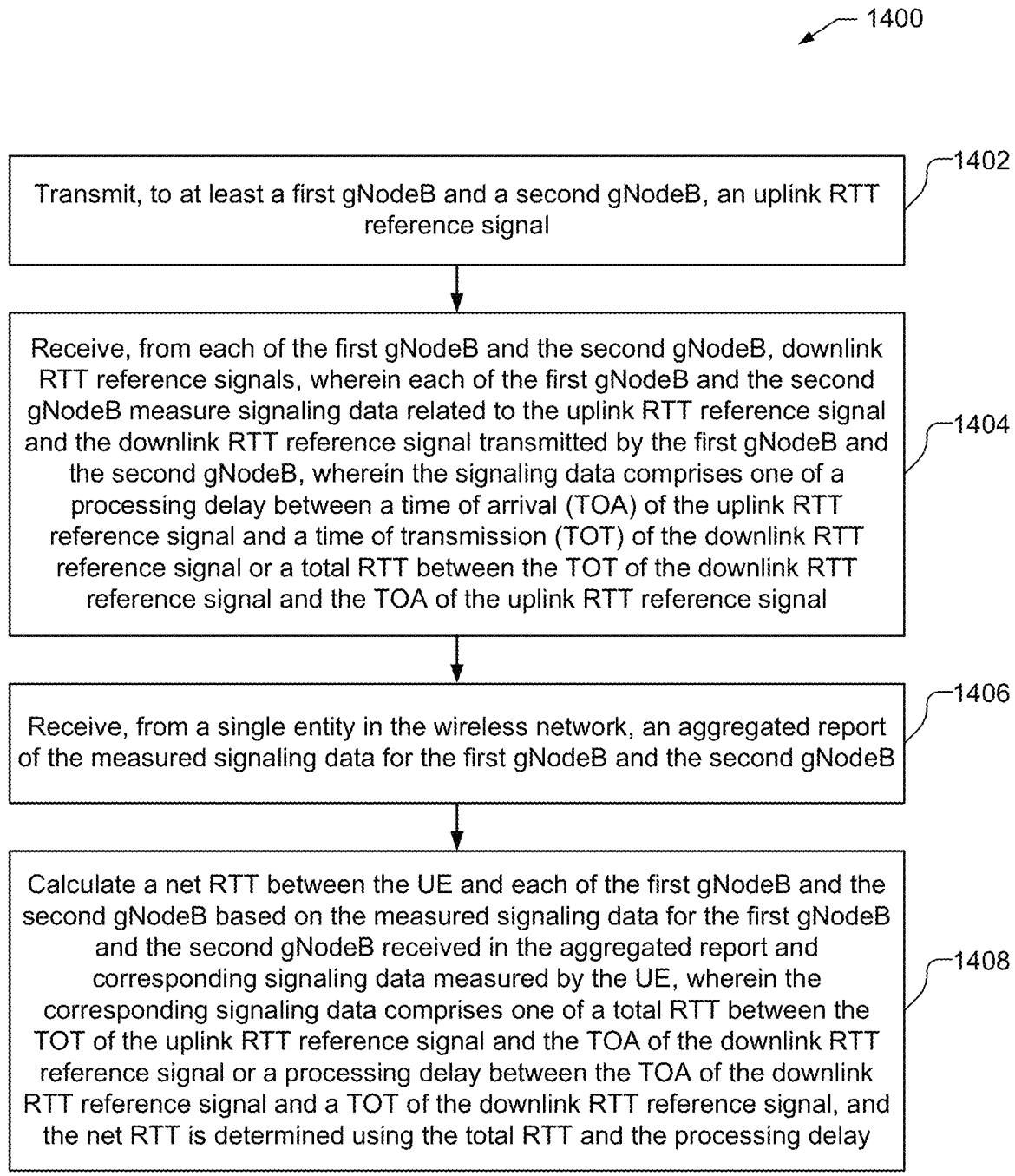
FIG. 14 illustrates an exemplary method for determining RTT of a UE performed by a UE according to an aspect of the disclosure.

FIG. 14 illustrates an exemplary method 1400 for determining a round-trip time (RTT) for signals between a user equipment (UE) (e.g., UE 102) and a plurality of network nodes (gNodeBs) (e.g., gNodeBs 202-204) in a wireless network performed by the UE 102. In an aspect, the first gNodeB is a serving gNodeB for the UE 102. The method 1400 may be performed by, for example, the communication system 900 illustrated in FIG. 9 employing one or more of the call flows described in FIGS. 10-11.

At 1402, the UE 102 transmits, to at least a first gNodeB and a second gNodeB, an uplink RTT reference signal, e.g., as illustrated at stage I in FIGS. 10 and 11.

At 1404, the UE 102 receives, from each of the first gNodeB and the second gNodeB, downlink RTT reference signals, wherein each of the first gNodeB and the second gNodeB measure signaling data related to the uplink RTT reference signal and the downlink RTT reference signal transmitted by the first gNodeB and the second gNodeB, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal. By way of example, step 1404 is illustrated at stage J in FIGS. 10 and 11.

At 1406, the UE 102 receives, from a single entity in the wireless network, an aggregated report of the measured signaling data for the first gNodeB and the second gNodeB, as illustrated at stage N in FIG. 10 and stage M in FIG. 11.

At 1408, the UE calculates a net RTT between the UE and each of the first gNodeB and the second gNodeB based on the measured signaling data for the first gNodeB and the second gNodeB received in the aggregated report and corresponding signaling data measured by the UE, wherein the corresponding signaling data comprises one of a total RTT between the TOT of the uplink RTT reference signal and the TOA of the downlink RTT reference signal or a processing delay between the TOA of the downlink RTT reference signal and a TOT of the downlink RTT reference signal, and the net RTT is determined using the total RTT and the processing delay. Step 1408, for example, is illustrated at stage O in FIG. 10 and stage P in FIG. 11.

In one aspect, the UE 102 may further determine a location of the UE using at least the net RTT between the UE and each of the first gNodeB and the second gNodeB and a known position of the each of the first gNodeB and the second gNodeB, as illustrated at stage O in FIG. 10 and stage P in FIG. 11.

In one aspect, the uplink RTT reference signal is transmitted before receiving the downlink RTT reference signals from each of the first gNodeB and the second gNodeB, and wherein the signaling data measured by the first gNodeB and the second gNodeB comprises the processing delay in the first gNodeB and the second gNodeB, and the corresponding signaling data measured by the UE comprises the total RTT.

In one aspect, separate uplink RTT reference signals are transmitted to the first gNodeB and the second gNodeB after receiving the downlink RTT reference signals, and wherein the signaling data measured by the first gNodeB and the second gNodeB comprises the total RTT, and the corresponding signaling data measured by the UE comprises the processing delay in the UE.

In one aspect, the single entity in the wireless network is the first gNodeB, e.g., as illustrated at stage M in FIG. 11. For example, the first gNodeB may be a serving gNodeB for the UE.

In one aspect, the single entity in the wireless network is a location server, e.g., as illustrated at stage N in FIG. 10.

In one aspect, the second gNodeB is a neighbor gNodeB of the first gNodeB within a communication range.

Figure 15:
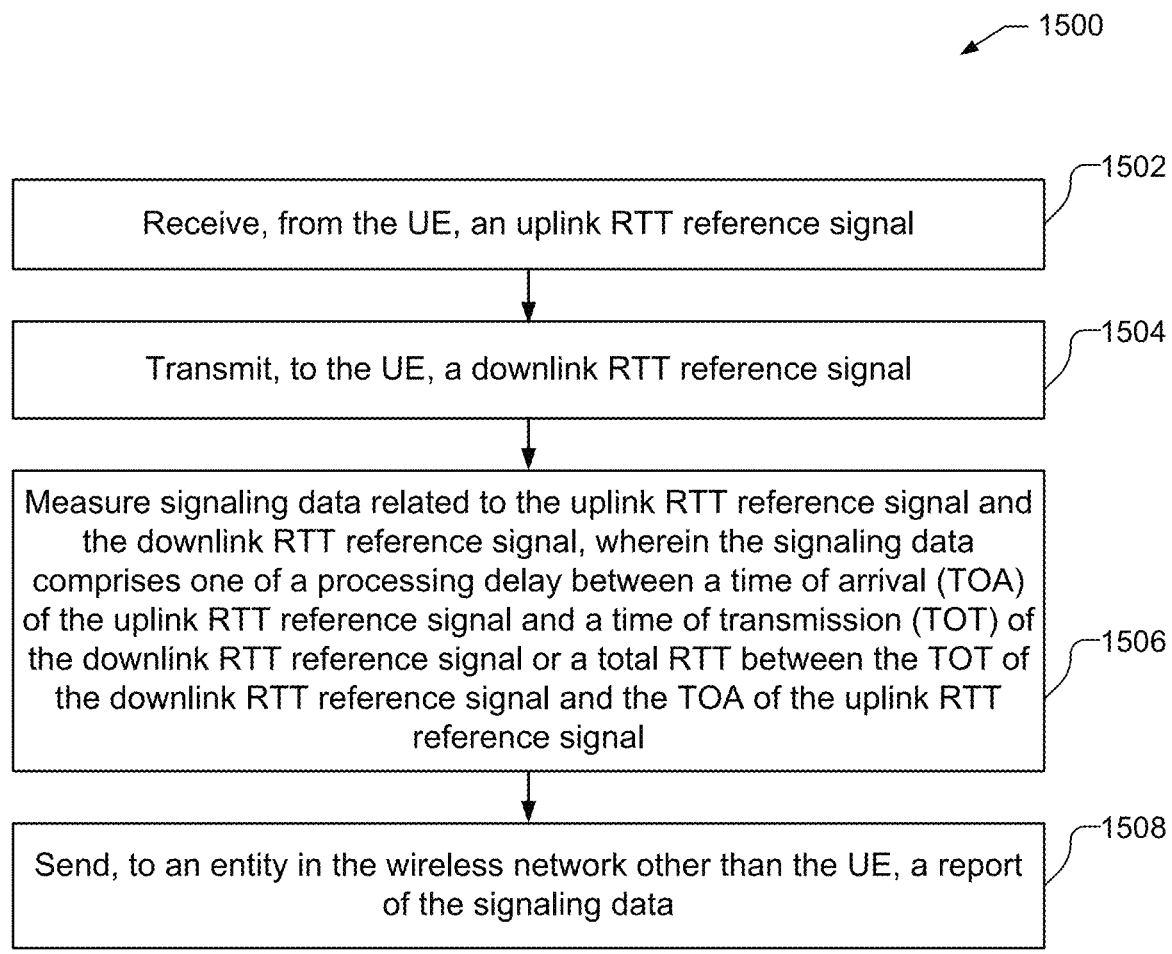
FIG. 15 illustrates an exemplary method for determining RTT of a UE performed by a gNodeB according to an aspect of the disclosure.

FIG. 15 illustrates an exemplary method 1500 for determining a round-trip time (RTT) for signals between a user equipment (UE) (e.g., UE 102) and a plurality of network nodes (gNodeBs) (e.g., gNodeBs 202-204) in a wireless network performed by a first gNodeB (e.g., gNodeB 202 or 204) in the plurality of gNodeBs. In an aspect, the first gNodeB is a serving gNodeB for the UE 102. In another aspect, the first gNodeB may be a neighboring gNodeB. The method 1500 may be performed by, for example, the communication system 900 illustrated in FIG. 9 employing one or more of the call flows described in FIGS. 10-13.

At 1502, the first gNodeB receives, from the UE, an uplink RTT reference signal, as illustrated, e.g., at stage I in FIGS. 10 and 11 and stage K at FIGS. 12 and 13.

At 1504, the first gNodeB transits, to the UE, a downlink RTT reference signal as illustrated, e.g., at stage J in FIGS. 10 and 11 and stage J at FIGS. 12 and 13.

At 1506, the first gNodeB measures signaling data related to the uplink RTT reference signal and the downlink RTT reference signal, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal, as illustrated at stage J in FIGS. 10 and 11 and stage J at FIGS. 12 and 13.

At 1508, the first gNodeB sends, to an entity in the wireless network other than the UE, a report of the signaling data, as illustrated at stage K or L in FIG. 10, stage K in FIG. 11, stages M or N in FIGS. 12 and 13.

In an aspect, the uplink RTT reference signal is received before the downlink RTT reference signal is transmitted, and wherein the signaling data measured by the first gNodeB comprises the processing delay in the first gNodeB.

In an aspect, the uplink RTT reference signal is received after the downlink RTT reference signal is transmitted, and wherein the signaling data measured by the first gNodeB comprises the total RTT.

In an aspect, the entity in the wireless network other than the UE is a second gNodeB, as illustrated at stage K in FIG. 11.

In an aspect, the entity in the wireless network other than the UE is a location server, as illustrated at stages K and L in FIG. 10 and stages M and N in FIGS. 12 and 13. For example, the first gNodeB is a serving gNodeB for the UE, as illustrated at stage K in FIG. 10 and stage M in FIGS. 12 and 13.

In an aspect, the report of the signaling data is sent to the entity in the wireless network other than the UE using a core network or integrated access and backhaul (IAB).

In an aspect, the first gNodeB may further receive, from a second UE, a second uplink RTT reference signal, transmit, to the second UE, a second downlink RTT reference signal, and measure a second signaling data related to the second uplink RTT reference signal and the second downlink RTT reference signal, wherein the second signaling data comprises one of a second processing delay between a TOA of the second uplink RTT reference signal and a TOT of the second downlink RTT reference signal or a second total RTT between the TOT of the second downlink RTT reference signal and the TOA of the second uplink RTT reference signal. For example, the first gNodeB may receive, from a second gNodeB, a report of a third signaling data measured by the second gNodeB related to the second uplink RTT reference signal and third downlink RTT reference signal transmitted by the second gNodeB, wherein the third signaling data comprises one of a third processing delay between a TOA of the second uplink RTT reference signal and a TOT of the third downlink RTT reference signal or a third total RTT between the TOT of the third downlink RTT reference signal and the TOA of the second uplink RTT reference signal, as illustrated at stage K in FIG. 11. The first gNodeB may aggregate the second signaling data and the third signaling data, as illustrated at stage L of FIG. 11. The first gNodeB may transmit, to the second UE, an aggregated report of the second signaling data and the third signaling data, as illustrated at stage M in FIG. 11. For example, the second signaling data may be sent to the entity in the wireless network other than the UE in the report of the signaling data, as illustrated at stages K in FIGS. 10 and 11, and stage M in FIGS. 12 and 13.

In an aspect, the entity in the wireless network other than the UE receives, from at least one other gNodeB, a report of signaling data measured by the other gNodeB related to the uplink RTT reference signal received by the other gNodeB from the UE and a second downlink RTT reference signal transmitted by the other gNodeB to the UE, wherein the signaling data comprises one of a processing delay between a TOA of the uplink RTT reference signal received by the other gNodeB and a TOT of the second downlink RTT reference signal or a total RTT between the TOT of the second downlink RTT reference signal and the TOA of the uplink RTT reference signal received by the other gNodeB, as illustrated at stage N in FIGS. 12 and 13.

Figure 16:
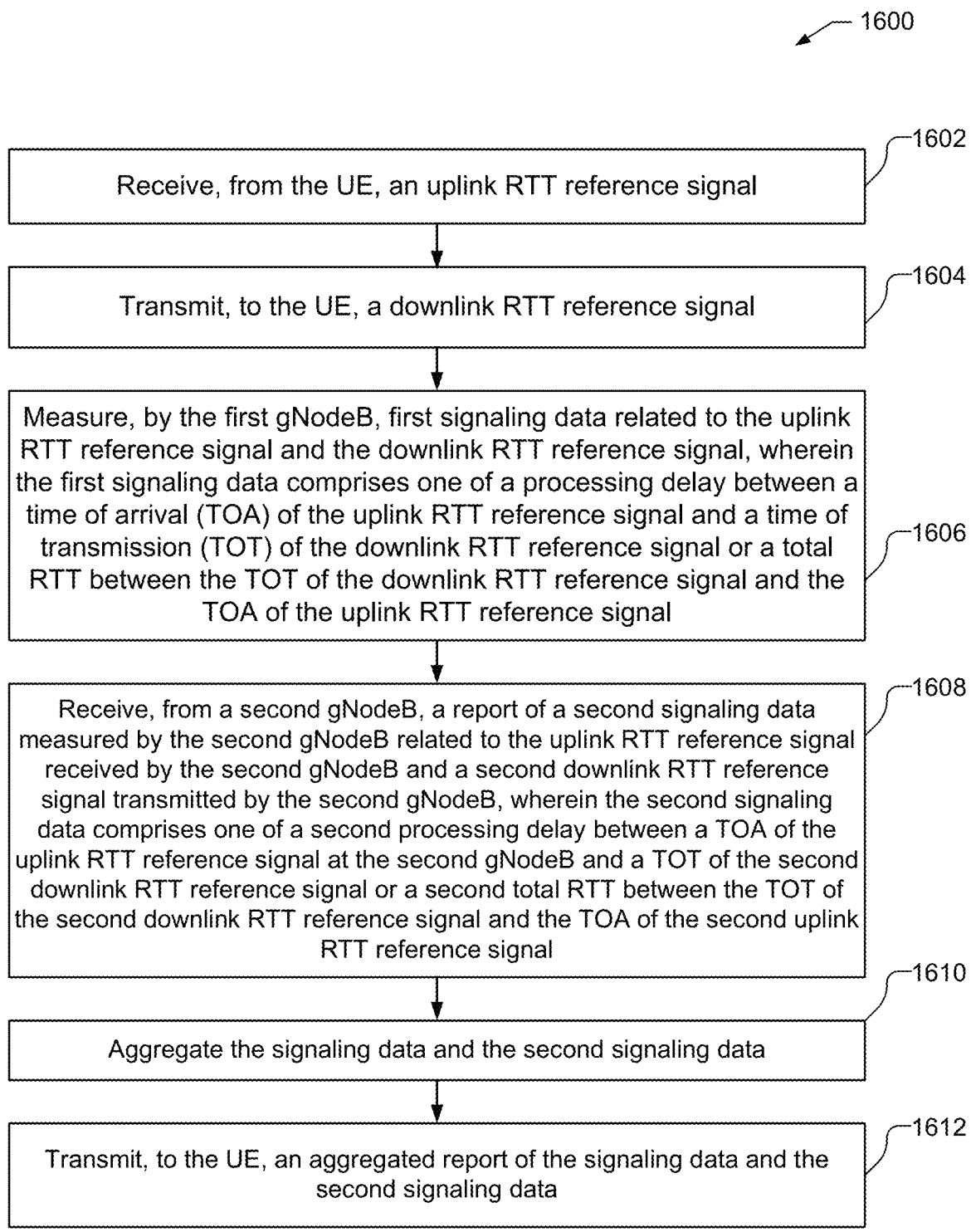
FIG. 16 illustrates another exemplary method for determining RTT of a UE performed by a gNodeB according to an aspect of the disclosure
Figure 17:
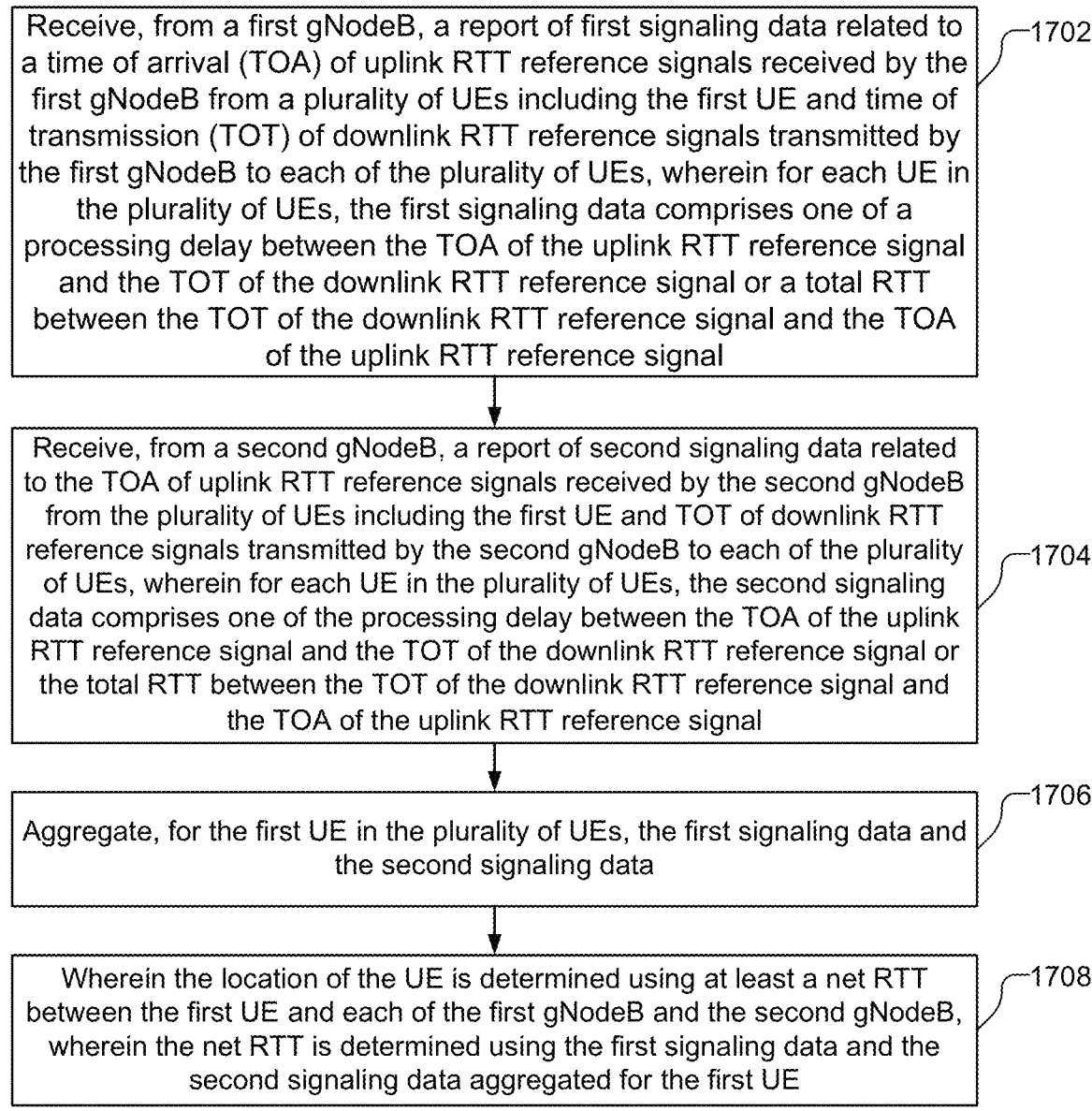
FIG. 17 illustrates an exemplary method for determining RTT of a UE performed by a location server according to an aspect of the disclosure

FIG. 16 illustrates an exemplary method 1600 for determining a round-trip time (RTT) for signals between a user equipment (UE) (e.g., UE 102) and a plurality of network nodes (gNodeBs) (e.g., gNodeBs 202-204) in a wireless network performed by a first gNodeB (e.g., gNodeB 202 or 204) in the plurality of gNodeBs. In an aspect, the first gNodeB is a serving gNodeB for the UE 102. The method 1600 may be performed by, for example, the communication system 900 illustrated in FIG. 9 employing one or more of the call flows described in FIGS. 10-13.

At 1602, the first gNodeB receives, from the UE, an uplink RTT reference signal, as illustrated, e.g., at stage I in FIGS. 10 and 11 and stage K at FIGS. 12 and 13.

At 1604, the first gNodeB transits, to the UE, a downlink RTT reference signal as illustrated, e.g., at stage J in FIGS. 10 and 11 and stage J at FIGS. 12 and 13.

At 1606, the first gNodeB measures first signaling data related to the uplink RTT reference signal and the downlink RTT reference signal, wherein the first signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal, as illustrated at stage J in FIGS. 10 and 11 and stage J at FIGS. 12 and 13.

At 1608, the first gNodeB receives, from a second gNodeB, a report of a second signaling data measured by the second gNodeB related to the uplink RTT reference signal received by the second gNodeB and a second downlink RTT reference signal transmitted by the second gNodeB, wherein the second signaling data comprises one of a second processing delay between a TOA of the uplink RTT reference signal at the second gNodeB and a TOT of the second downlink RTT reference signal or a second total RTT between the TOT of the second downlink RTT reference signal and the TOA of the second uplink RTT reference signal, as illustrated at stage K in FIG. 11.

At 1610, the first gNodeB aggregates the signaling data and the second signaling data, as illustrated at stage L in FIG. 11.

At 1612, the first gNodeB transmits, to the UE, an aggregated report of the signaling data and the second signaling data, as illustrated at stage M in FIG. 11.

In one aspect, the uplink RTT reference signal is received before the downlink RTT reference signal is transmitted, and wherein the signaling data measured by the first gNodeB comprises the processing delay in the first gNodeB and the second signaling data measured by the second gNodeB comprises the processing delay in the second gNodeB.

In one aspect, the uplink RTT reference signal is received after the downlink RTT reference signal is transmitted, and wherein the signaling data measured by the first gNodeB comprises the total RTT measured by the first gNodeB and the second signaling data measured by the second gNodeB comprises the total RTT measured by the second gNodeB.

In one aspect, the first gNodeB is a serving gNodeB for the UE. Additionally, the second gNodeB may be neighbor gNodeB of the first gNodeB within communication range of the UE.

FIG. 16 illustrates an exemplary method 1700 for determining a location for a first user equipment (UE) (e.g., UE 102) using round-trip time (RTT) for signals between the first UE and a plurality of network nodes (gNodeBs) (e.g., gNodeBs 202-204) in a wireless network performed by a location server (e.g., LMF 170). In an aspect, the first gNodeB is a serving gNodeB for the UE 102. The method 1600 may be performed by, for example, the communication system 900 illustrated in FIG. 9 employing one or more of the call flows described in FIGS. 10, 12-13.

At 1702, the location server receives, from a first gNodeB, a report of first signaling data related to a time of arrival (TOA) of uplink RTT reference signals received by the first gNodeB from a plurality of UEs including the first UE and time of transmission (TOT) of downlink RTT reference signals transmitted by the first gNodeB to each of the plurality of UEs, wherein for each UE in the plurality of UEs, the first signaling data comprises one of a processing delay between the TOA of the uplink RTT reference signal and the TOT of the downlink RTT reference signal or a total RTT between the TOT of the downlink RTT reference signal and the TOA of the uplink RTT reference signal, as illustrated at stage K in FIG. 10 and stage M in FIGS. 12 and 13.

At 1704, the location server receives, from a second gNodeB, a report of second signaling data related to the TOA of uplink RTT reference signals received by the second gNodeB from the plurality of UEs including the first UE and TOT of downlink RTT reference signals transmitted by the second gNodeB to each of the plurality of UEs, wherein for each UE in the plurality of UEs, the second signaling data comprises one of the processing delay between the TOA of the uplink RTT reference signal and the TOT of the downlink RTT reference signal or the total RTT between the TOT of the downlink RTT reference signal and the TOA of the uplink RTT reference signal, as illustrated at stage L in FIG. 10 and stage N in FIGS. 12 and 13.

At 1706, the location server aggregates, for the first UE in the plurality of UEs, the first signaling data and the second signaling data, as illustrated at stage M in FIG. 10 and stage O in FIGS. 12 and 13.

At 1708, the location of the UE is determined using at least a net RTT between the first UE and each of the first gNodeB and the second gNodeB, wherein the net RTT is determined using the first signaling data and the second signaling data aggregated for the first UE, as illustrated at stage O in FIG. 10 and stage P in FIGS. 12 and 13.

In one aspect, the first signaling data measured by the first gNodeB comprises the processing delay in the first gNodeB, and the second signaling data measured by the second gNodeB comprises the processing delay in the second gNodeB.

In one aspect, the first signaling data measured by the first gNodeB comprises the total RTT measured by the first gNodeB, and the second signaling data measured by the second gNodeB comprises the total RTT measured by the second gNodeB.

In one aspect, the location server sends, to the first UE, the aggregation of the first signaling data and the second signaling data, as illustrated at stage N in FIG. 10. The first UE determines the net RTT using the first signaling data and the second signaling data and corresponding signaling data measured by the first UE comprising one of a total RTT between the TOT of the uplink RTT reference signal and the TOA of the downlink RTT reference signal or a processing delay between the TOA of the downlink RTT reference signal and a TOT of the downlink RTT reference signal, and the net RTT is determined using the total RTT and the processing delay; and wherein the first UE determines the location for the first UE using at least the net RTT between the UE and each of the first gNodeB and the second gNodeB and a known position of the each of the first gNodeB and the second gNodeB, as illustrated at stage O in FIG. 10. For example, the location determination session may be initiated by the first UE, as illustrated at stage A in FIG. 10.

In one aspect, the location server receives corresponding signaling data measured by the first UE comprising one of a total RTT between the TOT of the uplink RTT reference signal and the TOA of the downlink RTT reference signal or a processing delay between the TOA of the downlink RTT reference signal and a TOT of the downlink RTT reference signal, as illustrated at stage L in FIGS. 12 and 13. The location server determines the net RTT using the aggregation of the first signaling data and the second signaling data for the first UE and the corresponding signaling data measured by the first UE, wherein the net RTT is determined using the total RTT and the processing delay, as illustrated at stage P of FIGS. 12 and 13. The location server determines the location for the first UE using at least the net RTT between the UE and each of the first gNodeB and the second gNodeB and a known position of the each of the first gNodeB and the second gNodeB as illustrated at stage P of FIGS. 12 and 13. For example, the location determination session may be initiated by the location server, as illustrated at stage A in FIG. 12.

In one aspect, the location server may send RTT assistance data to the first gNodeB and the second gNodeB, as illustrated at stage E in FIG. 10 and stage F in FIG. 12. The location server may send RTT assistance data to the UE, as illustrated at stage G in FIG. 10 and stage H in FIG. 12.

In one aspect, RTT assistance data may be sent from the first gNodeB to the second gNodeB, as illustrated by stage F in FIG. 13. Additionally, RTT assistance data may be sent from the first gNodeB to the first UE, as illustrated by stage H in FIG. 13.

In one aspect, the first gNodeB is a serving gNodeB for the first UE.

Figure 18:
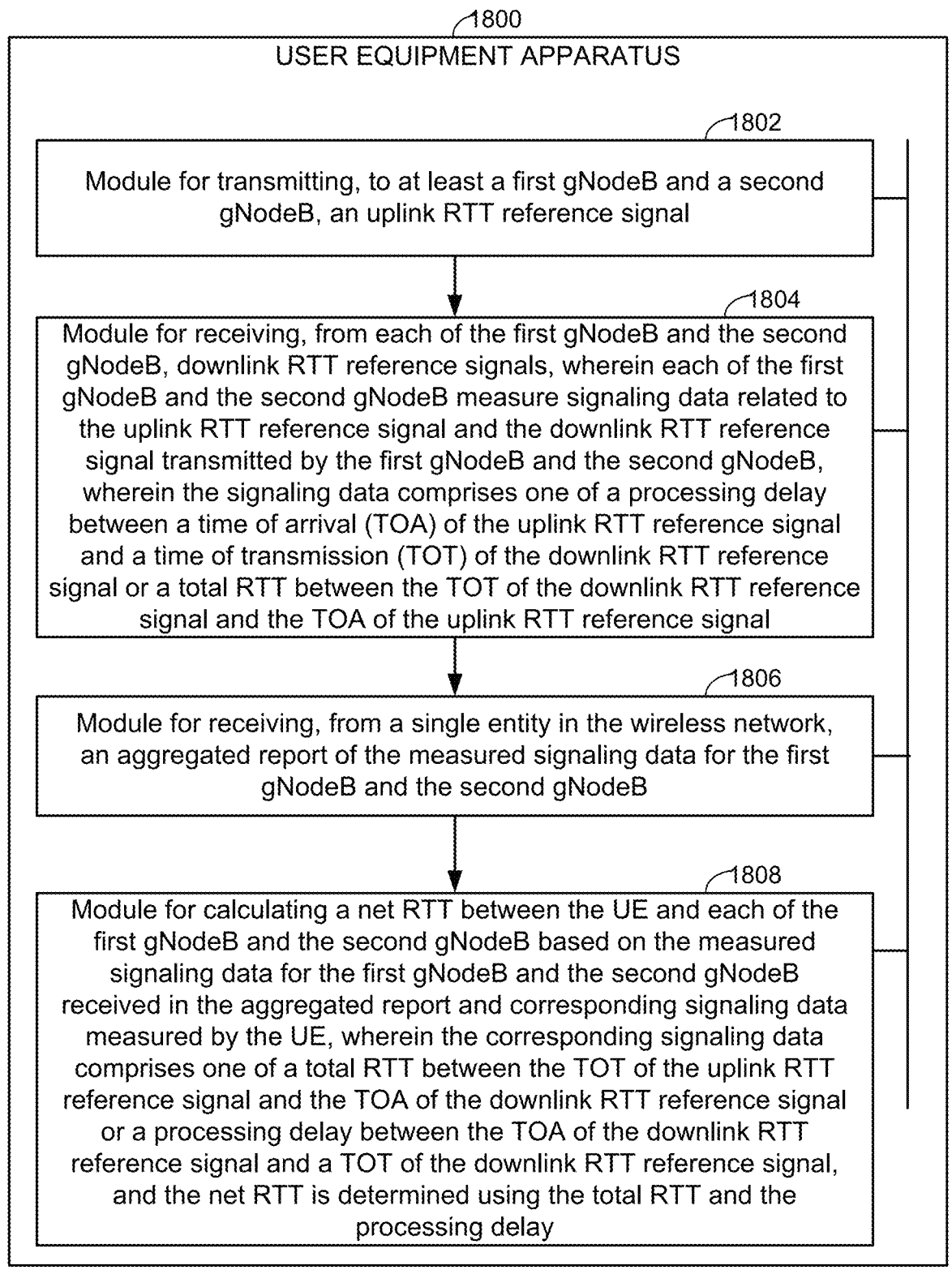
FIGS. 18, 19, 20, and 21 are other simplified block diagrams of several sample aspects of apparatuses configured to support positioning and communication as taught herein.

FIG. 18 illustrates an example user equipment apparatus 1800 represented as a series of interrelated functional modules connected by a common bus. A module for transmitting an uplink RTT reference signal 1802 may correspond at least in some aspects to, for example, a communication device, such as communication device 308 in FIG. 3, and/or a processing system, such as processing system 332 in FIG. 3, as discussed herein. A module for downlink RTT reference signals 1804 may correspond at least in some aspects to, for example, a communication device, such as communication device 308 in FIG. 3, and/or a processing system, such as processing system 332 in FIG. 3, as discussed herein. A module for receiving an aggregated report of the measured signaling data 1806 may correspond at least in some aspects to, for example, a communication device, such as communication device 308 in FIG. 3, and/or a processing system, such as processing system 332 in FIG. 3, as discussed herein. A module for calculating a net RTT 1808 may correspond at least in some aspects to, for example, a communication device, such as communication device 308 in FIG. 3, and/or a processing system, such as processing system 332 in FIG. 3, as discussed herein.

Thus, a user equipment apparatus may include a means for transmitting, to at least a first gNodeB and a second gNodeB, an uplink RTT reference signal, which may be, e.g., the transmitter 310 and one or more processors in processing system 332 with dedicated hardware or implementing executable code or software instructions in memory component 338 such as the module for transmitting an uplink RTT reference signal 1802. A means for receiving, from each of the first gNodeB and the second gNodeB, downlink RTT reference signals, wherein each of the first gNodeB and the second gNodeB measure signaling data related to the uplink RTT reference signal and the downlink RTT reference signal transmitted by the first gNodeB and the second gNodeB, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal may be, e.g., the receiver 312 and one or more processors in processing system 332 with dedicated hardware or implementing executable code or software instructions in memory component 338 such as the module for downlink RTT reference signals 1804. A means for receiving, from a single entity in the wireless network, an aggregated report of the measured signaling data for the first gNodeB and the second gNodeB may be, e.g., the receiver 312 and one or more processors in processing system 332 with dedicated hardware or implementing executable code or software instructions in memory component 338 such as the module for receiving an aggregated report of the measured signaling data 1806. A means for calculating a net RTT between the UE and each of the first gNodeB and the second gNodeB based on the measured signaling data for the first gNodeB and the second gNodeB received in the aggregated report and corresponding signaling data measured by the UE, wherein the corresponding signaling data comprises one of a total RTT between the TOT of the uplink RTT reference signal and the TOA of the downlink RTT reference signal or a processing delay between the TOA of the downlink RTT reference signal and a TOT of the downlink RTT reference signal, and the net RTT is determined using the total RTT and the processing delay may be, e.g., one or more processors in the processing system 332 with dedicated hardware or implementing executable code or software instructions in memory component 338 such as the module for calculating a net RTT 1808.

Additionally, the user equipment apparatus may include a means for determining a location of the UE using at least the net RTT between the UE and each of the first gNodeB and the second gNodeB and a known position of the each of the first gNodeB and the second gNodeB, which may be, e.g., one or more processors in the processing system 332 with dedicated hardware or implementing executable code or software instructions in memory component 338.

Figure 19:
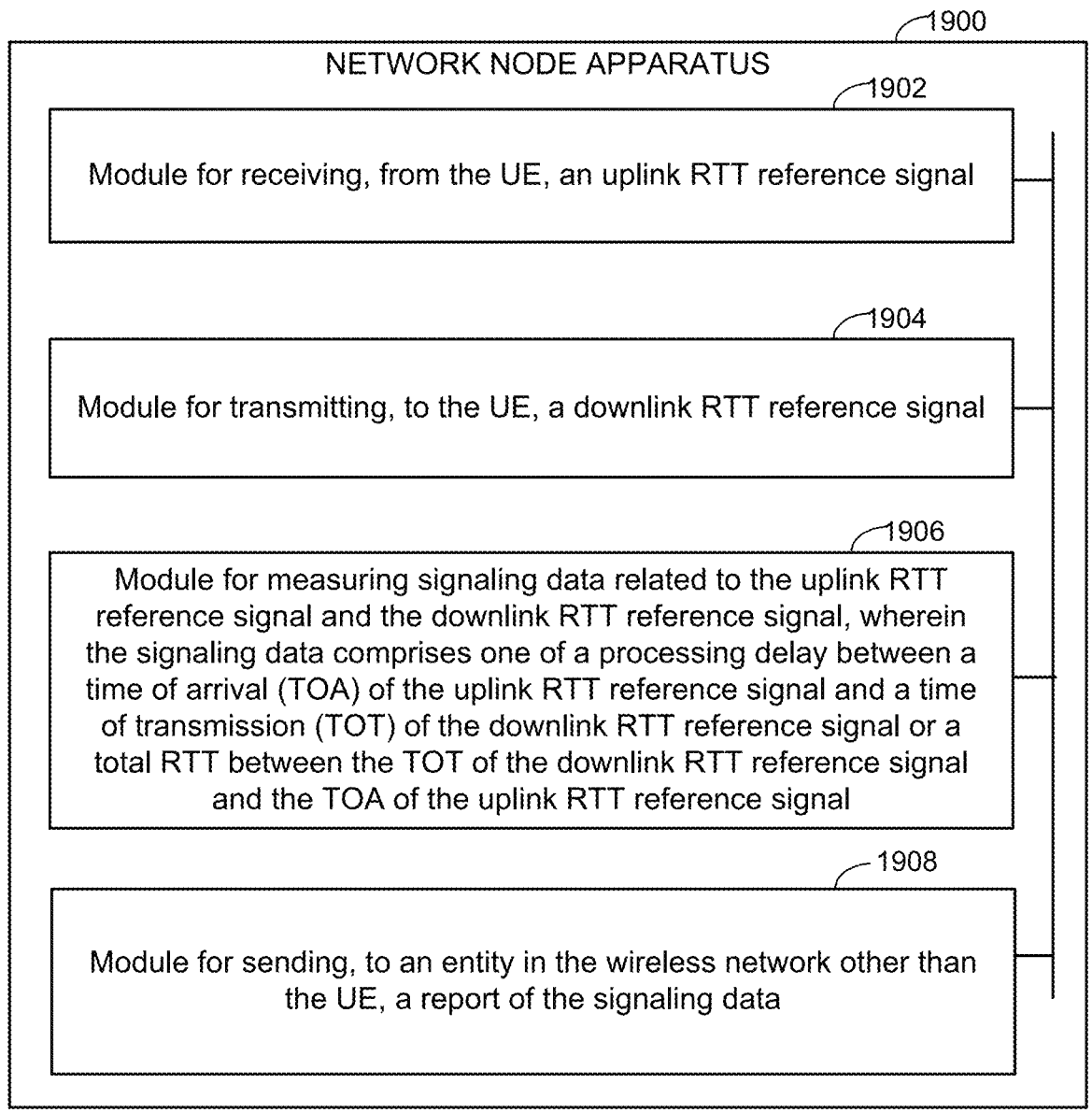

FIG. 19 illustrates an example network node apparatus 1900 (e.g., a gNodeB) represented as a series of interrelated functional modules connected by a common bus. A module for receiving an uplink RTT reference signal 1902 may correspond at least in some aspects to, for example, a communication device, such as communication device 314 in FIG. 3, and/or a processing system, such as processing system 334 in FIG. 3, as discussed herein. A module for transmitting a downlink RTT reference signal 1904 may correspond at least in some aspects to, for example, a communication device, such as communication device 314 in FIG. 3, and/or a processing system, such as processing system 334 in FIG. 3, as discussed herein. A module for measuring signaling data 1906 may correspond at least in some aspects to, for example, a processing system, such as processing system 334 in FIG. 3, as discussed herein. A module for sending a report of the signaling data 1908 may correspond at least in some aspects to, for example, a communication device, such as communication device 314 in FIG. 3, and/or a processing system, such as processing system 334 in FIG. 3, as discussed herein.

Thus, a network node apparatus may include a means for receiving, from the UE, an uplink RTT reference signal, which may be, e.g., the receiver 318 and one or more processors in processing system 334 with dedicated hardware or implementing executable code or software instructions in memory component 340 such as the module for receiving an uplink RTT reference signal 1902. A means for transmitting, to the UE, a downlink RTT reference signal may be, e.g., the transmitter 316 and one or more processors in processing system 334 with dedicated hardware or implementing executable code or software instructions in memory component 340 such as the module for transmitting a downlink RTT reference signal 1904. A means for measuring signaling data related to the uplink RTT reference signal and the downlink RTT reference signal, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal may be, e.g., one or more processors in processing system 334 with dedicated hardware or implementing executable code or software instructions in memory component 340 such as the module for measuring signaling data 1906. A means for sending, to an entity in the wireless network other than the UE, a report of the signaling data may be, e.g., the transmitter 322 and one or more processors in processing system 334 with dedicated hardware or implementing executable code or software instructions in memory component 340 such as the module for sending a report of the signaling data 1908.

In addition, the network node apparatus may include a means for receiving, from a second UE, a second uplink RTT reference signal, which may be, e.g., the receiver 318 and one or more processors in processing system 334 with dedicated hardware or implementing executable code or software instructions in memory component 340 such as the module for receiving an uplink RTT reference signal 1902. A means for transmitting, to the second UE, a second downlink RTT reference signal may be, e.g., the transmitter 316 and one or more processors in processing system 334 with dedicated hardware or implementing executable code or software instructions in memory component 340 such as the module for transmitting a downlink RTT reference signal 1904. A means for measuring a second signaling data related to the second uplink RTT reference signal and the second downlink RTT reference signal, wherein the second signaling data comprises one of a second processing delay between a TOA of the second uplink RTT reference signal and a TOT of the second downlink RTT reference signal or a second total RTT between the TOT of the second downlink RTT reference signal and the TOA of the second uplink RTT reference signal may be, e.g., one or more processors in processing system 334 with dedicated hardware or implementing executable code or software instructions in memory component 340 such as the module for measuring signaling data 1906. In addition, the network node apparatus may include a means for receiving, from a second gNodeB, a report of a third signaling data measured by the second gNodeB related to the second uplink RTT reference signal and third downlink RTT reference signal transmitted by the second gNodeB, wherein the third signaling data comprises one of a third processing delay between a TOA of the second uplink RTT reference signal and a TOT of the third downlink RTT reference signal or a third total RTT between the TOT of the third downlink RTT reference signal and the TOA of the second uplink RTT reference signal, which may be, e.g., the receiver 318 and one or more processors in processing system 334 with dedicated hardware or implementing executable code or software instructions in memory component 340 such as the module for receiving an uplink RTT reference signal 1902. A means for aggregating the second signaling data and the third signaling data may be, e.g., one or more processors in processing system 334 with dedicated hardware or implementing executable code or software instructions in memory component 340. A means for transmitting, to the second UE, an aggregated report of the second signaling data and the third signaling data may be, e.g., the transmitter 316 and one or more processors in processing system 334 with dedicated hardware or implementing executable code or software instructions in memory component 340.

Figure 20:
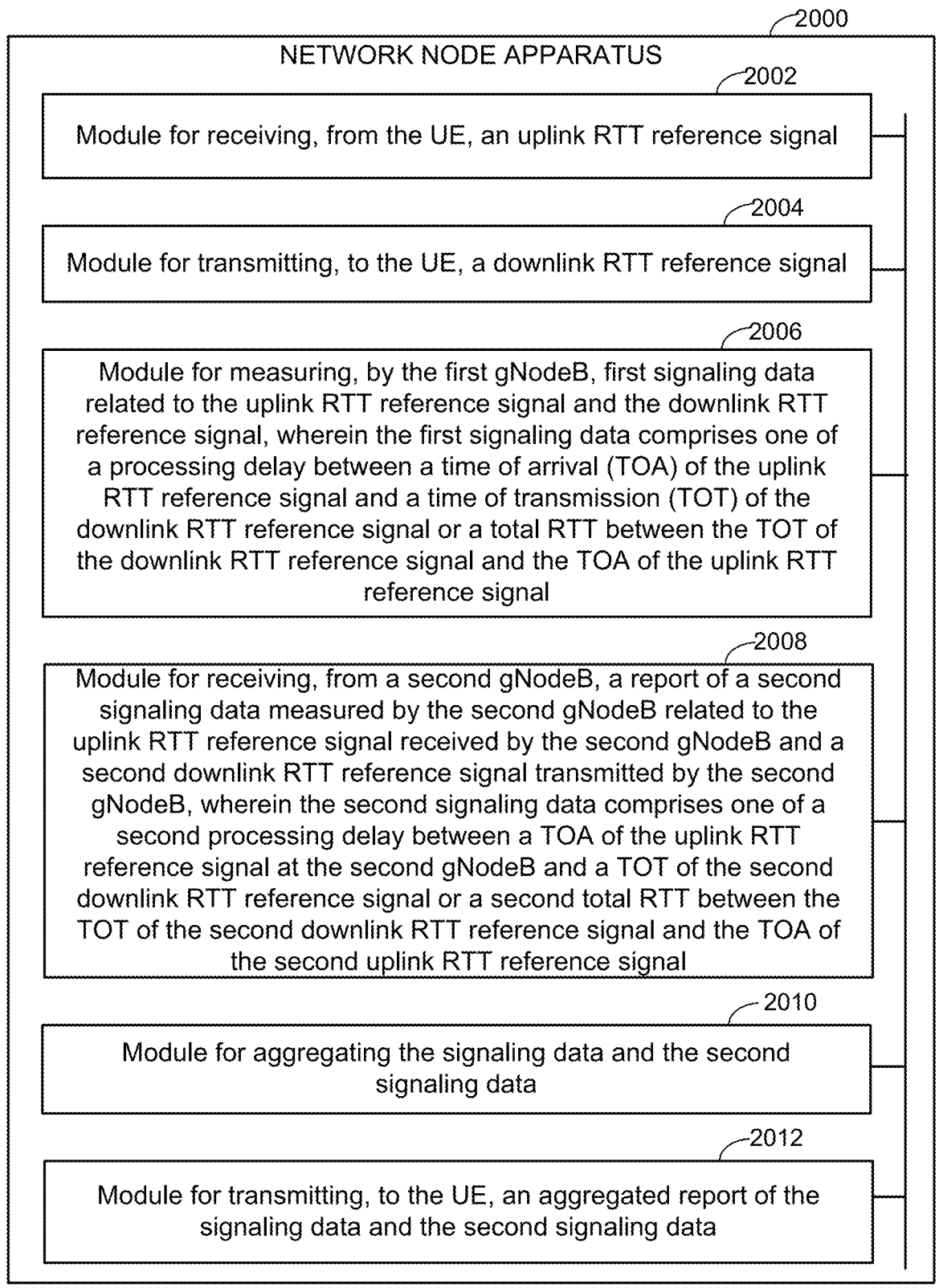

FIG. 20 illustrates another example network node apparatus 2000 (e.g., a gNodeB) represented as a series of interrelated functional modules connected by a common bus. A module for receiving an uplink RTT reference signal 2002 may correspond at least in some aspects to, for example, a communication device, such as communication device 314 in FIG. 3, and/or a processing system, such as processing system 334 in FIG. 3, as discussed herein. A module for transmitting a downlink RTT reference signal 2004 may correspond at least in some aspects to, for example, a communication device, such as communication device 314 in FIG. 3, and/or a processing system, such as processing system 334 in FIG. 3, as discussed herein. A module for measuring signaling data 2006 may correspond at least in some aspects to, for example, a processing system, such as processing system 334 in FIG. 3, as discussed herein. A module for receiving a report of a signaling data measured by the second gNodeB 2008 may correspond at least in some aspects to, for example, a communication device, such as communication device 314 in FIG. 3, and/or a processing system, such as processing system 334 in FIG. 3, as discussed herein. A module for aggregating the signaling data 2010 may correspond at least in some aspects to, for example, a processing system, such as processing system 334 in FIG. 3, as discussed herein. A module for transmitting an aggregated report of the signaling data 2012 may correspond at least in some aspects to, for example, a communication device, such as communication device 314 in FIG. 3, and/or a processing system, such as processing system 334 in FIG. 3, as discussed herein.

Thus, a network node apparatus (first gNodeB) may include a means for receiving, from the UE, an uplink RTT reference signal, which may be, e.g., the receiver 318 and one or more processors in processing system 334 with dedicated hardware or implementing executable code or software instructions in memory component 340 such as the module for receiving an uplink RTT reference signal 2002. A means for transmitting, to the UE, a downlink RTT reference signal may be, e.g., the transmitter 316 and one or more processors in processing system 334 with dedicated hardware or implementing executable code or software instructions in memory component 340 such as the module for transmitting a downlink RTT reference signal 2004. A means for measuring, by the first gNodeB, first signaling data related to the uplink RTT reference signal and the downlink RTT reference signal, wherein the first signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal may be, e.g., one or more processors in processing system 334 with dedicated hardware or implementing executable code or software instructions in memory component 340 such as the module for measuring signaling data 2006. A means for receiving, from a second gNodeB, a report of a second signaling data measured by the second gNodeB related to the uplink RTT reference signal received by the second gNodeB and a second downlink RTT reference signal transmitted by the second gNodeB, wherein the second signaling data comprises one of a second processing delay between a TOA of the uplink RTT reference signal at the second gNodeB and a TOT of the second downlink RTT reference signal or a second total RTT between the TOT of the second downlink RTT reference signal and the TOA of the second uplink RTT reference signal may be, e.g., the receiver 318 and one or more processors in processing system 334 with dedicated hardware or implementing executable code or software instructions in memory component 340 such as the module for receiving a report of a signaling data measured by the second gNodeB 2008. A means for aggregating the signaling data and the second signaling data may be, e.g., one or more processors in processing system 334 with dedicated hardware or implementing executable code or software instructions in memory component 340 such as the module for aggregating the signaling data 2010. A means for transmitting, to the UE, an aggregated report of the signaling data and the second signaling data may be, e.g., the transmitter 316 and one or more processors in processing system 334 with dedicated hardware or implementing executable code or software instructions in memory component 340 such as the module for transmitting an aggregated report of the signaling data 2012.

Figure 21:
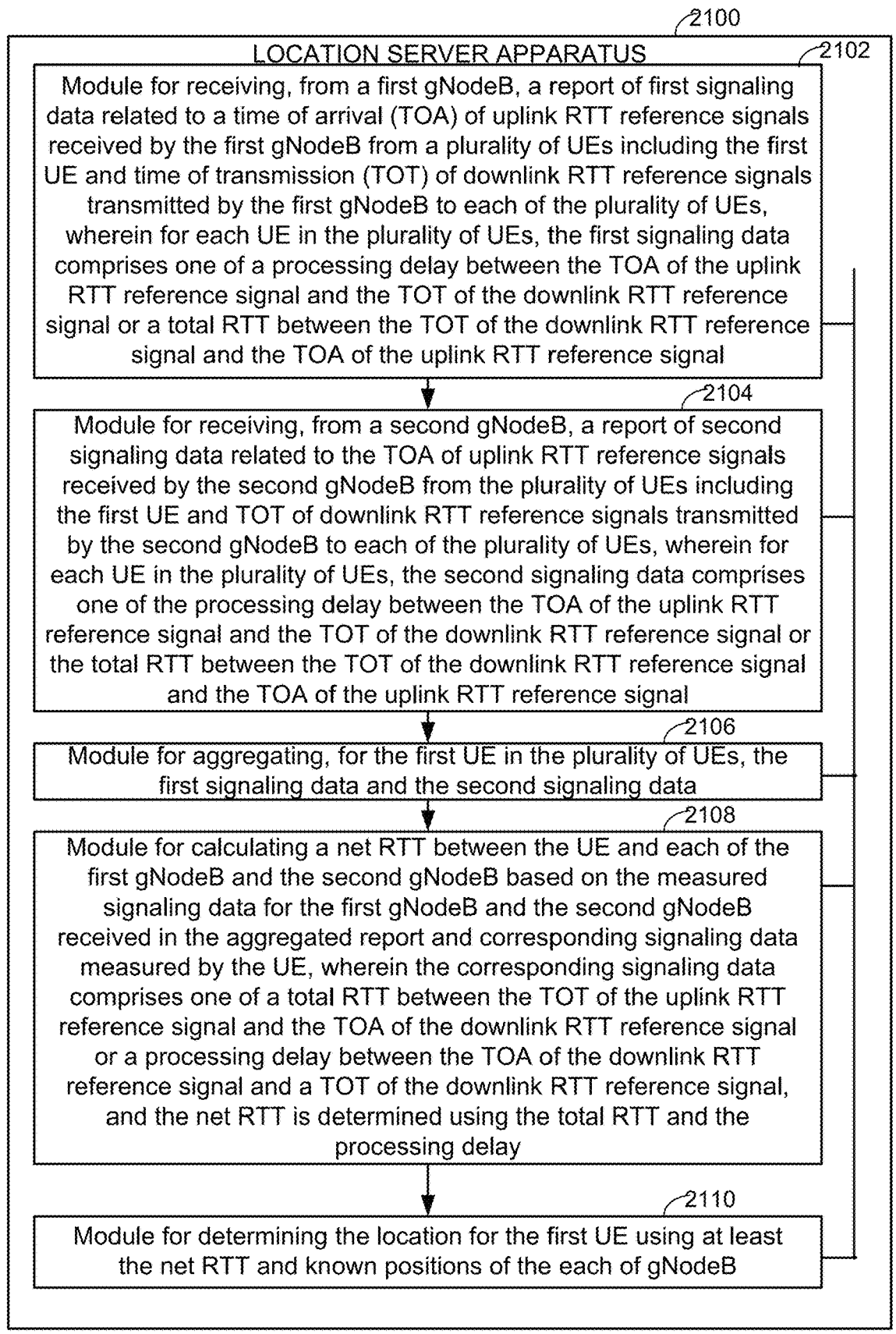

FIG. 21 illustrates another example network node apparatus 2100 (e.g., a location server) represented as a series of interrelated functional modules connected by a common bus. A module for receiving a report of first signaling data 2102 may correspond at least in some aspects to, for example, a communication device, such as communication device 326 in FIG. 3, and/or a processing system, such as processing system 336 in FIG. 3, as discussed herein. A module for receiving a report of second signaling data 2104 may correspond at least in some aspects to, for example, a communication device, such as communication device 326 in FIG. 3, and/or a processing system, such as processing system 336 in FIG. 3, as discussed herein. A module for aggregating the first signaling data and the second signaling data 2106 may correspond at least in some aspects to, for example, a processing system, such as processing system 336 in FIG. 3, as discussed herein. In some implementations, the network node apparatus 2100 may include a module for calculating the net RTT 2108, which may correspond at least in some aspects to, for example, a processing system, such as processing system 336 in FIG. 3, as discussed herein. In some implementations, the network node apparatus 2100 may also include a module for determining the location of the first UE 2110, which may correspond at least in some aspects to, for example, a processing system, such as processing system 336 in FIG. 3, as discussed herein.

Thus, a location server may include a means for receiving, from a first gNodeB, a report of first signaling data related to a time of arrival (TOA) of uplink RTT reference signals received by the first gNodeB from a plurality of UEs including the first UE and time of transmission (TOT) of downlink RTT reference signals transmitted by the first gNodeB to each of the plurality of UEs, wherein for each UE in the plurality of UEs, the first signaling data comprises one of a processing delay between the TOA of the uplink RTT reference signal and the TOT of the downlink RTT reference signal or a total RTT between the TOT of the downlink RTT reference signal and the TOA of the uplink RTT reference signal, which may be, e.g., the receiver 330 and one or more processors in processing system 336 with dedicated hardware or implementing executable code or software instructions in memory component 342 such as the module for receiving a report of first signaling data 2102. A means for receiving, from a second gNodeB, a report of second signaling data related to the TOA of uplink RTT reference signals received by the second gNodeB from the plurality of UEs including the first UE and TOT of downlink RTT reference signals transmitted by the second gNodeB to each of the plurality of UEs, wherein for each UE in the plurality of UEs, the second signaling data comprises one of the processing delay between the TOA of the uplink RTT reference signal and the TOT of the downlink RTT reference signal or the total RTT between the TOT of the downlink RTT reference signal and the TOA of the uplink RTT reference signal may be, e.g., the receiver 330 and one or more processors in processing system 336 with dedicated hardware or implementing executable code or software instructions in memory component 342 such as the module for receiving a report of second signaling data 2104. A means for aggregating, for the first UE in the plurality of UEs, the first signaling data and the second signaling data may be, e.g., one or more processors in processing system 336 with dedicated hardware or implementing executable code or software instructions in memory component 342 such as the module for aggregating the first signaling data and the second signaling data 2106. The location of the UE may be determined using at least a net RTT between the first UE and each of the first gNodeB and the second gNodeB, wherein the net RTT is determined using the first signaling data and the second signaling data aggregated for the first UE.

In addition, the location server may include means for receiving corresponding signaling data measured by the first UE comprising one of a total RTT between the TOT of the uplink RTT reference signal and the TOA of the downlink RTT reference signal or a processing delay between the TOA of the downlink RTT reference signal and a TOT of the downlink RTT reference signal, which may be, e.g., the receiver 330 and one or more processors in processing system 336 with dedicated hardware or implementing executable code or software instructions in memory component 342. A means for determining the net RTT using the aggregation of the first signaling data and the second signaling data for the first UE and the corresponding signaling data measured by the first UE, wherein the net RTT is determined using the total RTT and the processing delay may be, e.g., one or more processors in processing system 336 with dedicated hardware or implementing executable code or software instructions in memory component 342 such as the module for module for calculating the net RTT 2108. A means for determining the location for the first UE using at least the net RTT between the UE and each of the first gNodeB and the second gNodeB and a known position of the each of the first gNodeB and the second gNodeB may be, e.g., one or more processors in processing system 336 with dedicated hardware or implementing executable code or software instructions in memory component 342 such as the module for determining the location of the first UE using at least the net RTT and known positions of the gNodeBs 2110.

The functionality of the modules of FIGS. 18-21 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 18-21, as well as other components and functions described herein, may be implemented using any suitable means. Such means also may be implemented, at least in part, using corresponding structure as taught herein. For example, the components described above in conjunction with the "module for" components of FIGS. 18-21 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

One implementation (1) may be a method for determining a round-trip time (RTT) for signals between a user equipment (UE) and a plurality of network nodes (gNodeBs) in a wireless network performed by a first gNodeB in the plurality of gNodeBs, the method comprising: receiving, from the UE, an uplink RTT reference signal; transmitting, to the UE, a downlink RTT reference signal; measuring signaling data related to the uplink RTT reference signal and the downlink RTT reference signal, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; and sending, to an entity in the wireless network other than the UE, a report of the signaling data.

There may be some implementations (2) of the above described method (1), wherein the uplink RTT reference signal is received before the downlink RTT reference signal is transmitted, and wherein the signaling data measured by the first gNodeB comprises the processing delay in the first gNodeB.

There may be some implementations (3) of the above described method (1), wherein the uplink RTT reference signal is received after the downlink RTT reference signal is transmitted, and wherein the signaling data measured by the first gNodeB comprises the total RTT.

There may be some implementations (4) of the above described method (1)), wherein the entity in the wireless network other than the UE is a second gNodeB.

There may be some implementations (5) of the above described method (1)), wherein the entity in the wireless network other than the UE is a location server.

There may be some implementations (6) of the above described method (5), wherein the first gNodeB is a serving gNodeB for the UE.

There may be some implementations (7) of the above described method (1), wherein the report of the signaling data is sent to the entity in the wireless network other than the UE using a core network or integrated access and backhaul (IAB).

There may be some implementations (8) of the above described method (1), further comprising: receiving, from a second UE, a second uplink RTT reference signal; transmitting, to the second UE, a second downlink RTT reference signal; and measuring a second signaling data related to the second uplink RTT reference signal and the second downlink RTT reference signal, wherein the second signaling data comprises one of a second processing delay between a TOA of the second uplink RTT reference signal and a TOT of the second downlink RTT reference signal or a second total RTT between the TOT of the second downlink RTT reference signal and the TOA of the second uplink RTT reference signal.

There may be some implementations (9) of the above described method (8), further comprising: receiving, from a second gNodeB, a report of a third signaling data measured by the second gNodeB related to the second uplink RTT reference signal and third downlink RTT reference signal transmitted by the second gNodeB, wherein the third signaling data comprises one of a third processing delay between a TOA of the second uplink RTT reference signal and a TOT of the third downlink RTT reference signal or a third total RTT between the TOT of the third downlink RTT reference signal and the TOA of the second uplink RTT reference signal; aggregating the second signaling data and the third signaling data; and transmitting, to the second UE, an aggregated report of the second signaling data and the third signaling data.

There may be some implementations (10) of the above described method (8), wherein the second signaling data is sent to the entity in the wireless network other than the UE in the report of the signaling data.

There may be some implementations (11) of the above described method (1), wherein the entity in the wireless network other than the UE receives, from at least one other gNodeB, a report of signaling data measured by the other gNodeB related to the uplink RTT reference signal received by the other gNodeB from the UE and a second downlink RTT reference signal transmitted by the other gNodeB to the UE, wherein the signaling data comprises one of a processing delay between a TOA of the uplink RTT reference signal received by the other gNodeB and a TOT of the second downlink RTT reference signal or a total RTT between the TOT of the second downlink RTT reference signal and the TOA of the uplink RTT reference signal received by the other gNodeB.

One implementation (12) may be a network node (first gNodeB) in a wireless network configured for determining a round-trip time (RTT) for signals between a user equipment (UE) and a plurality of network nodes (gNodeBs), comprising: at least one transceiver configured to: receive, from the UE, an uplink RTT reference signal; transmit, to the UE, a downlink RTT reference signal; at least one memory; and at least one processor coupled to the at least one transceiver and the at least one memory and configured to measuring signaling data related to the uplink RTT reference signal and the downlink RTT reference signal, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; and the at least one transceiver is further configured to: sending, to an entity in the wireless network other than the UE, a report of the signaling data.

There may be some implementations (There may be some implementations (13) of the above described network node (12), wherein the uplink RTT reference signal is received before the downlink RTT reference signal is transmitted, and wherein the signaling data measured by the first gNodeB comprises the processing delay in the first gNodeB.

There may be some implementations (There may be some implementations (14) of the above described network node (12), wherein the uplink RTT reference signal is received after the downlink RTT reference signal is transmitted, and wherein the signaling data measured by the first gNodeB comprises the total RTT.

There may be some implementations (There may be some implementations (15) of the above described network node (12), wherein the entity in the wireless network other than the UE is a second gNodeB.

There may be some implementations (16) of the above described network node (12), wherein the entity in the wireless network other than the UE is a location server.

There may be some implementations (17) of the above described network node (16), wherein the first gNodeB is a serving gNodeB for the UE.

There may be some implementations (18) of the above described network node (12), wherein the report of the signaling data is sent to the entity in the wireless network other than the UE using a core network or integrated access and backhaul (JAB).

There may be some implementations (19) of the above described network node (12), wherein the at least one transceiver is further configured to: receive, from a second UE, a second uplink RTT reference signal; transmit, to the second UE, a second downlink RTT reference signal; and the at least one processor is further configured to measure a second signaling data related to the second uplink RTT reference signal and the second downlink RTT reference signal, wherein the second signaling data comprises one of a second processing delay between a TOA of the second uplink RTT reference signal and a TOT of the second downlink RTT reference signal or a second total RTT between the TOT of the second downlink RTT reference signal and the TOA of the second uplink RTT reference signal.

There may be some implementations (20) of the above described network node (19), wherein the at least one transceiver is further configured to: receive, from a second gNodeB, a report of a third signaling data measured by the second gNodeB related to the second uplink RTT reference signal and third downlink RTT reference signal transmitted by the second gNodeB, wherein the third signaling data comprises one of a third processing delay between a TOA of the second uplink RTT reference signal and a TOT of the third downlink RTT reference signal or a third total RTT between the TOT of the third downlink RTT reference signal and the TOA of the second uplink RTT reference signal; the at least one processor is further configured to aggregate the second signaling data and the third signaling data; and the at least one transceiver is further configured to transmit, to the second UE, an aggregated report of the second signaling data and the third signaling data.

There may be some implementations (21) of the above described network node (19), wherein the second signaling data is sent to the entity in the wireless network other than the UE in the report of the signaling data.

There may be some implementations (22) of the above described network node (12), wherein the entity in the wireless network other than the UE receives, from at least one other gNodeB, a report of signaling data measured by the other gNodeB related to the uplink RTT reference signal received by the other gNodeB from the UE and a second downlink RTT reference signal transmitted by the other gNodeB to the UE, wherein the signaling data comprises one of a processing delay between a TOA of the uplink RTT reference signal received by the other gNodeB and a TOT of the second downlink RTT reference signal or a total RTT between the TOT of the second downlink RTT reference signal and the TOA of the uplink RTT reference signal received by the other gNodeB.

One implementation (23) may be a network node in a wireless network configured for determining a round-trip time (RTT) for signals between a user equipment (UE) and a plurality of network nodes (gNodeBs), comprising: means for receiving, from the UE, an uplink RTT reference signal; means for transmitting, to the UE, a downlink RTT reference signal; means for measuring signaling data related to the uplink RTT reference signal and the downlink RTT reference signal, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; and means for sending, to an entity in the wireless network other than the UE, a report of the signaling data.

There may be some implementations (24) of the above described network node (23), wherein the uplink RTT reference signal is received before the downlink RTT reference signal is transmitted, and wherein the signaling data measured by the first gNodeB comprises the processing delay in the first gNodeB.

There may be some implementations (25) of the above described network node (23), wherein the uplink RTT reference signal is received after the downlink RTT reference signal is transmitted, and wherein the signaling data measured by the first gNodeB comprises the total RTT.

There may be some implementations (26) of the above described network node (23), wherein the entity in the wireless network other than the UE is a second gNodeB.

There may be some implementations (27) of the above described network node (23), wherein the entity in the wireless network other than the UE is a location server.

There may be some implementations (28) of the above described network node (27), wherein the first gNodeB is a serving gNodeB for the UE.

There may be some implementations (29) of the above described network node (23), wherein the report of the signaling data is sent to the entity in the wireless network other than the UE using a core network or integrated access and backhaul (IAB).

There may be some implementations (30) of the above described network node (23), further comprising: means for receiving, from a second UE, a second uplink RTT reference signal; means for transmitting, to the second UE, a second downlink RTT reference signal; and means for measuring a second signaling data related to the second uplink RTT reference signal and the second downlink RTT reference signal, wherein the second signaling data comprises one of a second processing delay between a TOA of the second uplink RTT reference signal and a TOT of the second downlink RTT reference signal or a second total RTT between the TOT of the second downlink RTT reference signal and the TOA of the second uplink RTT reference signal.

There may be some implementations (31) of the above described network node (30), further comprising: means for receiving, from a second gNodeB, a report of a third signaling data measured by the second gNodeB related to the second uplink RTT reference signal and third downlink RTT reference signal transmitted by the second gNodeB, wherein the third signaling data comprises one of a third processing delay between a TOA of the second uplink RTT reference signal and a TOT of the third downlink RTT reference signal or a third total RTT between the TOT of the third downlink RTT reference signal and the TOA of the second uplink RTT reference signal; means for aggregating the second signaling data and the third signaling data; and means for transmitting, to the second UE, an aggregated report of the second signaling data and the third signaling data.

There may be some implementations (32) of the above described network node (30), wherein the second signaling data is sent to the entity in the wireless network other than the UE in the report of the signaling data.

There may be some implementations (33) of the above described network node (23), wherein the entity in the wireless network other than the UE receives, from at least one other gNodeB, a report of signaling data measured by the other gNodeB related to the uplink RTT reference signal received by the other gNodeB from the UE and a second downlink RTT reference signal transmitted by the other gNodeB to the UE, wherein the signaling data comprises one of a processing delay between a TOA of the uplink RTT reference signal received by the other gNodeB and a TOT of the second downlink RTT reference signal or a total RTT between the TOT of the second downlink RTT reference signal and the TOA of the uplink RTT reference signal received by the other gNodeB.

One implementation (34) may be a non-transitory storage medium including program code stored thereon, the program code is operable to cause at least one processor in a first network node (gNodeB) in a wireless network to operate for determining a round-trip time (RTT) for signals between a user equipment (UE) and a plurality of network nodes (gNodeBs) in the wireless network, comprising: program code to receive, from the UE, an uplink RTT reference signal; program code to transmit, to the UE, a downlink RTT reference signal; program code to measure signaling data related to the uplink RTT reference signal and the downlink RTT reference signal, wherein the signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; and program code to send, to an entity in the wireless network other than the UE, a report of the signaling data.

One implementation (35) may be a method for determining a round-trip time (RTT) for signals between a user equipment (UE) and a plurality of network nodes (gNodeBs) in a wireless network performed by a first gNodeB in the plurality of gNodeBs, the method comprising: receiving, from the UE, an uplink RTT reference signal; transmitting, to the UE, a downlink RTT reference signal; measuring, by the first gNodeB, first signaling data related to the uplink RTT reference signal and the downlink RTT reference signal, wherein the first signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; receiving, from a second gNodeB, a report of a second signaling data measured by the second gNodeB related to the uplink RTT reference signal received by the second gNodeB and a second downlink RTT reference signal transmitted by the second gNodeB, wherein the second signaling data comprises one of a second processing delay between a TOA of the uplink RTT reference signal at the second gNodeB and a TOT of the second downlink RTT reference signal or a second total RTT between the TOT of the second downlink RTT reference signal and the TOA of the second uplink RTT reference signal; aggregating the signaling data and the second signaling data; and transmitting, to the UE, an aggregated report of the signaling data and the second signaling data.

There may be some implementations (36) of the above described method (35),), wherein the uplink RTT reference signal is received before the downlink RTT reference signal is transmitted, and wherein the signaling data measured by the first gNodeB comprises the processing delay in the first gNodeB and the second signaling data measured by the second gNodeB comprises the processing delay in the second gNodeB.

There may be some implementations (37) of the above described method (35),), wherein the uplink RTT reference signal is received after the downlink RTT reference signal is transmitted, and wherein the signaling data measured by the first gNodeB comprises the total RTT measured by the first gNodeB and the second signaling data measured by the second gNodeB comprises the total RTT measured by the second gNodeB.

There may be some implementations (38) of the above described method (35), wherein the first gNodeB is a serving gNodeB for the UE.

There may be some implementations (39) of the above described method (35),), wherein the second gNodeB is a neighbor gNodeB of the first gNodeB within communication range of the UE.

One implementation (40) may be a network node (first gNodeB) in a wireless network configured for determining a round-trip time (RTT) for signals between a user equipment (UE) and a plurality of network nodes (gNodeBs), comprising: at least one transceiver configured to: receive, from the UE, an uplink RTT reference signal; transmit, to the UE, a downlink RTT reference signal; receive, from a second gNodeB, a report of a second signaling data measured by the second gNodeB related to the uplink RTT reference signal received by the second gNodeB and a second downlink RTT reference signal transmitted by the second gNodeB, wherein the second signaling data comprises one of a second processing delay between a TOA of the uplink RTT reference signal at the second gNodeB and a TOT of the second downlink RTT reference signal or a second total RTT between the TOT of the second downlink RTT reference signal and the TOA of the second uplink RTT reference signal; at least one memory; and at least one processor coupled to the at least one transceiver and the at least one memory and configured to: measure, by the first gNodeB, first signaling data related to the uplink RTT reference signal and the downlink RTT reference signal, wherein the first signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; aggregate the signaling data and the second signaling data; and wherein the at least one transceiver is further configured to transmit, to the UE, an aggregated report of the signaling data and the second signaling data.

There may be some implementations (41) of the above described network node (40),), wherein the uplink RTT reference signal is received before the downlink RTT reference signal is transmitted, and wherein the signaling data measured by the first gNodeB comprises the processing delay in the first gNodeB and the second signaling data measured by the second gNodeB comprises the processing delay in the second gNodeB.

There may be some implementations (42) of the above described network node (40), wherein the uplink RTT reference signal is received after the downlink RTT reference signal is transmitted, and wherein the signaling data measured by the first gNodeB comprises the total RTT measured by the first gNodeB and the second signaling data measured by the second gNodeB comprises the total RTT measured by the second gNodeB.

There may be some implementations (43) of the above described network node (40), wherein the first gNodeB is a serving gNodeB for the UE.

There may be some implementations (44) of the above described network node (40), wherein the second gNodeB is a neighbor gNodeB of the first gNodeB within communication range of the UE.

One implementation (45) may be a network node (first gNodeB) in a wireless network configured for determining a round-trip time (RTT) for signals between a user equipment (UE) and a plurality of network nodes (gNodeBs), comprising: means for receiving, from the UE, an uplink RTT reference signal; means for transmitting, to the UE, a downlink RTT reference signal; means for measuring, by the first gNodeB, first signaling data related to the uplink RTT reference signal and the downlink RTT reference signal, wherein the first signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; means for receiving, from a second gNodeB, a report of a second signaling data measured by the second gNodeB related to the uplink RTT reference signal received by the second gNodeB and a second downlink RTT reference signal transmitted by the second gNodeB, wherein the second signaling data comprises one of a second processing delay between a TOA of the uplink RTT reference signal at the second gNodeB and a TOT of the second downlink RTT reference signal or a second total RTT between the TOT of the second downlink RTT reference signal and the TOA of the second uplink RTT reference signal; means for aggregating the signaling data and the second signaling data; and means for transmitting, to the UE, an aggregated report of the signaling data and the second signaling data.

There may be some implementations (46) of the above described network node (45), wherein the uplink RTT reference signal is received before the downlink RTT reference signal is transmitted, and wherein the signaling data measured by the first gNodeB comprises the processing delay in the first gNodeB and the second signaling data measured by the second gNodeB comprises the processing delay in the second gNodeB.

There may be some implementations (47) of the above described network node (45), wherein the uplink RTT reference signal is received after the downlink RTT reference signal is transmitted, and wherein the signaling data measured by the first gNodeB comprises the total RTT measured by the first gNodeB and the second signaling data measured by the second gNodeB comprises the total RTT measured by the second gNodeB.

There may be some implementations (48) of the above described network node (45), wherein the first gNodeB is a serving gNodeB for the UE.

There may be some implementations (49) of the above described network node (45), wherein the second gNodeB is a neighbor gNodeB of the first gNodeB within communication range of the UE.

One implementation (50) may be a non-transitory storage medium including program code stored thereon, the program code is operable to cause at least one processor in a first network node (gNodeB) in a wireless network to operate for determining a round-trip time (RTT) for signals between a user equipment (UE) and a plurality of network nodes (gNodeBs) in the wireless network, comprising: program code to receive, from the UE, an uplink RTT reference signal; program code to transmit, to the UE, a downlink RTT reference signal; program code to measure, by the first gNodeB, first signaling data related to the uplink RTT reference signal and the downlink RTT reference signal, wherein the first signaling data comprises one of a processing delay between a time of arrival (TOA) of the uplink RTT reference signal and a time of transmission (TOT) of the downlink RTT reference signal or a total RTT between the TOT of the downlink RTT reference signal and the TOA of the uplink RTT reference signal; program code to receive, from a second gNodeB, a report of a second signaling data measured by the second gNodeB related to the uplink RTT reference signal received by the second gNodeB and a second downlink RTT reference signal transmitted by the second gNodeB, wherein the second signaling data comprises one of a second processing delay between a TOA of the uplink RTT reference signal at the second gNodeB and a TOT of the second downlink RTT reference signal or a second total RTT between the TOT of the second downlink RTT reference signal and the TOA of the second uplink RTT reference signal; program code to aggregate the signaling data and the second signaling data; and program code to transmit, to the UE, an aggregated report of the signaling data and the second signaling data.

There may be some implementations (51) of the above described non-transitory storage medium (50), wherein the uplink RTT reference signal is received before the downlink RTT reference signal is transmitted, and wherein the signaling data measured by the first gNodeB comprises the processing delay in the first gNodeB and the second signaling data measured by the second gNodeB comprises the processing delay in the second gNodeB.

There may be some implementations (52) of the above described non-transitory storage medium (50), wherein the uplink RTT reference signal is received after the downlink RTT reference signal is transmitted, and wherein the signaling data measured by the first gNodeB comprises the total RTT measured by the first gNodeB and the second signaling data measured by the second gNodeB comprises the total RTT measured by the second gNodeB.

There may be some implementations (53) of the above described non-transitory storage medium (50), wherein the first gNodeB is a serving gNodeB for the UE.

There may be some implementations (54) of the above described non-transitory storage medium (50), wherein the second gNodeB is a neighbor gNodeB of the first gNodeB within communication range of the UE.

One implementation (55) may be a method for determining a location for a first user equipment (UE) using round-trip time (RTT) for signals between the first UE and a plurality of network nodes (gNodeBs) in a wireless network performed by a location server, the method comprising: receiving, from a first gNodeB, a report of first signaling data related to a time of arrival (TOA) of uplink RTT reference signals received by the first gNodeB from a plurality of UEs including the first UE and time of transmission (TOT) of downlink RTT reference signals transmitted by the first gNodeB to each of the plurality of UEs, wherein for each UE in the plurality of UEs, the first signaling data comprises one of a processing delay between the TOA of the uplink RTT reference signal and the TOT of the downlink RTT reference signal or a total RTT between the TOT of the downlink RTT reference signal and the TOA of the uplink RTT reference signal; receiving, from a second gNodeB, a report of second signaling data related to the TOA of uplink RTT reference signals received by the second gNodeB from the plurality of UEs including the first UE and TOT of downlink RTT reference signals transmitted by the second gNodeB to each of the plurality of UEs, wherein for each UE in the plurality of UEs, the second signaling data comprises one of the processing delay between the TOA of the uplink RTT reference signal and the TOT of the downlink RTT reference signal or the total RTT between the TOT of the downlink RTT reference signal and the TOA of the uplink RTT reference signal; and aggregating, for the first UE in the plurality of UEs, the first signaling data and the second signaling data; and wherein the location of the UE is determined using at least a net RTT between the first UE and each of the first gNodeB and the second gNodeB, wherein the net RTT is determined using the first signaling data and the second signaling data aggregated for the first UE.

There may be some implementations (56) of the above described method (55), wherein the first signaling data measured by the first gNodeB comprises the processing delay in the first gNodeB, and the second signaling data measured by the second gNodeB comprises the processing delay in the second gNodeB.

There may be some implementations (57) of the above described method (55), wherein the first signaling data measured by the first gNodeB comprises the total RTT measured by the first gNodeB, and the second signaling data measured by the second gNodeB comprises the total RTT measured by the second gNodeB.

There may be some implementations (58) of the above described method (55), wherein the location server sends, to the first UE, the aggregation of the first signaling data and the second signaling data and the first UE determines the net RTT using the first signaling data and the second signaling data and corresponding signaling data measured by the first UE comprising one of a total RTT between the TOT of the uplink RTT reference signal and the TOA of the downlink RTT reference signal or a processing delay between the TOA of the downlink RTT reference signal and a TOT of the downlink RTT reference signal, and the net RTT is determined using the total RTT and the processing delay; and wherein the first UE determines the location for the first UE using at least the net RTT between the UE and each of the first gNodeB and the second gNodeB and a known position of the each of the first gNodeB and the second gNodeB.

There may be some implementations (59) of the above described method (58), wherein a location determination session is initiated by the first UE.

There may be some implementations (60) of the above described method (55), further comprising: receiving corresponding signaling data measured by the first UE comprising one of a total RTT between the TOT of the uplink RTT reference signal and the TOA of the downlink RTT reference signal or a processing delay between the TOA of the downlink RTT reference signal and a TOT of the downlink RTT reference signal; determining the net RTT using the aggregation of the first signaling data and the second signaling data for the first UE and the corresponding signaling data measured by the first UE, wherein the net RTT is determined using the total RTT and the processing delay; and determining the location for the first UE using at least the net RTT between the UE and each of the first gNodeB and the second gNodeB and a known position of the each of the first gNodeB and the second gNodeB.

There may be some implementations (61) of the above described method (60), wherein a location determination session is initiated by the location server.

There may be some implementations (62) of the above described method (60), further comprising: sending RTT assistance data to the first gNodeB and the second gNodeB; and sending RTT assistance data to the UE.

There may be some implementations (63) of the above described method (60), wherein: RTT assistance data is sent from the first gNodeB to the second gNodeB; and RTT assistance data is sent from the first gNodeB to the first UE.

There may be some implementations (64) of the above described method (63), wherein the first gNodeB is a serving gNodeB for the first UE.

One implementation (65) may be a network node (location server) in a wireless network configured for determining a location for a first user equipment (UE) using round-trip time (RTT) for signals between the first UE and a plurality of network nodes (gNodeBs), comprising: at least one network interface configured to: receive, from a first gNodeB, a report of first signaling data related to a time of arrival (TOA) of uplink RTT reference signals received by the first gNodeB from a plurality of UEs including the first UE and time of transmission (TOT) of downlink RTT reference signals transmitted by the first gNodeB to each of the plurality of UEs, wherein for each UE in the plurality of UEs, the first signaling data comprises one of a processing delay between the TOA of the uplink RTT reference signal and the TOT of the downlink RTT reference signal or a total RTT between the TOT of the downlink RTT reference signal and the TOA of the uplink RTT reference signal; receive, from a second gNodeB, a report of second signaling data related to the TOA of uplink RTT reference signals received by the second gNodeB from the plurality of UEs including the first UE and TOT of downlink RTT reference signals transmitted by the second gNodeB to each of the plurality of UEs, wherein for each UE in the plurality of UEs, the second signaling data comprises one of the processing delay between the TOA of the uplink RTT reference signal and the TOT of the downlink RTT reference signal or the total RTT between the TOT of the downlink RTT reference signal and the TOA of the uplink RTT reference signal; and at least one memory; and at least one processor coupled to the at least one network interface and the at least one memory and configured to aggregate, for the first UE in the plurality of UEs, the first signaling data and the second signaling data; and wherein the location of the UE is determined using at least a net RTT between the first UE and each of the first gNodeB and the second gNodeB, wherein the net RTT is determined using the first signaling data and the second signaling data aggregated for the first UE.

There may be some implementations (66) of the above described network node (65), wherein the first signaling data measured by the first gNodeB comprises the processing delay in the first gNodeB, and the second signaling data measured by the second gNodeB comprises the processing delay in the second gNodeB.

There may be some implementations (67) of the above described network node (65), wherein the first signaling data measured by the first gNodeB comprises the total RTT measured by the first gNodeB, and the second signaling data measured by the second gNodeB comprises the total RTT measured by the second gNodeB.

There may be some implementations (68) of the above described network node (65), wherein the location server sends, to the first UE, the aggregation of the first signaling data and the second signaling data and the first UE determines the net RTT using the first signaling data and the second signaling data and corresponding signaling data measured by the first UE comprising one of a total RTT between the TOT of the uplink RTT reference signal and the TOA of the downlink RTT reference signal or a processing delay between the TOA of the downlink RTT reference signal and a TOT of the downlink RTT reference signal, and the net RTT is determined using the total RTT and the processing delay; and wherein the first UE determines the location for the first UE using at least the net RTT between the UE and each of the first gNodeB and the second gNodeB and a known position of the each of the first gNodeB and the second gNodeB.

There may be some implementations (69) of the above described network node (68), wherein a location determination session is initiated by the first UE.

There may be some implementations (70) of the above described network node (65), wherein the at least one network interface is further configured to: receive corresponding signaling data measured by the first UE comprising one of a total RTT between the TOT of the uplink RTT reference signal and the TOA of the downlink RTT reference signal or a processing delay between the TOA of the downlink RTT reference signal and a TOT of the downlink RTT reference signal; the at least one processor is further configured to: determine the net RTT using the aggregation of the first signaling data and the second signaling data for the first UE and the corresponding signaling data measured by the first UE, wherein the net RTT is determined using the total RTT and the processing delay; and determine the location for the first UE using at least the net RTT between the UE and each of the first gNodeB and the second gNodeB and a known position of the each of the first gNodeB and the second gNodeB.

There may be some implementations (71) of the above described network node (70), wherein a location determination session is initiated by the location server.

There may be some implementations (72) of the above described network node (70), wherein the at least one network interface is further configured to: send RTT assistance data to the first gNodeB and the second gNodeB; and send RTT assistance data to the UE.

There may be some implementations (73) of the above described network node (70), wherein: RTT assistance data is sent from the first gNodeB to the second gNodeB; and RTT assistance data is sent from the first gNodeB to the first UE.

There may be some implementations (74) of the above described network node (73), wherein the first gNodeB is a serving gNodeB for the first UE.

One implementation (75) may be a network node (location server) in a wireless network configured for determining a location for a first user equipment (UE) using round-trip time (RTT) for signals between the first UE and a plurality of network nodes (gNodeBs), comprising: means for receiving, from a first gNodeB, a report of first signaling data related to a time of arrival (TOA) of uplink RTT reference signals received by the first gNodeB from a plurality of UEs including the first UE and time of transmission (TOT) of downlink RTT reference signals transmitted by the first gNodeB to each of the plurality of UEs, wherein for each UE in the plurality of UEs, the first signaling data comprises one of a processing delay between the TOA of the uplink RTT reference signal and the TOT of the downlink RTT reference signal or a total RTT between the TOT of the downlink RTT reference signal and the TOA of the uplink RTT reference signal; means for receiving, from a second gNodeB, a report of second signaling data related to the TOA of uplink RTT reference signals received by the second gNodeB from the plurality of UEs including the first UE and TOT of downlink RTT reference signals transmitted by the second gNodeB to each of the plurality of UEs, wherein for each UE in the plurality of UEs, the second signaling data comprises one of the processing delay between the TOA of the uplink RTT reference signal and the TOT of the downlink RTT reference signal or the total RTT between the TOT of the downlink RTT reference signal and the TOA of the uplink RTT reference signal; and means for aggregating, for the first UE in the plurality of UEs, the first signaling data and the second signaling data; and wherein the location of the UE is determined using at least a net RTT between the first UE and each of the first gNodeB and the second gNodeB, wherein the net RTT is determined using the first signaling data and the second signaling data aggregated for the first UE.

There may be some implementations (76) of the above described network node (75), wherein the first signaling data measured by the first gNodeB comprises the processing delay in the first gNodeB, and the second signaling data measured by the second gNodeB comprises the processing delay in the second gNodeB.

There may be some implementations (77) of the above described network node (75), wherein the first signaling data measured by the first gNodeB comprises the total RTT measured by the first gNodeB, and the second signaling data measured by the second gNodeB comprises the total RTT measured by the second gNodeB.

There may be some implementations (78) of the above described network node (75), wherein the location server sends, to the first UE, the aggregation of the first signaling data and the second signaling data and the first UE determines the net RTT using the first signaling data and the second signaling data and corresponding signaling data measured by the first UE comprising one of a total RTT between the TOT of the uplink RTT reference signal and the TOA of the downlink RTT reference signal or a processing delay between the TOA of the downlink RTT reference signal and a TOT of the downlink RTT reference signal, and the net RTT is determined using the total RTT and the processing delay; and wherein the first UE determines the location for the first UE using at least the net RTT between the UE and each of the first gNodeB and the second gNodeB and a known position of the each of the first gNodeB and the second gNodeB.

There may be some implementations (79) of the above described network node (78), wherein a location determination session is initiated by the first UE.

There may be some implementations (80) of the above described network node (75), further comprising: means for receiving corresponding signaling data measured by the first UE comprising one of a total RTT between the TOT of the uplink RTT reference signal and the TOA of the downlink RTT reference signal or a processing delay between the TOA of the downlink RTT reference signal and a TOT of the downlink RTT reference signal; means for determining the net RTT using the aggregation of the first signaling data and the second signaling data for the first UE and the corresponding signaling data measured by the first UE, wherein the net RTT is determined using the total RTT and the processing delay; and means for determining the location for the first UE using at least the net RTT between the UE and each of the first gNodeB and the second gNodeB and a known position of the each of the first gNodeB and the second gNodeB.

There may be some implementations (81) of the above described network node (80), wherein a location determination session is initiated by the location server.

There may be some implementations (82) of the above described network node (80), further comprising: sending RTT assistance data to the first gNodeB and the second gNodeB; and sending RTT assistance data to the UE.

There may be some implementations (83) of the above described network node (80), wherein: RTT assistance data is sent from the first gNodeB to the second gNodeB; and RTT assistance data is sent from the first gNodeB to the first UE.

There may be some implementations (84) of the above described network node (83), wherein the first gNodeB is a serving gNodeB for the first UE.

One implementation (85) may be a non-transitory storage medium including program code stored thereon, the program code is operable to cause at least one processor in a location server to operate for determining location for a first user equipment (UE) using round-trip time (RTT) for signals between the first UE and a plurality of network nodes (gNodeBs) in a wireless network comprising: program code to receive, from a first gNodeB, a report of first signaling data related to a time of arrival (TOA) of uplink RTT reference signals received by the first gNodeB from a plurality of UEs including the first UE and time of transmission (TOT) of downlink RTT reference signals transmitted by the first gNodeB to each of the plurality of UEs, wherein for each UE in the plurality of UEs, the first signaling data comprises one of a processing delay between the TOA of the uplink RTT reference signal and the TOT of the downlink RTT reference signal or a total RTT between the TOT of the downlink RTT reference signal and the TOA of the uplink RTT reference signal; program code to receive, from a second gNodeB, a report of second signaling data related to the TOA of uplink RTT reference signals received by the second gNodeB from the plurality of UEs including the first UE and TOT of downlink RTT reference signals transmitted by the second gNodeB to each of the plurality of UEs, wherein for each UE in the plurality of UEs, the second signaling data comprises one of the processing delay between the TOA of the uplink RTT reference signal and the TOT of the downlink RTT reference signal or the total RTT between the TOT of the downlink RTT reference signal and the TOA of the uplink RTT reference signal; and program code to aggregate, for the first UE in the plurality of UEs, the first signaling data and the second signaling data; and wherein the location of the UE is determined using at least a net RTT between the first UE and each of the first gNodeB and the second gNodeB, wherein the net RTT is determined using the first signaling data and the second signaling data aggregated for the first UE.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for determining a round-trip time (RTT) for signals between a user equipment (UE) and a plurality of network nodes (gNodeBs) in a wireless network performed by the UE, the method comprising:
    transmitting, to at least a first gNodeB and a second gNodeB, an uplink RTT reference signal;
    receiving, from each of the first gNodeB and the second gNodeB, downlink RTT reference signals, wherein each of the first gNodeB and the second gNodeB measure signaling data related to the uplink RTT reference signal and a downlink RTT reference signal transmitted by the first gNodeB and the second gNodeB;
    receiving, from the first gNodeB, an aggregated report generated by the first gNodeB, wherein the aggregated report comprises the measured signaling data for each of the first gNodeB and the second gNodeB; and
    calculating a net RTT between the UE and each of the first gNodeB and the second gNodeB based on the measured signaling data for each of the first gNodeB and the second gNodeB received in the aggregated report and corresponding signaling data regarding the first gNodeB and the second gNodeB measured by the UE.

2. The method of claim 1, further comprising determining a location of the UE using at least the net RTT between the UE and each of the first gNodeB and the second gNodeB and a known position of the each of the first gNodeB and the second gNodeB.

3. The method of claim 1, wherein separate uplink RTT reference signals are transmitted to the first gNodeB and the second gNodeB after receiving the downlink RTT reference signals, and wherein the measured signaling data for each of the first gNodeB and the second gNodeB comprises a total RTT measured by each of the first gNodeB and the second gNodeB between a time of transmission (TOT) of the downlink RTT reference signal and a time of arrival (TOA) of the uplink RTT reference signal, and the corresponding signaling data comprises a processing delay measured by the UE between a TOA of the downlink RTT reference signal and a TOT of the uplink RTT reference signal for each of the first gNodeB and the second gNodeB.

4. The method of claim 1, wherein the first gNodeB is a serving gNodeB for the UE.

5. The method of claim 1, wherein the second gNodeB is a neighbor gNodeB of the first gNodeB within a communication range.

6. A user equipment (UE) configured for determining a round-trip time (RTT) for signals between the UE and a plurality of network nodes (gNodeBs) in a wireless network, comprising:
a transceiver of the UE configured to:
transmit, to at least a first gNodeB and a second gNodeB, an uplink RTT reference signal;
receive, from each of the first gNodeB and the second gNodeB, downlink RTT reference signals, wherein each of the first gNodeB and the second gNodeB measure signaling data related to the uplink RTT reference signal and a downlink RTT reference signal transmitted by the first gNodeB and the second gNodeB;
receive, from the first gNodeB, an aggregated report generated by the first gNodeB of measured signaling data for each of the first gNodeB and the second gNodeB;
at least one memory; and
at least one processor of the UE coupled to the transceiver and the at least one memory and configured to calculate a net RTT between the UE and each of the first gNodeB and the second gNodeB based on the measured signaling data for each of the first gNodeB and the second gNodeB received in the aggregated report and corresponding signaling data regarding the first gNodeB and the second gNodeB measured by the UE.

7. The UE of claim 6, wherein the at least one processor is further configured to determine a location of the UE using at least the net RTT between the UE and each of the first gNodeB and the second gNodeB and a known position of the each of the first gNodeB and the second gNodeB.

8. The UE of claim 6, wherein separate uplink RTT reference signals are transmitted to the first gNodeB and the second gNodeB after receiving the downlink RTT reference signals, and wherein the measured signaling data for each of the first gNodeB and the second gNodeB comprises a total RTT measured by each of the first gNodeB and the second gNodeB between a time of transmission (TOT) of the downlink RTT reference signal and a time of arrival (TOA) of the uplink RTT reference signal, and the corresponding signaling data comprises a processing delay measured by the UE between a TOA of the downlink RTT reference signal and a TOT of the uplink RTT reference signal for each of the first gNodeB and the second gNodeB.

9. The UE of claim 6, wherein the first gNodeB is a serving gNodeB for the UE.

10. The UE of claim 6, wherein the second gNodeB is a neighbor gNodeB of the first gNodeB within a communication range.

11. A user equipment (UE) configured for determining a round-trip time (RTT) for signals between the UE and a plurality of network nodes (gNodeBs) in a wireless network, comprising:
means for transmitting, to at least a first gNodeB and a second gNodeB, an uplink RTT reference signal;
means for receiving, from each of the first gNodeB and the second gNodeB, downlink RTT reference signals, wherein each of the first gNodeB and the second gNodeB measure signaling data related to the uplink RTT reference signal and a downlink RTT reference signal transmitted by the first gNodeB and the second gNodeB;
means for receiving, from the first gNodeB, an aggregated report generated by the first gNodeB of measured signaling data for each of the first gNodeB and the second gNodeB; and
means for calculating a net RTT between the UE and each of the first gNodeB and the second gNodeB based on the measured signaling data for each of the first gNodeB and the second gNodeB received in the aggregated report and corresponding signaling data regarding the first gNodeB and the second gNodeB measured by the UE.

12. The UE of claim 11, further comprising means for determining a location of the UE using at least the net RTT between the UE and each of the first gNodeB and the second gNodeB and a known position of the each of the first gNodeB and the second gNodeB.

13. The UE of claim 11, wherein separate uplink RTT reference signals are transmitted to the first gNodeB and the second gNodeB after receiving the downlink RTT reference signals, and wherein the measured signaling data for each of the first gNodeB and the second gNodeB comprises a total RTT measured by each of the first gNodeB and the second gNodeB between a time of transmission (TOT) of the downlink RTT reference signal and a time of arrival (TOA) of the uplink RTT reference signal, and the corresponding signaling data comprises a processing delay measured by the UE between a TOA of the downlink RTT reference signal and a TOT of the uplink RTT reference signal for each of the first gNodeB and the second gNodeB.

14. The UE of claim 11, wherein the first gNodeB is a serving gNodeB for the UE.

15. The UE of claim 11, wherein the second gNodeB is a neighbor gNodeB of the first gNodeB within a communication range.

16. A non-transitory storage medium including program code stored thereon, the program code is operable to cause at least one processor in a user equipment (UE) to determine a round-trip time (RTT) for signals between the UE and a plurality of network nodes (gNodeBs) in a wireless network, comprising:
program code to transmit, to at least a first gNodeB and a second gNodeB, an uplink RTT reference signal;
program code to receive, from each of the first gNodeB and the second gNodeB, downlink RTT reference signals, wherein each of the first gNodeB and the second gNodeB measure signaling data related to the uplink RTT reference signal and a downlink RTT reference signal transmitted by the first gNodeB and the second gNodeB;
program code to receive, from the first gNodeB, an aggregated report generated by the first gNodeB of measured signaling data for each of the first gNodeB and the second gNodeB; and
program code to calculate a net RTT between the UE and each of the first gNodeB and the second gNodeB based on the measured signaling data for each of the first gNodeB and the second gNodeB received in the aggregated report and corresponding signaling data regarding the first gNodeB and the second gNodeB measured by the UE.

17. The non-transitory storage medium of claim 16, further comprising program code to determine a location of the UE using at least the net RTT between the UE and each of the first gNodeB and the second gNodeB and a known position of the each of the first gNodeB and the second gNodeB.

18. The non-transitory storage medium of claim 16, wherein separate uplink RTT reference signals are transmitted to the first gNodeB and the second gNodeB after receiving the downlink RTT reference signals, and wherein the measured signaling data for each of the first gNodeB and the second gNodeB comprises a total RTT measured by each of the first gNodeB and the second gNodeB between a time of transmission (TOT) of the downlink RTT reference signal and a time of arrival (TOA) of the uplink RTT reference signal, and the corresponding signaling data comprises a processing delay measured by the UE between a TOA of the downlink RTT reference signal and a TOT of the uplink RTT reference signal for each of the first gNodeB and the second gNodeB.

19. The non-transitory storage medium of claim 16, wherein the first gNodeB is a serving gNodeB for the UE.

20. The non-transitory storage medium of claim 16, wherein the second gNodeB is a neighbor gNodeB of the first gNodeB within a communication range.

* * * * *